(12) United States Patent
Luo et al.

(10) Patent No.: US 10,986,644 B2
(45) Date of Patent: Apr. 20, 2021

(54) BEAM MANAGEMENT SCHEMES

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Sundar Subramanian, San Diego, CA (US); Juergen Cezanne, Ocean Township, NJ (US); Muhammad Nazmul Islam, Edison, NJ (US)

(73) Assignee: Qualcomm Incorporated, San Diego, CA (US)

( * ) Notice: Subject to any disclaimer, the term of this patent is extended or adjusted under 35 U.S.C. 154(b) by 59 days.

(21) Appl. No.: 16/151,181

(22) Filed: Oct. 3, 2018

(65) Prior Publication Data
US 2019/0116605 A1    Apr. 18, 2019

Related U.S. Application Data

(60) Provisional application No. 62/571,738, filed on Oct. 12, 2017, provisional application No. 62/578,047, filed on Oct. 27, 2017.

(51) Int. Cl.
*H04W 72/08* (2009.01)
*H04B 7/06* (2006.01)
(Continued)

(52) U.S. Cl.
CPC .......... *H04W 72/085* (2013.01); *H04B 7/024* (2013.01); *H04B 7/0695* (2013.01);
(Continued)

(58) Field of Classification Search
None
See application file for complete search history.

(56) References Cited

U.S. PATENT DOCUMENTS

| 2011/0110453 A1* | 5/2011 | Prasad | H04B 7/0695 375/285 |
| 2013/0102254 A1* | 4/2013 | Cyzs | H04B 1/126 455/63.1 |

(Continued)

OTHER PUBLICATIONS

International Search Report and Written Opinion—PCT/US2018/054405—ISA/EPO—dated Feb. 25, 2019.
(Continued)

*Primary Examiner* — Ajit Patel
*Assistant Examiner* — Pamit Kaur
(74) *Attorney, Agent, or Firm* — Loza & Loza LLP

(57) ABSTRACT

Aspects of the present disclosure provide for beam management in wireless communication systems. In some examples, beam angle information (e.g., angles of arrival/departure) may be utilized to select one or more serving downlink beams for communication between a scheduling entity and a scheduled entity. The beam angle information may further be utilized to facilitate additional operations within a backhaul network, such as wireless node locating, obstacle locating, system mapping within the network topology, beam determination and beam sweeping configuration, and mobility management among wireless nodes of a backhaul network. In other examples, aperiodic uplink beam measurements may be triggered based on downlink beam measurement reports and/or in response to a request from a scheduled entity. The scheduling entity may then jointly select uplink and downlink beams based on both the received downlink beam measurement report and uplink beam measurements.

56 Claims, 30 Drawing Sheets

(51) Int. Cl.
    *H04B 7/08*           (2006.01)
    *H04B 7/024*         (2017.01)
    *H04B 7/155*         (2006.01)
    *H04W 72/04*        (2009.01)
    *H04W 72/12*        (2009.01)

(52) U.S. Cl.
    CPC ......... *H04B 7/088* (2013.01); *H04B 7/15542* (2013.01); *H04W 72/0446* (2013.01); *H04W 72/046* (2013.01); *H04W 72/1231* (2013.01)

(56) References Cited

U.S. PATENT DOCUMENTS

| | | | | |
|---|---|---|---|---|
| 2014/0314167 | A1* | 10/2014 | Jeong | H04B 7/0617 375/267 |
| 2015/0257073 | A1* | 9/2015 | Park | H04B 7/0408 370/331 |
| 2018/0176801 | A1* | 6/2018 | Rune | H04B 7/0617 |
| 2019/0081751 | A1* | 3/2019 | Miao | H04W 72/0406 |
| 2019/0182798 | A1* | 6/2019 | Beale | H04B 7/0491 |
| 2020/0145079 | A1* | 5/2020 | Marinier | H04B 7/0456 |

OTHER PUBLICATIONS

Partial International Search Report—PCT/US2018/054405—ISA/EPO—dated Jan. 7, 2019.

\* cited by examiner

BEAM MANAGEMENT SCHEMES

PRIORITY CLAIM

This application claims priority to and the benefit of Provisional Patent Application No. 62/571,738 filed in the U.S. Patent and Trademark Office on Oct. 12, 2017, and further claims priority to and the benefit of Provisional Patent Application No. 62/578,047, filed in the U.S. Patent and Trademark Office on Oct. 27, 2017, the entire contents of which are incorporated herein by reference as if fully set forth below in their entireties and for all applicable purposes.

TECHNICAL FIELD

The technology discussed below relates generally to wireless communication systems, and more particularly, to beamforming in a wireless communication network.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

Beamforming may also be utilized within an Integrated-Access-Backhaul (IAB) network that utilizes wireless spectrum for both access links (links to UEs) and backhaul links (links to the core network). An IAB network may be formed of IAB nodes, such as base stations, that support access for UEs and backhaul of access traffic flows to/from a mobile core network.

As the demand for mobile broadband access continues to increase, research and development continue to advance beamforming communication technologies, including technologies for enhancing beamforming management in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to beam management in wireless communication systems, including but not limited to those specified under standards for 5G New Radio (NR). In some examples, beam angle information (e.g., angles of arrival/departure) may be utilized to select one or more serving downlink beams for communication between a scheduling entity and a scheduled entity. The beam angle information may further be utilized to facilitate additional operations within a backhaul network, such as wireless node locating, obstacle locating, system mapping within the network topology, beam determination and beam sweeping configuration, and mobility management among wireless nodes of a backhaul network.

In some examples, beam measurement reports from one or more scheduled entities may be forwarded to a scheduling entity through one or more relay wireless nodes. In other examples, aperiodic uplink beam measurements may be triggered based on downlink beam measurement reports and/or in response to a request from a scheduled entity. In addition, in response to performing uplink beam measurements, an Integrated-Access-Backhaul (IAB) node may transmit an uplink beam measurement report to another IAB node. In other examples, the scheduling entity may jointly select uplink and downlink beams based on both the received downlink beam measurement report and uplink beam measurements.

In one aspect of the disclosure, a method of wireless communication at a scheduled entity is provided. The method includes receiving a plurality of first reference beams from a first wireless node in a first beam-sweeping configuration, in which each of the plurality of first reference beams includes a respective first downlink reference signal. The method further includes measuring first beam quality information and first beam angle information for the plurality of first reference beams, transmitting a first beam measurement report including the first beam quality information and the first beam angle information associated with at least a subset of the plurality of first reference beams, and communicating with the first wireless node utilizing at least one serving downlink beam selected from the plurality of first reference beams based on the first beam measurement report.

Another aspect of the disclosure provides a scheduled entity for wireless communication. The scheduled entity includes a processor, a transceiver communicatively coupled to the processor, and a memory communicatively coupled to the processor. The processor is configured to receive a plurality of first reference beams from a first wireless node in a first beam-sweeping configuration, in which each of the plurality of first reference beams includes a respective first downlink reference signal. The processor is further configured to measure first beam quality information and first beam angle information for the plurality of first reference beams, transmit a first beam measurement report including the first beam quality information and the first beam angle information associated with at least a subset of the plurality of first reference beams, and communicate with the first wireless node utilizing at least one serving downlink beam selected from the plurality of first reference beams based on the first beam measurement report.

Another aspect of the disclosure provides method of wireless communication at a scheduling entity. The method includes receiving a first beam measurement report from a first scheduled entity, in which the first beam measurement report includes first beam quality information and first beam angle information for a plurality of first reference beams transmitted from a first wireless node to the first scheduled entity. The method further includes selecting at least one serving downlink beam from the plurality of first reference beams for the first scheduled entity based on the first beam measurement report, and enabling communication between the first wireless node and the first scheduled entity utilizing the at least one serving downlink beam.

Another aspect of the disclosure provides a scheduling entity for wireless communication. The scheduling entity includes a processor, a transceiver communicatively coupled to the processor, and a memory communicatively coupled to the processor. The processor is configured to receive a first beam measurement report from a first scheduled entity, in which the first beam measurement report includes first beam quality information and first beam angle information for a plurality of first reference beams transmitted from a first wireless node to the first scheduled entity. The processor is further configured to select at least one serving downlink beam from the plurality of first reference beams for the first scheduled entity based on the first beam measurement report, and enable communication between the first wireless node and the first scheduled entity utilizing the at least one serving downlink beam.

These and other aspects of the disclosure will become more fully understood upon a review of the detailed description, which follows. Other aspects and features of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the features discussed herein. In other words, while one or more aspects may be discussed as having certain features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
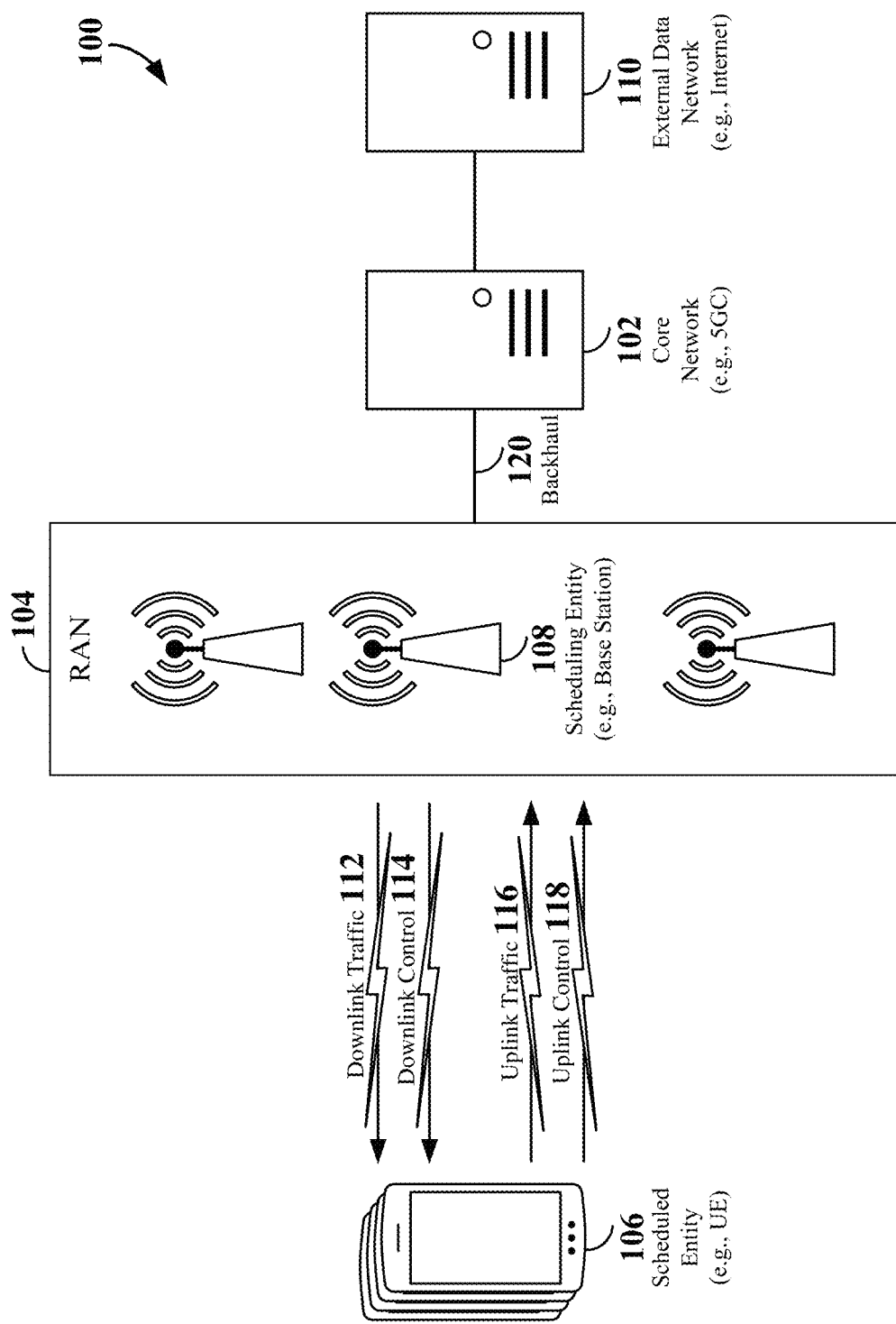
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication systems, and particularly those that utilize signals with very small wavelengths, such as millimeter wave (mmW), path loss can be very high and range may be limited. Beamforming is a technique that may be used to direct or concentrate the wireless signal to a desired direction to mitigate path loss and/or extend communication range. For a beamformed transmission, the amplitude and phase of each antenna in an array of antennas may be precoded, or controlled to create a desired (i.e., directional) pattern of constructive and destructive interference in the wavefront. Therefore, a beam may provide more energy in a certain direction to the receiver.

In some aspects of the present disclosure, beam management involves a set of Open Systems Interconnection (OSI) Layer 1 and Layer 2 procedures to acquire and maintain a set of transmission and reception point (TRP) (e.g., base station) and/or user equipment (UE) beams that can be used for downlink and uplink transmission and reception. For example, beam management may include procedures for beam determination (e.g., selection of one or more transmit/ receive beams), beam measurement (e.g., measurements related to various characteristics of received beamformed signals), beam reporting (e.g., reporting information on received beamformed signals based on the beam measurements), and beam sweeping (e.g., transmitting/receiving beams covering a particular spatial area during a predetermined time interval).

In an example of beam management, a scheduling entity, such as a base station, an Integrated-Access-Backhaul (IAB) node, or other TRP, may transmit one or more beam reference signals utilizing a beam-sweeping configuration by sweeping in all directions so that a scheduled entity, such as a user equipment (UE) or an IAB node, may identify a set of one or more candidate beams that provide the highest gain for that particular scheduled entity. For example, the scheduled entity may constantly measure the one or more beam reference signals to identify the set of one or more candidate beams on which the scheduled entity can receive information from the scheduling entity. The scheduled entity may also transmit a beam measurement report indicating the set of one or more candidate beams to the scheduling entity to enable the scheduling entity to select one or more of the candidate beams as serving downlink beams to transmit control information and/or user data traffic, including access backhaul traffic, to the scheduled entity.

Various aspects of the present disclosure are directed to beam management within wireless communication systems, including but not limited to those specified under standards for 5G or New Radio (NR). In an aspect of the disclosure, the scheduled entity may include beam angle information, such as the angles of arrival/departure, differences in the angles of arrival/departure or temporal information (e.g., time of arrival, time of departure, or time differences), of at least the candidate beams within the beam measurement report. The scheduling entity may utilize the beam angle information, together with the measured beam reference signal received power (BRSRP) of each of the candidate beams to select the serving downlink beams for the scheduled entity. For example, the scheduling entity may select the candidate beams with widely separated angles of arrival/ departure as the serving downlink beams to provide increased resistance to sudden blockage from surrounding moving objects. The beam angle information may further provide information for facilitating additional operations within a backhaul network, such as a wireless node location indication, an obstacle location indication, system mapping within the network topology, beam determination and beam sweeping configuration, and mobility management among wireless nodes of a backhaul network.

In an aspect of the disclosure, beam measurement reports from one or more scheduled entities may be forwarded to a scheduling entity through one or more relay wireless nodes. For example, the relay wireless node may receive a beam measurement report from a scheduled entity that includes BRSRPs of at least a subset of reference beams (e.g., a set of candidate beams) transmitted from a scheduling entity to the scheduled entity, and then forward that beam measurement report to the scheduling entity for selection of one or more serving downlink beams for communication between the scheduling entity and the scheduled entity. As another example, a relay wireless node may receive a plurality of beam measurement reports from a particular scheduled entity, where each beam measurement report provides beam information related to communication between the particular scheduled entity and one of a plurality of transmitting wireless nodes. In this example, the relay wireless node may then forward the plurality of beam measurement reports to a scheduling entity for selection of respective serving downlink beams for communication between the transmitting wireless nodes and the particular scheduled entity. As yet another example, a scheduling entity may receive beam measurement reports from multiple relay wireless nodes, where one or more of the relay wireless nodes may be a transmitting wireless node in wireless communication with a scheduled entity that generated one of the beam measurement reports. In this example, the scheduling entity may jointly select respective serving downlink beams for communication between the transmitting wireless nodes and the scheduled entities utilizing all of the forwarded beam measurement reports.

In an aspect of the disclosure, wireless communication systems may support at least one network-controlled mechanism for beam management for uplink beams. Such support may be provided for various types of UE or IAB node antenna structures, such as omni-directional antennal panels/ sub-panels or directional antenna panels/sub-panels. To support uplink beam management, aperiodic uplink beam measurements may be triggered based on downlink beam measurement reports and/or in response to a request from a scheduled entity.

In some examples, when correspondence exists between uplink reference beams and downlink reference beams (e.g., the uplink and downlink channels are highly correlated), if the scheduling entity updates the serving downlink beam(s)

based on a received downlink beam measurement report from a scheduled entity, the scheduling entity may trigger the scheduled entity to transmit an aperiodic uplink beam reference signal, so that the serving uplink beam(s) may also be updated, if necessary. In other examples, the scheduled entity may explicitly request uplink resources for transmitting the uplink beam reference signal in the downlink beam measurement report. In either example, the scheduling entity may allocate/reserve the uplink resources for transmitting the aperiodic uplink beam reference signal and provide an indication of the uplink resources within downlink control information (DCI) to the scheduled entity. The scheduled entity may then utilize the uplink resources to transmit the aperiodic uplink beam reference signal, such as a Sounding Reference Signal (SRS), on a plurality of uplink reference beams.

In some examples, the scheduled entity may transmit a request for the uplink resources to transmit the uplink beam reference signal utilizing other types of uplink signaling within a physical uplink control channel (PUCCH) or a physical uplink shared channel (PUSCH). For example, the scheduling entity may reserve periodic PUCCH resources for the scheduled entity to transmit the request for uplink beam reference signal resources (e.g., as an on-off transmission). As another example, the scheduled entity may transmit the request for uplink beam reference signal resources within an uplink medium access control—control element (MAC-CE) transmitted over the PUSCH. In this example, the scheduled entity may first transmit a scheduling request to the scheduling entity to reserve the PUSCH resources for the MAC-CE. In another example, the scheduled entity may transmit the request for uplink beam reference signal resources within an uplink message during a random access channel (RACH) procedure (e.g., within Message 3 of the RACH procedure).

In an aspect of the disclosure, within an IAB network, a first IAB node operating as a scheduling entity may perform uplink beam measurements on uplink reference beams transmitted by a second IAB node operating as a scheduled entity, and then transmit an uplink beam measurement report to the second IAB node. In some examples, the first and second IAB nodes may switch roles, where the first IAB node becomes the scheduled entity and the second IAB node becomes the scheduling entity. By transmitting the uplink beam measurement report to the second IAB node, the second IAB node may operate as the scheduling entity without requiring new beam measurements. In other examples, the second IAB node may utilize the uplink beam measurement report to select serving downlink beams for other scheduled entities (e.g., UEs or other IAB nodes) in wireless communication with the second IAB node. The second IAB node may further utilize the uplink beam measurement report to schedule downlink transmissions to the other scheduled entities on the selected serving downlink beams at the same time as uplink transmissions to the first IAB node on the selected serving uplink beams utilizing spatial multiplexing.

In an aspect of the disclosure, the scheduling entity may receive a downlink beam measurement report from a scheduled entity and may further measure a respective uplink beam quality measurement for each of a plurality of uplink reference beams received from the scheduled entity. Examples of beam quality measurements may include, but are not limited to, the received power or the signal-to-noise ratio (SNR). The scheduling entity may then jointly select the serving uplink and downlink beams based on both the received downlink beam measurement report and uplink beam quality measurements when correspondence between the uplink and downlink beams exists.

While aspects and features are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
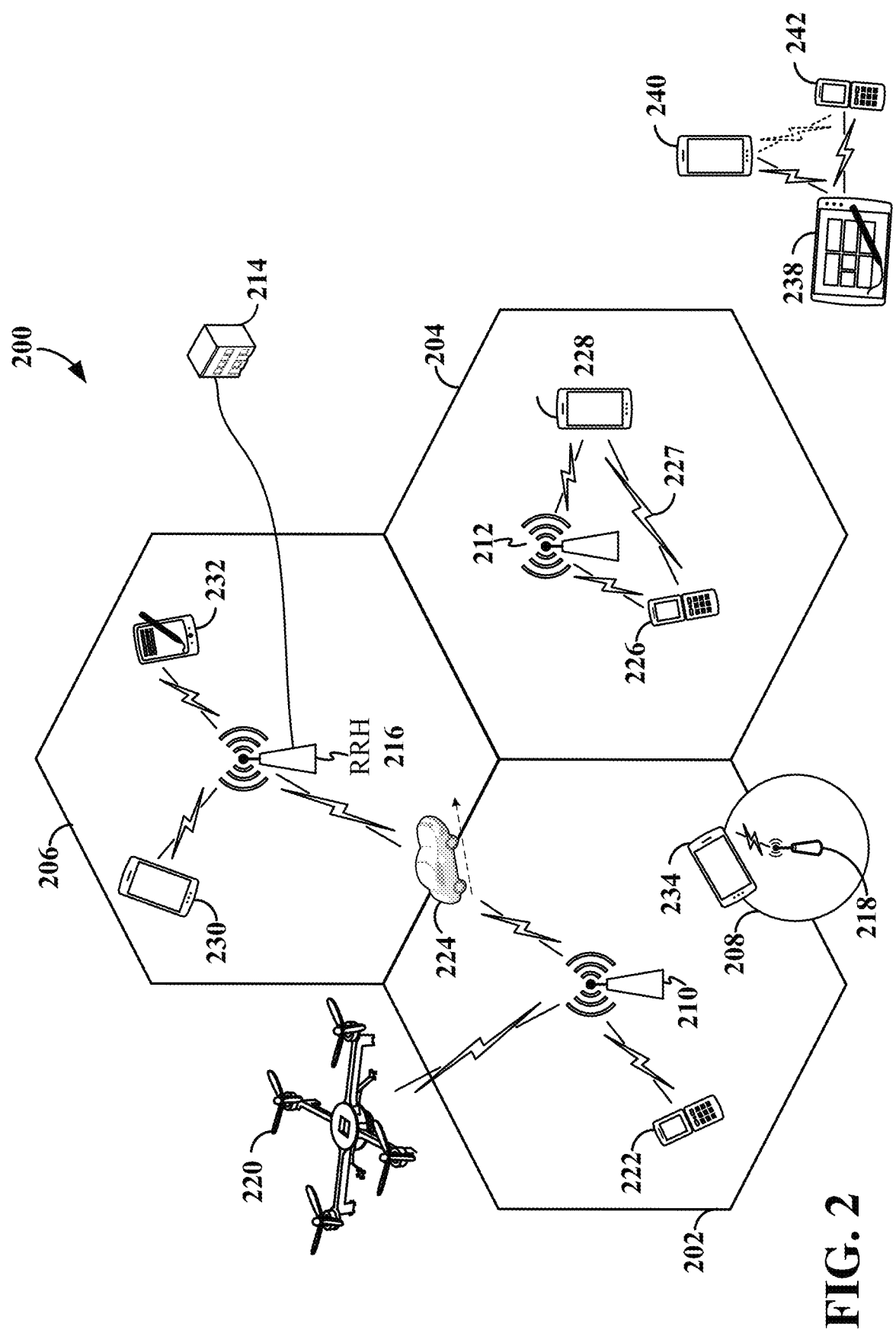
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
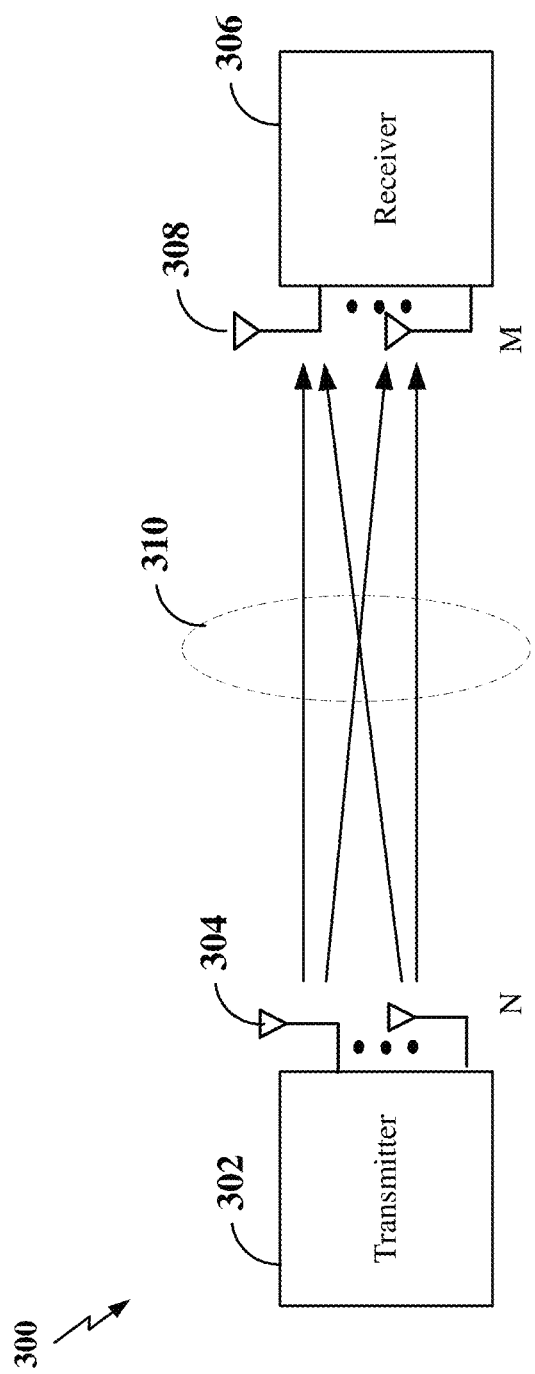
FIG. 3 is a block diagram illustrating a wireless communication system supporting beamforming and/or multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting beamforming and/or MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
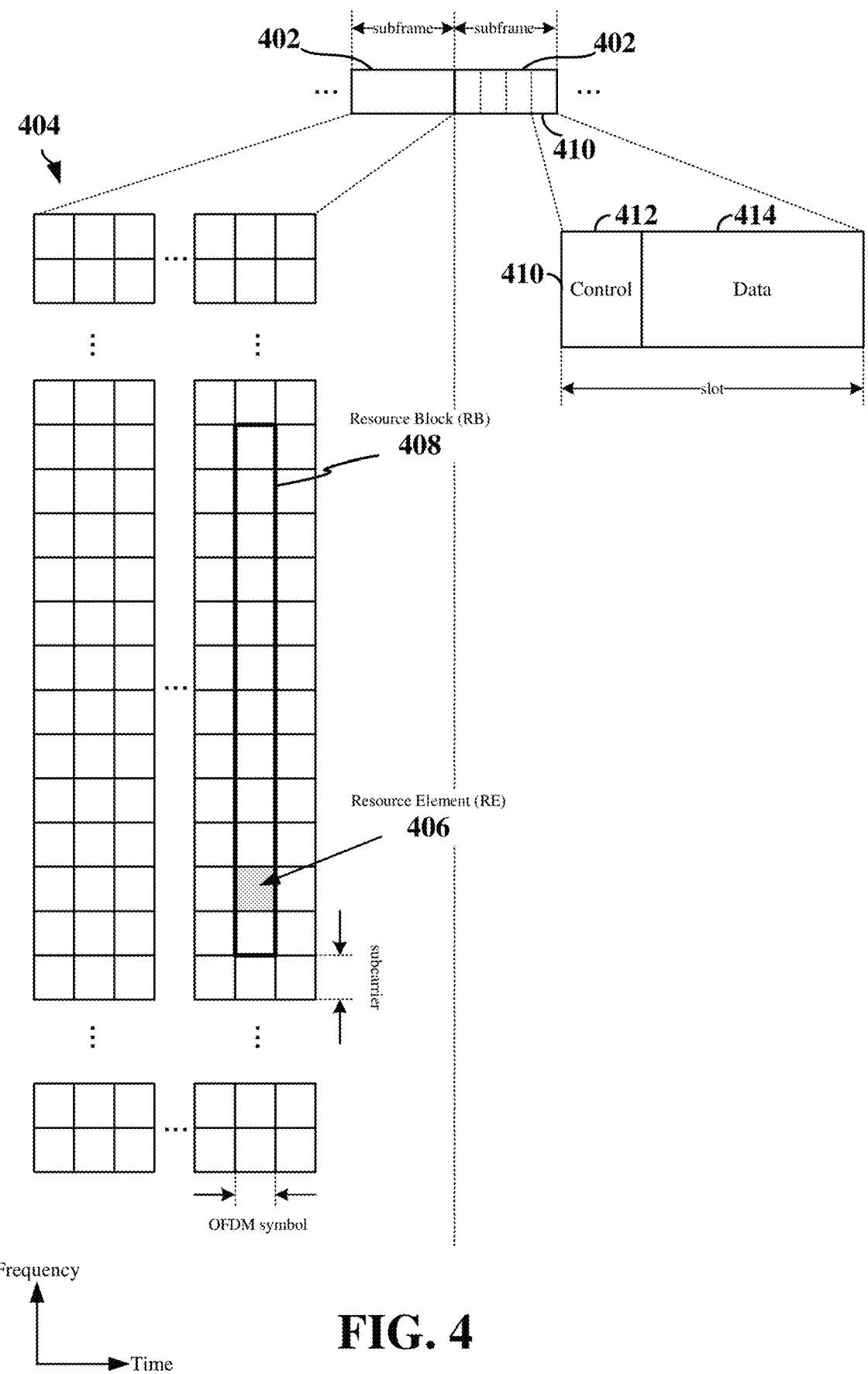
FIG. 4 is a schematic diagram illustrating organization of wireless resources in an air interface utilizing orthogonal frequency divisional multiplexing (OFDM).

Referring now to FIG. 4, an expanded view of an exemplary DL subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information may include a scheduling request (SR), i.e., request for the scheduling entity 108 to schedule uplink transmissions. Here, in response to the SR transmitted on the control channel, the scheduling entity 108 may transmit downlink control information that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In 5G New Radio (NR) systems, particularly for above 6 GHz or mmWave systems, beamformed signals may be utilized for most downlink channels, including the PDCCH and PDSCH. In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the PUCCH and PUSCH.

Figure 5:
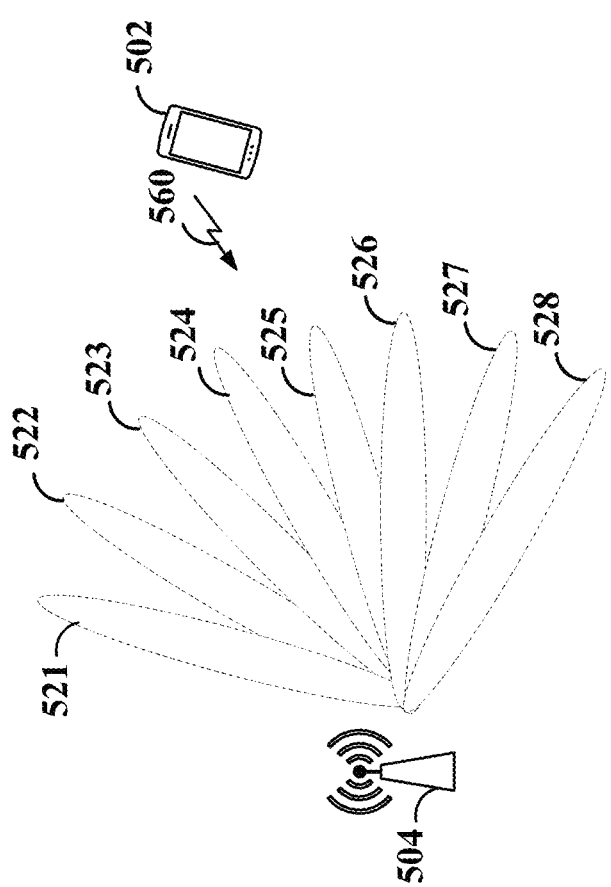
FIG. 5 is a schematic diagram illustrating an example of communication between a base station and a user equipment (UE) using beamforming.

FIG. 5 is a diagram illustrating communication between a base station (BS) 504, such as a gNB, and a UE 502 using downlink beamformed signals according to some aspects of the disclosure. The base station 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol or time may not be adjacent to one another. In some examples, the BS 504 may transmit more or less beams distributed in all directions (e.g., 360 degrees).

In one example, a beam set may contain eight different beams. For example, FIG. 5 illustrates eight beams 521, 522, 523, 524, 525, 526, 527, 528 for eight directions. In some aspects of the disclosure, the base station (BS) 504 may be configured to transmit at least one of the beams 521, 522, 523, 524, 525, 526, 527, 528 toward the UE 502. For example, the BS 504 can sweep or transmit in eight directions during a synchronization slot. The BS 504 may transmit a reference beam for each beam in the different beam directions during the synchronization slot. Each reference beam may include a reference signal, such as a synchronization signal (SS) or a channel state information reference signal (CSI-RS), and thus may also be referred to herein as a beam reference signal (BRS). Transmission of the BRS may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The UE 502 can use the BRS to identify the beam and perform received power measurements on the BRS. The UE 502 may then determine or select a set of one or more candidate beams in the beam set that are strongest (e.g., have the strongest signal) or are preferable, and therefore, may provide the highest gain. For example, the UE 502 may determine that beams 524 and 525 carrying a BRS are strongest or preferable. In some examples, the UE 502 may select the set of candidate beams by measuring values for a received power or received quality associated with each beam in the set of beams 521-528, comparing respective values to one another, and selecting the one or more candidate beams that correspond to the greatest, highest, or best value. For example, the UE 502 may measure the beam reference signal received power (BRSRP) on each beam 521-528 and compare the measured BRSRPs to select the candidate beam(s).

The UE 502 may transmit a beam measurement report 560 indicating the set of candidate beams 524 and 525 on which the UE 502 may receive information (e.g., control information and/or user data traffic) from the BS 504 with the highest gain. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI). In one example, the beam measurement report 560 may include a respective beam index, along with the BRSRP, of each candidate beam in the set of candidate beams 524 and 525. In other examples, the beam measurement report 560 may include the respective beam index and BRSRP of each beam 521-528. In this example, the BS 504 may determine the set of candidate beams 524 and 525.

In other examples, when the channel is reciprocal (e.g., the DL and UL channel qualities are the same), the BS 504 may derive the candidate beams for the UE 504 from UL measurements, such as by measuring the received power, quality, or other variable of a sounding reference signal (SRS) or other UL beam reference signal. In this example, the UE may not transmit the beam measurement report 560 to the BS 504.

The number of candidate beams may be predetermined or may be ascertained by comparing each of the measured values to a minimum threshold below which the beam would not be selected for inclusion in the candidate set. The BS 504 may select one or more of the candidate beams as downlink serving beams for use in transmitting unicast information (e.g., UE-specific control information and/or user data traffic) to the UE 504. In some examples, the BS 504 may select a pair of beams as a downlink beam pair link (BPL) based on the received beam measurement report 560.

Figure 6:
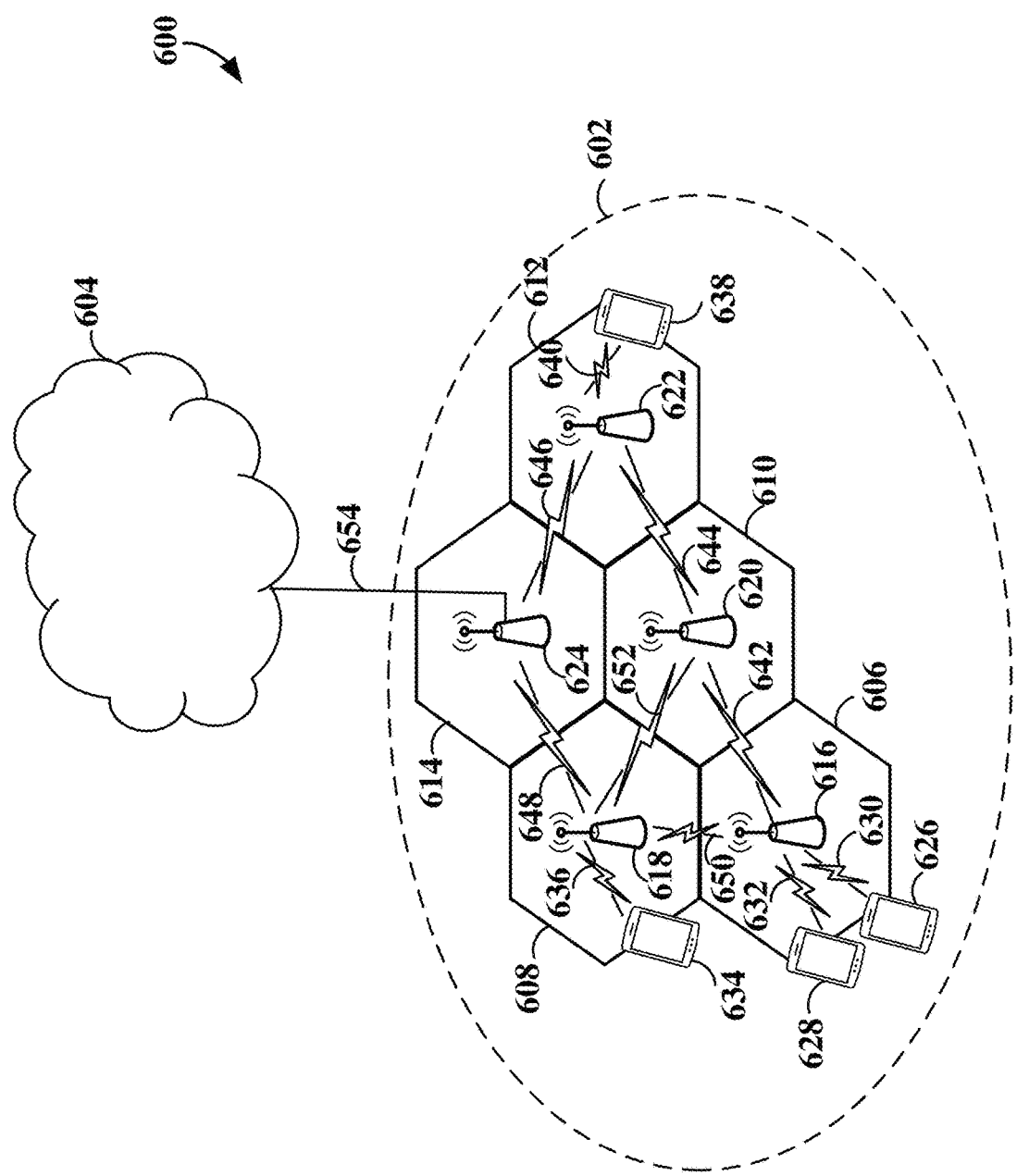
FIG. 6 is a schematic diagram providing a high-level illustration of one example of a network configuration including an Integrated-Access-Backhaul (IAB) network.

Beamforming may be utilized not only within an access network (e.g., between a base station and a UE), but also within an Integrated-Access-Backhaul (IAB) network. FIG. 6 is a schematic diagram providing a high-level illustration of one example of a network configuration 600 that may be utilized in some aspects of the disclosure. In this illustration, a communication network 602, such as an IAB network, is coupled to a remote network 604, such as a main backhaul network or mobile core network. In such an IAB network 602, the wireless spectrum may be used for both access links and backhaul links.

The IAB network 602 may be similar to the radio access network 200 shown in FIG. 2, in that the IAB network 602 may be divided into a number cells 606, 608, 610, 612, and 614, each of which may be served by a respective IAB node 616, 618, 620, 622, and 624. Each of the IAB nodes 616-624 may be an access point, base station (BS), eNB, gNB, or other node that utilizes wireless spectrum (e.g., the radio frequency (RF) spectrum) to support access for one or more UEs located within the cells 606-614 served by the IAB nodes. In the example shown in FIG. 6, IAB node 616 communicates with UEs 626 and 628 via wireless access links 630 and 632, IAB node 618 communicates with UE 634 via wireless access link 636, and IAB node 622 communicates with UE 638 via wireless access link 640.

The IAB nodes 616-624 are further interconnected via one or more wireless backhaul links 642, 644, 646, 648, 650, and 652. Each of the wireless backhaul links 642-652 may utilize the same wireless spectrum (e.g., the radio frequency (RF) spectrum) as the access links 630-640 to backhaul access traffic to/from the remote network 604. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 602. In the example shown in FIG. 6, IAB node 616 communicates with IAB node 620 via wireless backhaul link 642, IAB node 620 communicates with IAB node 622 via wireless backhaul link 644, IAB node 622 communicates with IAB node 624 via wireless backhaul link 646, IAB node 624 communicates with IAB node 618 via wireless backhaul link 648, IAB node 618 communicates with IAB node 616 via wireless backhaul link 650, and IAB node 618 communicates with IAB node 620 via wireless backhaul link 652. As shown in FIG. 6, each IAB node 616-624 may be connected via respective wireless backhaul links 642-652 to two or more other IAB nodes for robustness.

Some or all of the IAB nodes 616-624 may also be connected via wired backhaul links (e.g., fiber, coaxial cable, Ethernet, copper wires, etc.) and/or microwave backhaul links. Thus, the IAB network 602 may support both wired/microwave and wireless backhaul traffic. At least one of the IAB nodes (e.g., IAB node 624) may be a border IAB node that also provides a communication link 654 to the remote network 604. For example, the border IAB node 624 may include a wired (e.g., fiber, coaxial cable, Ethernet, copper wires), microwave, or other suitable link 654 to the remote network 604.

To facilitate wireless communication between the IAB nodes 616-624 and between the IAB nodes 616-624 and the UEs served by the IAB nodes 616-624, each IAB node 616-624 may include both access network functionality (ANF) and UE functionality (UEF) to allow each IAB node to operate as a scheduling entity and a scheduled entity. For example, the ANF enables an IAB node 616, 618, 620, 622, or 624 to operate as a scheduling entity to communicate with one or more UEs located within the cell 606, 608, 610, 612, or 614 served by the IAB node via respective access links. The ANF may further enable an IAB node 616-624 to operate as a scheduling entity to facilitate (e.g., schedule) communication between one or more other IAB nodes within the IAB network 602 via respective backhaul links. The UEF, on the other hand, may allow each IAB node 616-624 to also operate as a scheduled entity (e.g., as a UE) to communicate with one or more other IAB nodes within the IAB network 602 via the respective wireless backhaul links.

Thus, the combination of the UEF and ANF within each IAB node 616-624 enables the IAB nodes to utilize the same wireless spectrum (e.g., the radio frequency (RF) spectrum) to transmit access traffic to/from UEs and to then backhaul that access traffic to/from the remote network 604. For example, to backhaul access traffic to/from IAB node 618, the UEF within IAB node 618 may communicate with the ANF within IAB node 620 to transmit backhaul access traffic via wireless backhaul link 642, the UEF within IAB node 620 may communicate with the ANF within IAB node 622 to transmit the backhaul access traffic via wireless backhaul link 644, and the UEF within IAB node 622 may communicate with the ANF within IAB node 624 to transmit the backhaul access traffic via wireless backhaul link 646. In this example, IAB nodes 620 and 622 may each operate as both a scheduling entity and a scheduled entity to backhaul access traffic to/from IAB node 616. As such, communication between a pair of IAB nodes may be individually scheduled by one of the IAB nodes within the pair.

In other examples, an IAB node may schedule wireless backhaul communications between other pairs of IAB nodes. For example, IAB node 624 may operate as the scheduling entity for the IAB network 602, while IAB nodes 616, 620, and 622 each operate as a scheduled entity to backhaul access traffic to/from IAB node 616. In this example, IAB node 624 may schedule wireless backhaul communications between each of the pairs of IAB nodes (e.g., between IAB node 616 and IAB node 620, between IAB node 620 and IAB node 622, and between IAB node 622 and IAB node 624). As another example, IAB node 622 may operate as a scheduling entity to schedule wireless backhaul communications between IAB nodes 616 and 620 and also between IAB node 620 and IAB node 622. IAB node 622 may then operate as a scheduled entity to allow IAB node 624 to schedule wireless backhaul communications therebetween.

To mitigate path loss and/or extend communication range over the wireless access links 630, 632, 636, and 640 and/or wireless backhaul links 642-652, beamforming may be used to direct or concentrate a wireless signal to a desired direction. Various aspects of the present disclosure are directed to beam management within an IAB network 602 and/or within a wireless communication system, such as one specified under standards for a 5G or New Radio (NR) radio access network (e.g., the RAN 200 shown in FIG. 2).

Figure 7:
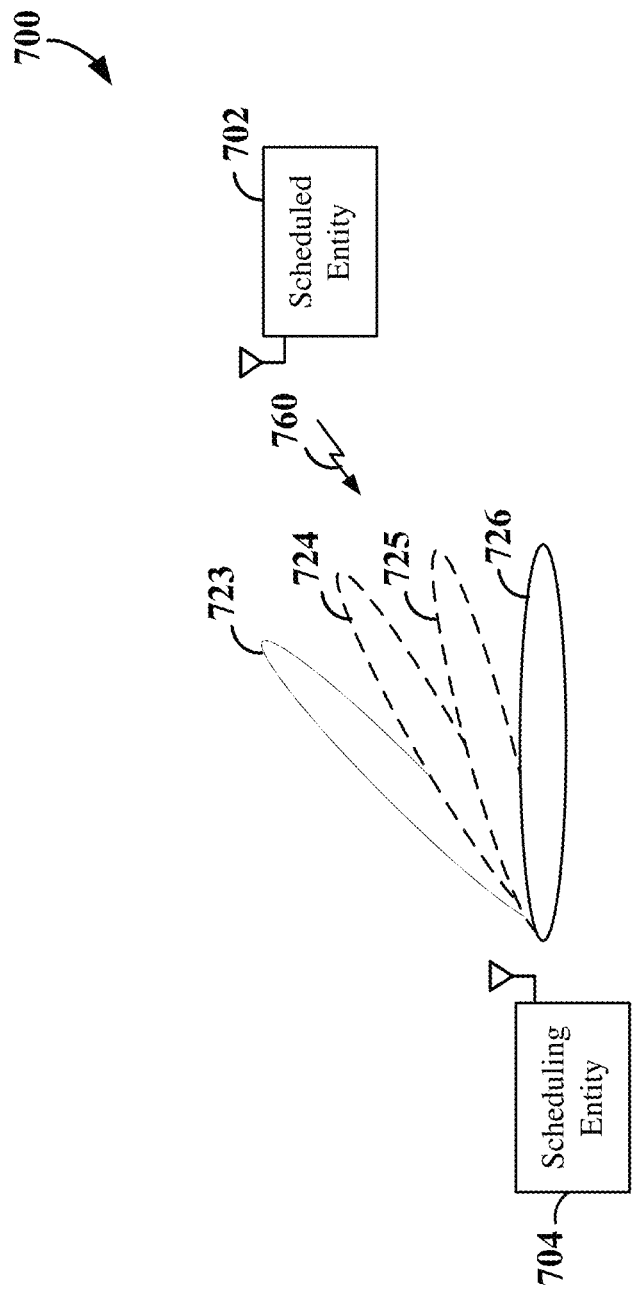
FIG. 7 is a schematic diagram illustrating communication between a scheduling entity and a scheduled entity using downlink beamformed signals selected based on angles of arrival/departure according to some aspects of the disclosure.

FIG. 7 is a diagram illustrating communication between a scheduling entity 704, such as a gNB, an IAB node, a first device-to-device (D2D) UE in a D2D network, or other type of scheduling entity, and a scheduled entity 702, such as a UE, IAB node, a second D2D UE, or other type of scheduled entity, in a wireless communication network 700 using downlink beamformed signals selected based on a beam management scheme according to some aspects of the disclosure. In the example shown in FIG. 7, the scheduled entity 702 has identified a set of candidate beams 723, 724, 725, and 726 on which the scheduled entity 702 may receive communications from the scheduling entity 704 with high gain. In some examples, the scheduled entity 702 may identify the candidate beams 723-726 by measuring beam quality information, e.g., beam reference signal received power (BRSRP) and/or received signal strength indicator (RSSI), on each reference beam (e.g., reference beams 521-528 shown in FIG. 5, where candidate beams 723-726 may correspond to reference beams 523-526) and comparing the measured BRSRPs and/or RSSI to select the candidate beams 723-726 with the highest BRSRP and/or RSSI.

The scheduled entity 702 may then transmit a beam measurement report 760 indicating the set of candidate beams 723-726 to the scheduling entity 704. In one example, the beam measurement report 760 may include a respective beam index, along with the BRSRP and/or RSSI, of each candidate beam in the set of candidate beams 723-726. In other examples, the beam measurement report 760 may include the respective beam index and BRSRP and/or RSSI of each reference beam. In this example, the scheduling entity 704 may determine the set of candidate beams 723-726. From the set of candidate beams 723-726, the scheduling entity 704 or the scheduled entity 702 may select one or more serving downlink beams for the scheduling entity 704 to transmit downlink control information and/or downlink user data traffic to the scheduled entity 702.

In some examples, a pair of serving downlink beams may selected as a downlink beam pair link (BPL) based on the beam measurement report 760. For example, the two candidate beams with the highest BRSRP may be selected as the downlink BPL. In some examples, the scheduled entity 702 may measure the BRSRP and/or the received signal strength for different BPLs, and may calculate a difference in the measured values. For instance, when measuring the BRSRP for each beam, the scheduled entity 702 may further calculate a difference between, for example, a first BRSRP value for a first beam and a second BRSRP value for a second beam, and include the difference in BRSRP in the beam measurement report 760. Additionally or alternatively, the scheduling entity 704 may likewise calculate a difference between received signal strengths or BRSRPs of the candidate beams 723-726.

However, if the two selected candidate beams have angles of arrival/departure that are close to one another, the BPL may be susceptible to increased path loss as surrounding objects move into the beam paths. Therefore, in some aspects of the disclosure, the scheduled entity 702 may obtain and include beam angle information of at least the candidate beams 723-726 within the beam measurement report 760. The beam angle information may include, for example, the angle of arrival (AoA) and/or angle of departure (AoD) of each of the candidate beams, the angular difference of arrival (ADoA) and/or angular difference of departure (ADoD) between respective pairs of candidate beams, and/or temporal information, such as the time of arrival (ToA), and/or the time of departure (ToD) of each of the candidate beams. Other temporal information may include, for example, the time difference of arrival (TDoA) and/or time difference of departure (TDoD) between respective pairs of candidate beams.

For example, the scheduled entity 702 may measure the angles of arrival/departure of each of the reference beams. The respective angles of arrival/departure may be determined by measuring the angle of incidence at which each reference beam arrives at the scheduled entity 702. For example, the scheduled entity 702 may receive a reference beam on multiple elements of antenna array and then calculate the time difference of arrival (TDoA) between the elements of an antenna by measuring the difference in the received phase of the beam at each element. The measured TDoA between the antenna elements may then be converted into a measure of the angle of arrival/departure of the reference beam. In some examples, the angles of departure may be determined as the direction of the corresponding transmit beams, as selected by scheduled entity. For example, the scheduled entity may select the directions of the transmit beams based on angle of arrivals of the receive beams under the assumption that the channel is reciprocal.

The scheduling entity 704 may utilize the beam angle information, together with the beam quality information (e.g., the BRSRPs and/or RSSIs), of each of the candidate beams 723-726 to select the serving downlink beams for the scheduled entity 702. For example, the scheduling entity 704 may select a pair of candidate beams 723 and 726 having a maximum separation between the angles of arrival/departure as the serving downlink BPL to provide increased resistance to sudden blockage from surrounding moving objects. In other examples, the scheduled entity 702 may utilize the beam angle information, together with the beam quality information to select the BPL for the scheduled entity and may provide the selected BPL to the scheduling entity 704 in the beam measurement report 760.

In addition, the scheduling entity 704 or scheduled entity 702 may utilize the beam angle information to identify obstructions to the one or more channels associated with the wireless link between the scheduled entity 702 and the scheduling entity 704. For example, if a calculated time difference between a ToD and a ToA associated with a beam of the set of candidate beams exceeds a preconfigured or comparative threshold, the scheduling entity 704 or scheduled entity 702 may determine an obstruction within the direction associated with the respective beam, and forgo electing the beam as part of the selected BPL. Additionally, each of the one or more temporal durations may aid in measuring the difference in the received phase of each beam of the set of candidate beams Based at least in part on the measured difference, the scheduling entity 704 or scheduled entity 702 may identify a BPL containing a pair of candidate beams satisfying a temporal disparity or one or more temporal values.

The beam angle information may further be utilized by the scheduling entity 704 to perform additional operations. In some examples, the beam angle information may be utilized to determine a location of the scheduled entity 702. In other examples, the scheduling entity 704 may utilize the beam angle information to determine a beam sweep configuration including one or more beam directions, a beamforming configuration (e.g., analog or digital beam-forming), a temporal periodicity, and/or a resource allocation. Furthermore, the scheduling entity 704 may evaluate the beam angle information to determine a mobility management procedure for the scheduled entity 702. For example, the temporal information (ToA, ToD, TDoA, TDoD) associated with the set of candidate beams may be utilized to determine a handover timing, a handover locale (e.g., alternative scheduling entity), a beam-forming configuration, and a resource allocation for a handover configuration of the scheduled entity 702. In some cases, the scheduling entity 704 may perform a plurality of sequential beamformed transmissions directed to the scheduled entity 702. The beamformed transmissions may be consecutive, or separated by a temporal periodicity.

Additionally or alternatively, in examples in which the scheduled entity 702 is an IAB node, temporal information (ToA, ToD, TDoA, TDoD) associated with the beam measurement report 760 received from the scheduled entity 702 may be utilized by the scheduling entity 704 together with one or more additional values associated with cached beam measurement reports of the backhaul network. The cached beam management reports may be stored, for example, at a database (not shown) within the scheduling entity 704 or within the wireless communication network 700. Based at least in part on the beam angle information included in the received beam measurement report 760, and one or more cached reports, the scheduling entity 704 may implement one or more deep learning mechanisms for mapping the mesh topology including the scheduled entity 702 and the scheduling entity 704. For example, a support vector machine (SVM), neural network, naïve bayes classifier, or the like may be trained according to beam angle information included in one or more beam measurement reports, including beam measurement report 760 for mapping an environment of a backhaul network. The mapping may include identification of obstructions and relative locations of at least additional wireless nodes (e.g., other UEs, D2D nodes, gNBs, and/or IAB nodes) within the backhaul network.

Figure 8:
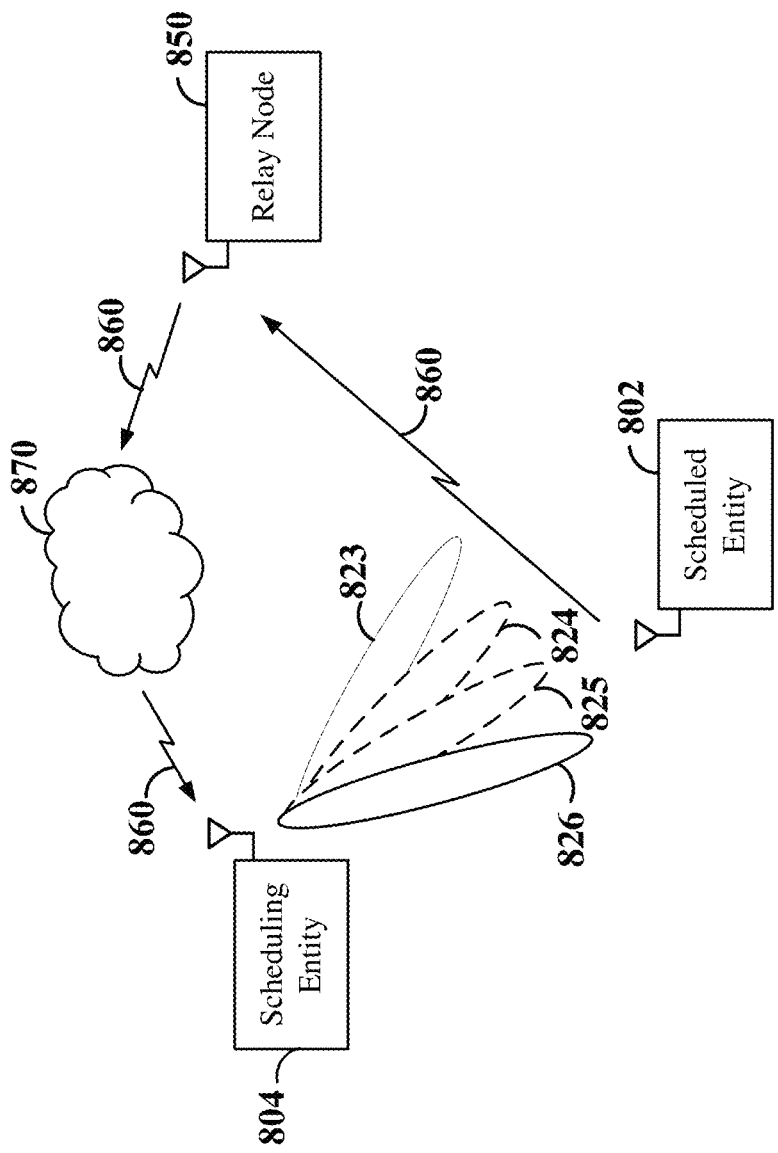
FIG. 8 is a diagram illustrating communication between a scheduling entity and a scheduled entity using downlink beamformed signals selected based on a beam management scheme according to some aspects of the disclosure.

FIG. 8 is a diagram illustrating communication between a scheduling entity 804, such as a gNB, an IAB node, a first D2D UE, or other type of scheduling entity, and a scheduled entity 802, such as a UE, an IAB node, a second D2D UE, or other type of scheduled entity, using downlink beamformed signals selected based on another beam management scheme according to some aspects of the disclosure. In the example shown in FIG. 8, the scheduled entity 802 has identified a set of candidate beams 823, 824, 825, and 826 on which the scheduled entity 802 may receive communications from the scheduling entity 804 with high gain. In some examples, the scheduled entity 802 may identify the candidate beams 823-826 by measuring beam quality information, e.g., the beam reference signal received power (BRSRP) and/or RSSI, on each reference beam (e.g., reference beams 521-528 shown in FIG. 5) and comparing the measured BRSRPs to select the candidate beams 823-826 with the highest BRSRP. The scheduled entity 802 may further measure beam angle information related to at least the candidate beams 823-826.

The scheduled entity 802 may then generate a beam measurement report 860 including the set of candidate beams 823-826 and the beam angle information for transmission to the scheduling entity 804. In one example, the beam measurement report 860 may include a respective beam index, along with the BRSRP and/or RSSI, of each candidate beam in the set of candidate beams 823-826. In other examples, the beam measurement report 860 may include the respective beam index and BRSRP and/or RSSI of each reference beam. In this example, the scheduling entity 804 may determine the set of candidate beams 823-826. From the set of candidate beams 823-826 and the beam angle information, the scheduling entity 804 or scheduled entity 802 may select one or more serving downlink beams for the scheduling entity 804 to transmit downlink control information and/or downlink user data traffic to the scheduled entity 802.

In the example shown in FIG. 8, instead of transmitting the beam measurement report 860 directly to the scheduling entity 804, the scheduled entity 802 may instead forward the beam measurement report 860 to a relay wireless node 850. The relay wireless node 850 may be, for example, an IAB node or other base station in wireless communication with the scheduled entity 802. The relay wireless node 850 may then forward the beam measurement report 860 directly to the scheduling entity 804 or indirectly to the scheduling entity 804 via a relay network 870 (e.g., an IAB network including one or more additional relay wireless nodes), the latter illustrated in FIG. 8. In some examples, the relay wireless node 850 itself and/or the relay network 870 may support two or more different radio access technologies (RATs) to forward the beam measurement report 860 to the scheduling entity 804. As an example, the scheduling entity 804 may support multiple RATs on the downlink, but only one RAT on the uplink. If the scheduled entity 802 does not support the uplink RAT of the scheduling entity 804, the scheduled entity 802 may forward the beam measurement report 860 to a relay wireless node 850 that supports the uplink RAT of the scheduled entity 802 so that the beam measurement report 860 may be forwarded to the scheduling entity utilizing the uplink RAT of the scheduling entity 804 (either directly from the relay wireless node 850 or via the relay wireless network 870).

Figure 9:
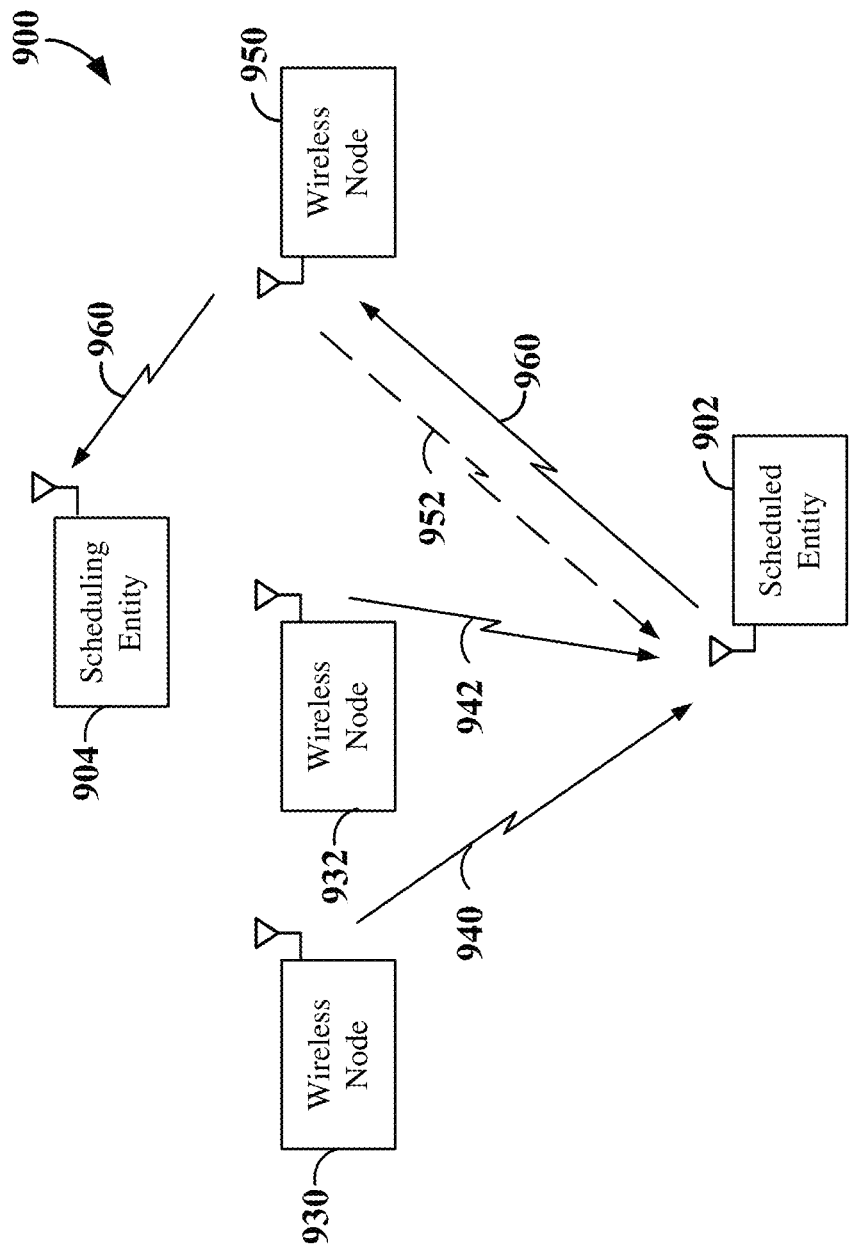
FIG. 9 is a diagram illustrating a communication network using downlink beamformed signals selected based on another beam management scheme according to some aspects of the disclosure.

FIG. 9 is a diagram illustrating a communication network 900 including a scheduling entity 904, a scheduled entity 902, and a plurality of wireless nodes 930 and 932, and 950. Each of the wireless nodes 930, 932, and 950, which may be gNB nodes, IAB nodes or other type of wireless nodes, may communicate with the scheduled entity 902, which may be a UE, an IAB node, or other type of scheduled entity, using respective downlink beamformed signals, generally illustrated at 940, 942, and 952, on serving downlink beam(s) that may be selected based on another beam management scheme according to some aspects of the disclosure.

The scheduled entity 902 may identify a respective set of candidate beams on which the scheduled entity 902 may receive communications from each of the wireless nodes 930, 932, and 950 with high gain. In some examples, the scheduled entity 902 may identify the candidate beams by measuring the beam reference signal received power (BRSRP) and/or RSSI on each reference beam transmitted by the wireless nodes 930, 932, and 950, and comparing the measured BRSRPs and/or RSSIs to select the candidate beams with the highest BRSRP and/or RSSI. The scheduled entity 902 may further measure beam angle information related to at least the respective sets of candidate beams.

In the example shown in FIG. 9, instead of the wireless nodes 930, 932, and 950 selecting their respective serving downlink beams 940, 942, and 952 from the respective candidate beam sets generated by the scheduled entity 902, the serving downlink beam selection may be performed by the scheduling entity 904. To enable the scheduling entity 904 to select the serving downlink beams for each of the wireless nodes 930, 932, and 950, the scheduled entity 902 may generate a beam measurement report 960 indicating the respective set of candidate beams and respective beam angle information for each of the wireless nodes 930, 932, and 950 for transmission to the scheduling entity 904. In some examples, the beam measurement report 960 may include a separate beam measurement report for each wireless node 930, 932, and 950. In other examples, all of the beam measurement information for all of the wireless nodes 930, 932, and 950 may be concatenated into a single beam measurement report 960.

The scheduled entity 902 may transmit the beam measurement report 960 directly to the scheduling entity 904 or indirectly via a relay wireless node (e.g., via wireless node 950), which in some examples may also be one of the wireless nodes having beam measurement information included in the beam measurement report 960. In other examples, the beam measurement report 960 may not include beam measurement information for the relay wireless node 950, and therefore, the scheduling entity 904 may not select serving downlink beam(s) for the relay wireless node 950. The relay wireless node 950 may then forward the beam measurement report 960 directly or indirectly to the scheduling entity 904.

In response to receiving the beam measurement report 960, the scheduling entity 904 may jointly select at least one respective serving downlink beam for the scheduled entity 902 to respectively communicate with each of the wireless nodes 930, 932, and 950. The serving downlink beams may be selected, for example, to avoid interference between the selected downlink beams. The scheduling entity 904 may then provide an indication of the respective selected serving downlink beam(s) to each of the wireless nodes 930 and 932 directly via wireless or wired links (not shown) or indirectly via the relay wireless node 950 (and possibly the scheduled entity 902) or other network nodes (not shown).

In some examples, the communication network 900 may be an IAB network, and each of the scheduling entity 904, the scheduled entity 902, and the wireless nodes 930, 892, and 950 may be IAB nodes. Thus, in the example shown in FIG. 9, the scheduled entity 902 may communicate with wireless nodes 930, 932, and 950 via respective wireless backhaul links. In addition, the wireless node 950 may communicate with the scheduling entity 904 via another wireless backhaul link. Since the scheduled entity 902 does not have a direct wireless backhaul link connection to the scheduling entity 904, the wireless node 950 may operate as a relay wireless node to forward the beam measurement report 960 to the scheduling entity 904 for selection of the respective serving downlink beam(s).

Figure 10:
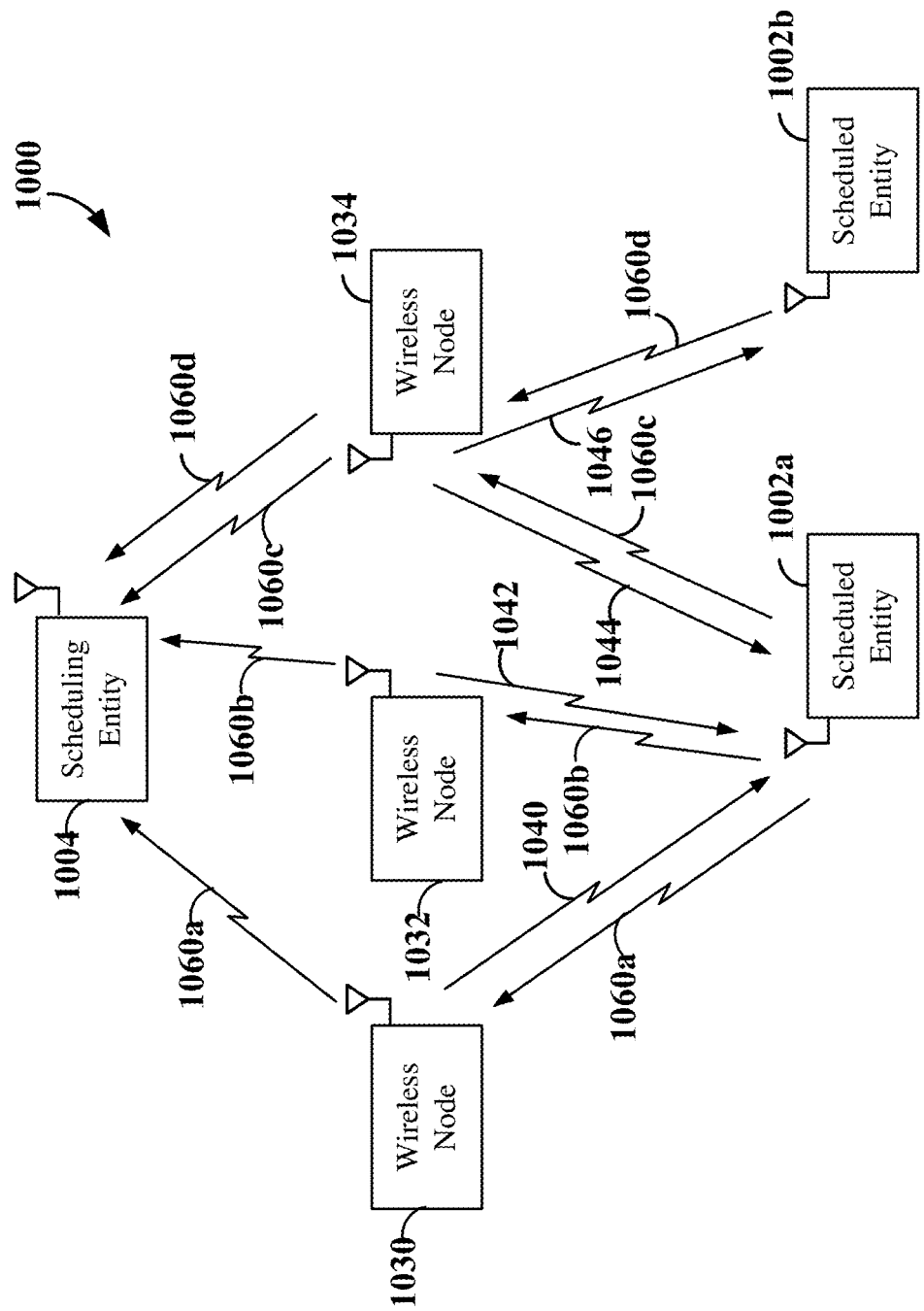
FIG. 10 is a diagram illustrating a communication network using downlink beamformed signals selected based on another beam management scheme according to some aspects of the disclosure.

FIG. 10 is a diagram illustrating a communication network 1000 including a scheduling entity 1004, a scheduled entity 1002a, and a plurality of wireless nodes 1030 and 1032, and 1034. Each of the wireless nodes 1030, 1032, and 1034, which may be gNB nodes, IAB nodes, or other types of wireless nodes, may communicate with the scheduled entity 1002a, which may be a UE, an IAB node, or other type of scheduled entity, using respective downlink beamformed signals, generally illustrated at 1040, 1042, and 1044, on respective serving downlink beam(s) that may be selected based on another beam management scheme according to some aspects of the disclosure. In addition, the wireless node 1034 may further communicate with another scheduled entity 1002b using downlink beamformed signals, generally illustrated at 1046, on serving downlink beam(s) that may be selected based on another beam management scheme.

The scheduled entity 1002a may identify a respective set of candidate beams on which the scheduled entity 1002a may receive communications from each of the wireless nodes 1030, 1032, and 1034 with high gain. In some examples, the scheduled entity 1002a may identify the candidate beams by measuring the beam reference signal received power (BRSRP) on each reference beam transmitted by the wireless nodes 1030, 1032, and 1034, and comparing the measured BRSRPs to select the respective candidate beams with the highest BRSRP. In addition, the scheduled entity 1002b may identify a set of candidate beams on which the scheduled entity 1002b may receive communications from the wireless node 1034 with high gain. The scheduled entity 1002 may further measure beam angle information related to at least the respective sets of candidate beams.

The scheduled entity 1002a may then generate respective beam measurement reports 1060a, 1060b, and 1060c, each indicating the respective set of candidate beams and respective beam angle information for each of the wireless nodes 1030, 1032, and 1034 for transmission to the scheduling entity 1004. In addition, the scheduled entity 1002b may generate a beam measurement report 1060d indicating the set of candidate beams for the wireless node 1034 for transmission to the scheduling entity 1004.

As in FIGS. 8 and 9, instead of the scheduled entities 1002a and 1002b transmitting the beam measurement reports 1060a-1060d directly to the scheduling entity 1004, the scheduled entities 1002a and 1002b may forward the beam measurement reports 1060a-1060d to the respective wireless nodes 1030, 1032, and 1034, which may operate as relay wireless nodes. The wireless nodes 1030, 1032, and 1034 may then forward the beam measurement reports 1060a-1060d directly or indirectly to the scheduling entity 1004.

In response to receiving the beam measurement reports 1060a-1060d, the scheduling entity 1004 may jointly select at least one respective serving downlink beam for the scheduled entity 1002a to respectively communicate with each of the wireless nodes 1030, 1032, and 1034. The scheduling entity 1004 may further select a serving downlink beam for the scheduled entity 1002b to communicate with the wireless node 1034. The serving downlink beams may be selected, for example, to avoid interference between the selected downlink beams. The scheduling entity 1004 may provide an indication of the respective selected serving downlink beam(s) directly or indirectly to each of the wireless nodes 1030, 1032, and 1034.

In some examples, the communication network 1000 may be an IAB network, and each of the scheduling entity 1004, the scheduled entities 1002a and 1002b, and the wireless nodes 1030, 1032, and 1034 may be IAB nodes. Thus, in the example shown in FIG. 9, the scheduled entity 1002a may communicate with wireless nodes 1030, 1032, and 1034 via respective wireless backhaul links. In addition, the scheduled entity 1002b may communicate with the wireless node 1034 via a wireless backhaul link Each of the wireless node 1030, 1032, and 1034 may further communicate with the scheduling entity 1004 via respective wireless backhaul links.

Figure 11:
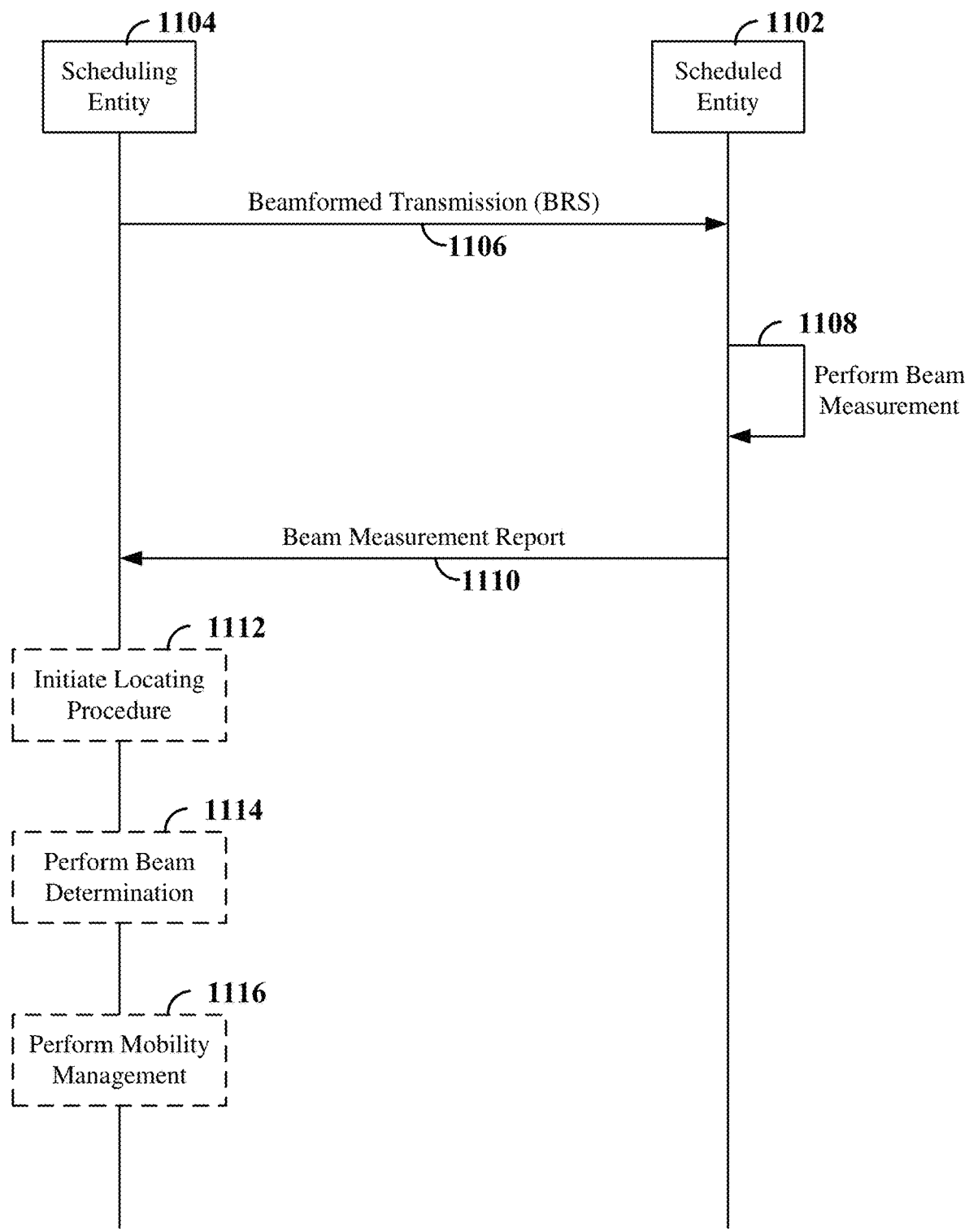
FIG. 11 is a diagram illustrating exemplary signaling and process flows in a communication network to provide enhanced beam management according to some aspects of the disclosure.

FIG. 11 is a diagram illustrating exemplary signaling and process flows between a scheduling entity 1104 and a scheduled entity 1102 to provide enhanced beam management according to some aspects of the disclosure. The scheduling entity 1104 may be, for example, a base station, such as a gNB, an IAB node, a first D2D UE, or any of the scheduling entities illustrated in FIGS. 1, 2, and 5-10. The scheduled entity 1102 may be, for example, a UE, an IAB node, a second D2D UE, or any of the scheduled entities illustrated in FIGS. 1, 2, and 5-10. In the following description, the signaling between the scheduling entity 1104 and scheduled entity 1102 may correspond to uplink or downlink signaling over wireless backhaul links and/or wireless access links Signaling between the scheduling entity 1104 and scheduled entity 1102 may be direct, or indirect, according to a mesh topology of the backhaul network.

At 1106, the scheduling entity 1104 may transmit a beamformed transmission to the scheduled entity 1102 via a plurality of reference beams (e.g., BRSs). The reference beams may span a beam sweep interval over a spatial duration of channel resources associated with the coupled link between the scheduling entity 1104 and the scheduled entity 1102. Each reference beam may be relatively offset in different beam directions during one or more synchronized slots of the transmission. Each reference beam may include a reference signal (e.g., SS, CSI-RS). The beamformed transmission may correspond to one or more periodic, semi-persistent, or aperiodic transmissions of the scheduling entity 1104.

At 1108, the scheduled entity 1102 may receive the beamformed transmission, and decode and evaluate the one or more reference beams of the transmission. In some examples, the scheduled entity may measure received signal power and/or received signal quality for each reference beam. The scheduled entity 1102 may then identify one or more candidate beams from the reference beams by comparing the respective signal power or signal quality values associated with each beam. Additionally or alternatively, the scheduled entity 1102 may measure the AoA and/or the AoD as well as the ToA and/or ToD associated with each reference beam or each candidate beam selected from the reference beams. In some examples, in accordance with at least one of the calculated signal power and/or signal quality, angular values (e.g., AoA, AoD, ADoA, ADoD), and temporal values (e.g., ToA, ToD, TDoA, TDoD) of the candidate beams, the scheduled entity 1102 may further identify a beam pair link (BPL). The pair of beams corresponding to the BPL may be within a single beamformed transmission or corresponding to separate timing points of multiple beamformed transmissions, preemptive to performing beam measurement.

At 1110, the scheduled entity 1102 may then transmit a beam measurement report to the scheduling entity 1104 indicating the set of candidate beams and respective beam angle information. The beam measurement report may further include the identified BPL. In some examples, the scheduled entity 1102 may transmit beam measurement report periodically as configured by RRC signaling. In other examples, the scheduled entity may transmit the beam measurement report semi-persistently according to an RRC configuration, and activated according to a MAC-CE indication, for example, via one or more subheaders of a received MAC protocol data unit (PDU). The scheduled entity 1102 may further transmit the beam measurement report aperiodically according to a control information (e.g., DCI, uplink control information (UCI)) indication. Further, the scheduled entity 1102 may transmit the beam measurement report via broadcast signaling within a master information block (MIB) or system information block (SIB) or via data signaling over physical layer resources.

The scheduling entity 1104 may receive the beam measurement report and utilize the beam measurement report in determining or maintaining at least one downlink beam (e.g., a BPL) for subsequent control and/or user data traffic transmission to the scheduled entity 1102. Additionally, the information contained within the beam measurement report may facilitate additional operations at the scheduling entity 1104. For example, at 1112, the scheduling entity 1104 may initiate a procedure to locate one or more wireless nodes within the mesh topology. Additionally, the scheduling entity 1104 may identify/locate one or more reflectors or obstructions within the mesh topology, including reflectors or obstructions affecting channel resources of the configured link between the scheduling entity 1104 and the scheduled entity 1102.

At 1114, the scheduling entity 1104 may further determine a beam sweep configuration including one or more beam directions, a beam-forming configuration for each of transmission and reception, and resources for beamformed transmission, both spatially and temporally. Determination of a beam sweep configuration may include beam determination for subsequent beamformed transmission over resources of the configured wireless link with the scheduled entity 1102.

At 1116, the scheduling entity 1104 may further determine a mobility management procedure associated with one or more coupled wireless nodes, including the scheduled entity 1102. Mobility management may include procedures for determining a handover timing, a handover locale (e.g., alternative scheduling entity), a beam-forming configuration, and a resource allocation for a handover configuration of each of the respective wireless nodes. In the provided description, processes 1112, 1114, and 1116 may be implemented in any sequential order in coordination with determining the selected beams of the set of candidate beams coordinated for the scheduled entity 1102.

In an aspect of the disclosure, NR wireless communication systems may support at least one network-controlled mechanism for beam management for uplink beams. Such support may be provided for various types of UE or IAB node antenna structures, such as omni-directional antennal panels/sub-panels or directional antenna panels/sub-panels.

Figure 12:
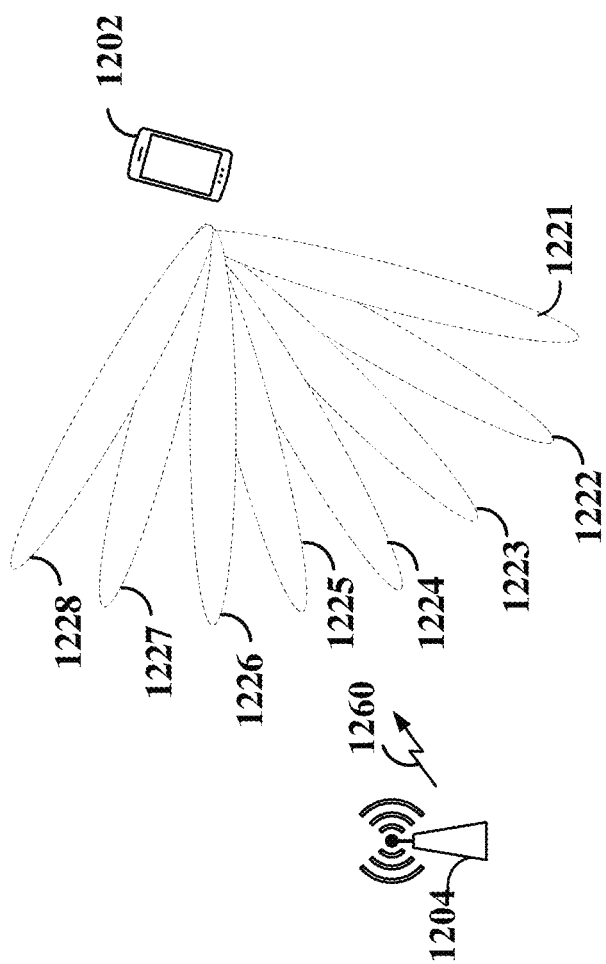
FIG. 12 is a diagram illustrating communication between a base station and a UE using uplink beamformed signals according to some aspects of the disclosure.

FIG. 12 is a diagram illustrating communication between a base station (BS) 1204, such as a gNB, and a UE 1202 using uplink beamformed signals according to some aspects of the disclosure. The base station 1204 may be any of the base stations or scheduling entities illustrated in FIGS. 1, 2, and 5-10, and the UE 1202 may be any of the UEs or scheduled entities illustrated in FIGS. 1, 2 and 5-10. It should be noted that while some beams are illustrated as adjacent to one another, such an arrangement may be different in different aspects. In some examples, beams transmitted during a same symbol or time may not be adjacent to one another. In some examples, the UE 1202 may transmit more or less beams distributed in all directions (e.g., 360 degrees).

In one example, a beam set may contain eight different beams. For example, FIG. 12 illustrates eight beams 1221, 1222, 1223, 1224, 1225, 1226, 1227, 1228 for eight directions. In some aspects of the disclosure, the UE 1202 may be configured to transmit at least one of the beams 1221-1228 toward the BS 1204. The UE 1202 may transmit an uplink reference beam for each beam in the different beam directions. Each uplink reference beam may include an uplink beam reference signal, such as a contention-based RACH (Random Access Channel) message or a Sounding Reference Signal (SRS). Transmission of a contention-based RACH message may occur during initial access and/or failure recovery utilizing RACH resources covering all directions that are periodically allocated by the BS 1204 and shared by all scheduled entities (UEs) in the cell. Transmission of a SRS may occur during connected mode and may be aperiodically triggered by the BS 1204, periodically scheduled by the BS 1204, or semi-persistently scheduled by the BS 1204.

The BS 1204 can use the uplink beam reference signal to identify the beam and perform received beam quality measurements on the uplink beam reference signal. Examples of beam quality measurements may include, but are not limited to, the received power or the signal-to-noise ratio (SNR). The BS 1204 may then determine or select a set of one or more serving uplink beams in the beam set that are preferable (e.g., have the highest beam quality), and therefore, may provide the highest gain. For example, the BS 1204 may determine that beams 1224 and 1225 are preferable for the UE 1202 to utilize as a serving uplink beam pair link (BPL). The BS 1204 may transmit an uplink beam selection signal 1260 indicating the selected serving uplink beams on which the UE 1202 should transmit control information and/or user data traffic to the BS 1204. In one example, the uplink beam selection signal 1260 may include a respective beam index of each selected serving uplink beam.

Figure 13:
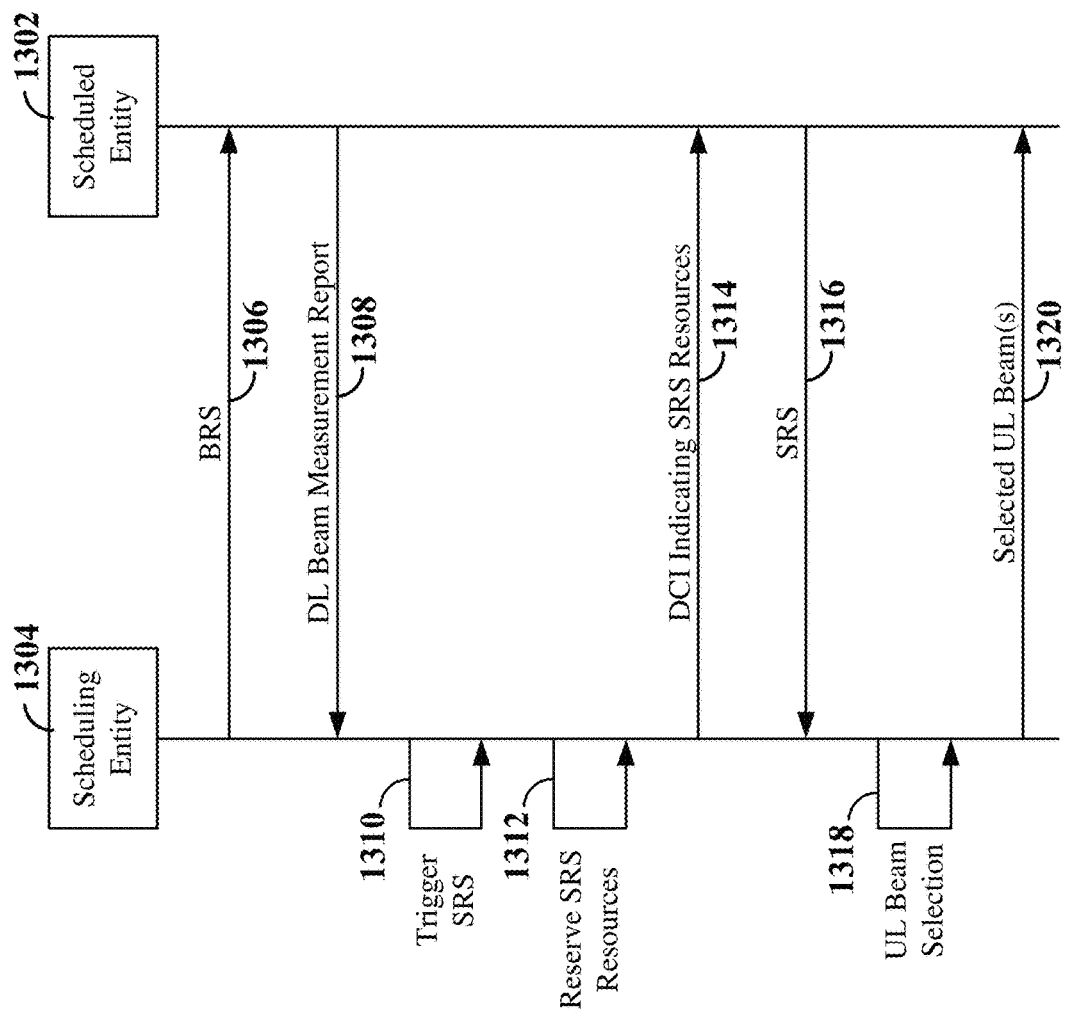
FIG. 13 is a diagram illustrating exemplary signaling between a scheduling entity and a scheduled entity to provide uplink beam management according to some aspects of the disclosure.

To support uplink beam management, aperiodic uplink beam measurements may be triggered based on downlink beam measurement reports and/or in response to a request from a scheduled entity. FIG. 13 is a diagram illustrating exemplary signaling between a scheduling entity 1304 and a scheduled entity 1302 to provide uplink beam management according to some aspects of the disclosure. The scheduling entity 1304 may be, for example, a base station, such as a gNB, an IAB node, a first D2D UE, or any of the scheduling entities illustrated in FIGS. 1, 2, and 5-11. The scheduled entity 1302 may be, for example, a UE, an IAB node, a second D2D UE, or any of the scheduled entities illustrated in FIGS. 1, 2, and 5-11.

At 1306, the scheduling entity 1304 may transmit a plurality of downlink reference beams, each carrying a downlink beam reference signal (BRS), such as a synchronization signal (SS) or a channel state information reference signal (CSI-RS), in a beam-sweeping configuration. At 1308, the scheduled entity 1302 may measure the beam reference signal received power (BRSRP) on each of the reference beams and generate and transmit a reference beam measurement report to the scheduling entity 1304. The reference beam measurement report may identify a set of candidate beams on which the scheduled entity 1302 may receive communications from the scheduling entity 1304 with high gain. For example, the reference beam measurement report may include a respective beam index, along with the BRSRP, of each candidate beam.

At 1310, the scheduling entity 1304 may trigger an aperiodic uplink beam reference signal (e.g., a Sounding Reference Signal (SRS) or other uplink beam reference signal) in response to the reference beam measurement report. In some examples, the scheduled entity 1302 may include a request for uplink resources for the aperiodic uplink beam reference signal in the reference beam measurement report. In this example, the reference beam measurement report may be modified to include a field for the scheduled entity 1302 to request the uplink resources. In other examples, if at least partial correspondence exists between the uplink and downlink beams and the reference beam measurement report indicates a change in the serving downlink beam(s) or serving downlink beam pair link(s), the scheduling entity 1304 may trigger the aperiodic uplink beam reference signal to facilitate an update in the serving uplink beam(s) or serving uplink beam pair link(s), if necessary.

At 1312, the scheduling entity 1304 may reserve uplink resources for the scheduled entity 1302 to transmit the aperiodic uplink beam reference signal. For example, the scheduling entity 1304 may reserve uplink resources for the scheduled entity 1302 to transmit a SRS or other uplink beam reference signal on a plurality of uplink reference beams in all directions. At 1314, the scheduling entity 1304 may transmit downlink control information (DCI) within a physical downlink control channel (PDCCH) indicating the uplink resources reserved for the aperiodic uplink beam reference signal to the scheduled entity 1302. At 1316, the scheduled entity 1302 may generate and transmit the aperiodic uplink beam reference signal on the reserved uplink resources. For example, the scheduled entity 1302 may transmit an aperiodic SRS on a plurality of uplink reference beams utilizing the uplink resources.

At 1318, the scheduling entity 1304 may measure a respective uplink beam quality measurement for each of the uplink reference beams and select one or more serving uplink beams based on the uplink beam quality measurements. For example, the scheduling entity 1304 may select the uplink reference beams providing the best channel quality (based on the uplink beam quality measurements) as the serving uplink beams. At 1320, the scheduling entity 1304 may transmit an uplink beam selection signal including an indication of the selected serving uplink beam(s) to the scheduled entity 1302.

Figure 14:
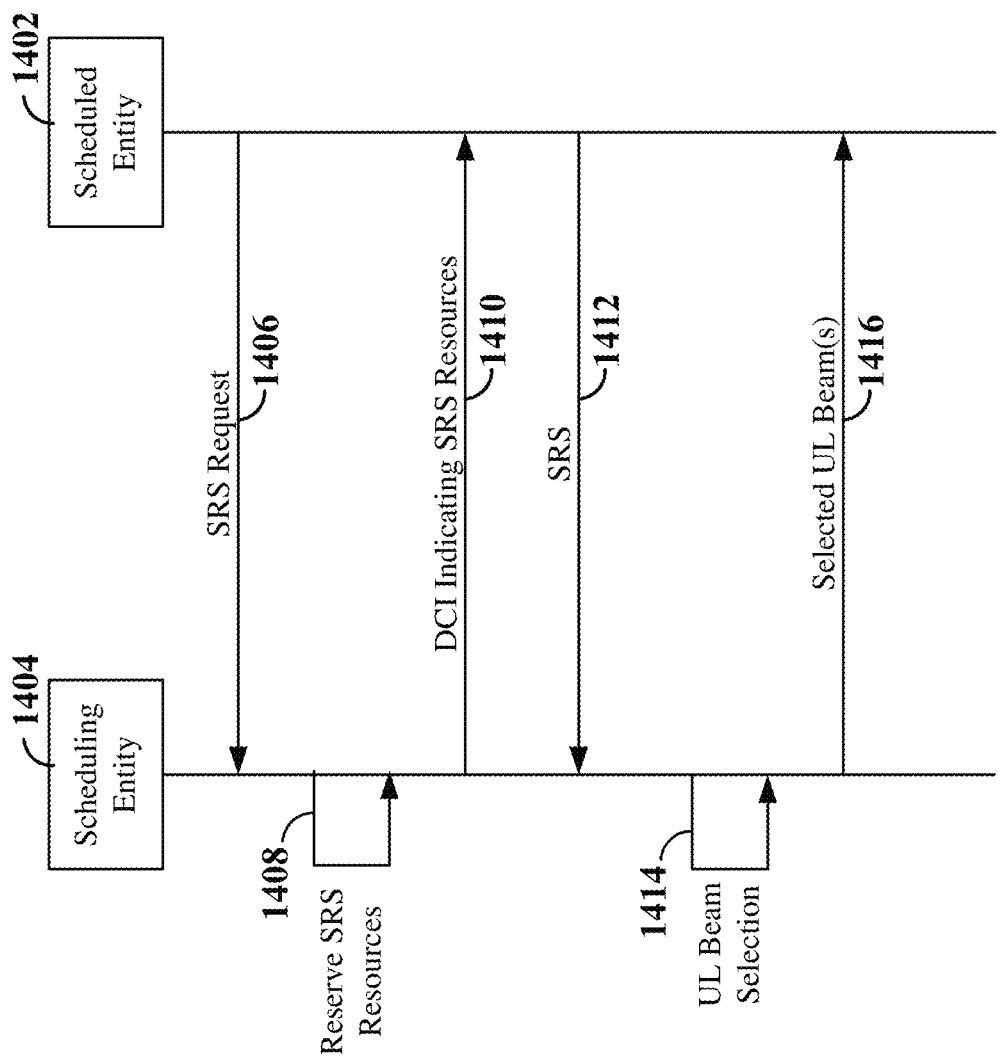
FIG. 14 is a diagram illustrating other exemplary signaling between a scheduling entity and a scheduled entity to provide uplink beam management according to some aspects of the disclosure.

FIG. 14 is a diagram illustrating other exemplary signaling between a scheduling entity 1404 and a scheduled entity 1402 to provide uplink beam management according to some aspects of the disclosure. The scheduling entity 1404 may be, for example, a base station, such as a gNB, an IAB node, a first D2D UE, or any of the scheduling entities illustrated in FIGS. 1, 2, and 4-11. The scheduled entity 1402 may be, for example, a UE, an IAB node, a second D2D UE, or any of the scheduled entities illustrated in FIGS. 1, 2, and 4-11.

At 1406, the scheduled entity 1402 may initiate an aperiodic uplink reference beam measurement by transmitting a request for uplink resources to transmit an aperiodic uplink beam reference signal to the scheduling entity 1404. The request for uplink resources may be transmitted through an uplink signaling message, which may be, for example, a physical layer uplink control signal or a medium access control (MAC) layer message transmitted over a user data traffic channel.

In some examples, the request for uplink resources may be transmitted within a physical uplink control channel (PUCCH). For example, the PUCCH may include PUCCH resources periodically reserved for the scheduled entity 1402 to transmit the request for uplink resources. The reserved resources may be utilized to transmit a single bit (e.g., turning the request "on" or "off"). Thus, the scheduled entity 1402 may only transmit the request (e.g., include a "1" within the PUCCH uplink request resources) when the scheduled entity 1402 determines that a change to the serving uplink beam(s) may be necessary.

A change in serving uplink beam(s) may be necessary, for example, if the scheduled entity 1402 detects that the current antenna subarray is close to a body part (e.g., fingers), which may cause the maximum permissible exposure (MPE) limit for mmWave frequencies to be exceeded. The scheduled entity 1402 may then transmit the request for uplink resources to transmit the aperiodic uplink beam reference signal to select a new/different antenna subarray.

In other examples, the request for uplink resources may be transmitted within a medium access control—control element (MAC-CE) transmitted over a physical uplink control channel (PUSCH). In some examples, if PUSCH resources are not available for the MAC-CE, the scheduled entity 1402 may transmit a scheduling request within a PUCCH to request PUSCH resources for the MAC-CE. In this example, the scheduling entity 1404 may transmit DCI within a PDCCH indicating the PUSCH resources reserved for the MAC-CE.

In other examples, the request for uplink resources may be transmitted within an uplink message transmitted during a random access channel (RACH) procedure. For example, the request for uplink resources may be transmitted within Message 3 of the RACH procedure. In any of the above examples, the request for uplink resources may be transmitted using the current serving uplink beam(s).

At 1408, the scheduling entity 1404 may reserve uplink resources for the scheduled entity 1402 to transmit the aperiodic uplink beam reference signal. For example, the scheduling entity 1404 may reserve uplink resources for the scheduled entity 1402 to transmit a SRS or other uplink beam reference signal on a plurality of uplink reference beams in all directions. At 1410, the scheduling entity 1404 may transmit downlink control information (DCI) within a physical downlink control channel (PDCCH) indicating the uplink resources reserved for the aperiodic uplink beam reference signal to the scheduled entity 1402. At 1412, the scheduled entity 1402 may generate and transmit the aperiodic uplink beam reference signal on the reserved uplink resources. For example, the scheduled entity 1402 may transmit an aperiodic SRS on a plurality of uplink reference beams utilizing the uplink resources.

At 1414, the scheduling entity 1404 may measure a respective uplink beam quality measurement for each of the uplink reference beams and select one or more serving uplink beams based on the uplink beam quality measurements. For example, the scheduling entity 1404 may select the uplink reference beams providing the best channel quality (based on the uplink beam quality measurements) as the serving uplink beams. At 1416, the scheduling entity 1404 may transmit an uplink beam selection signal including an indication of the selected serving uplink beam(s) to the scheduled entity 1402.

Figure 15:
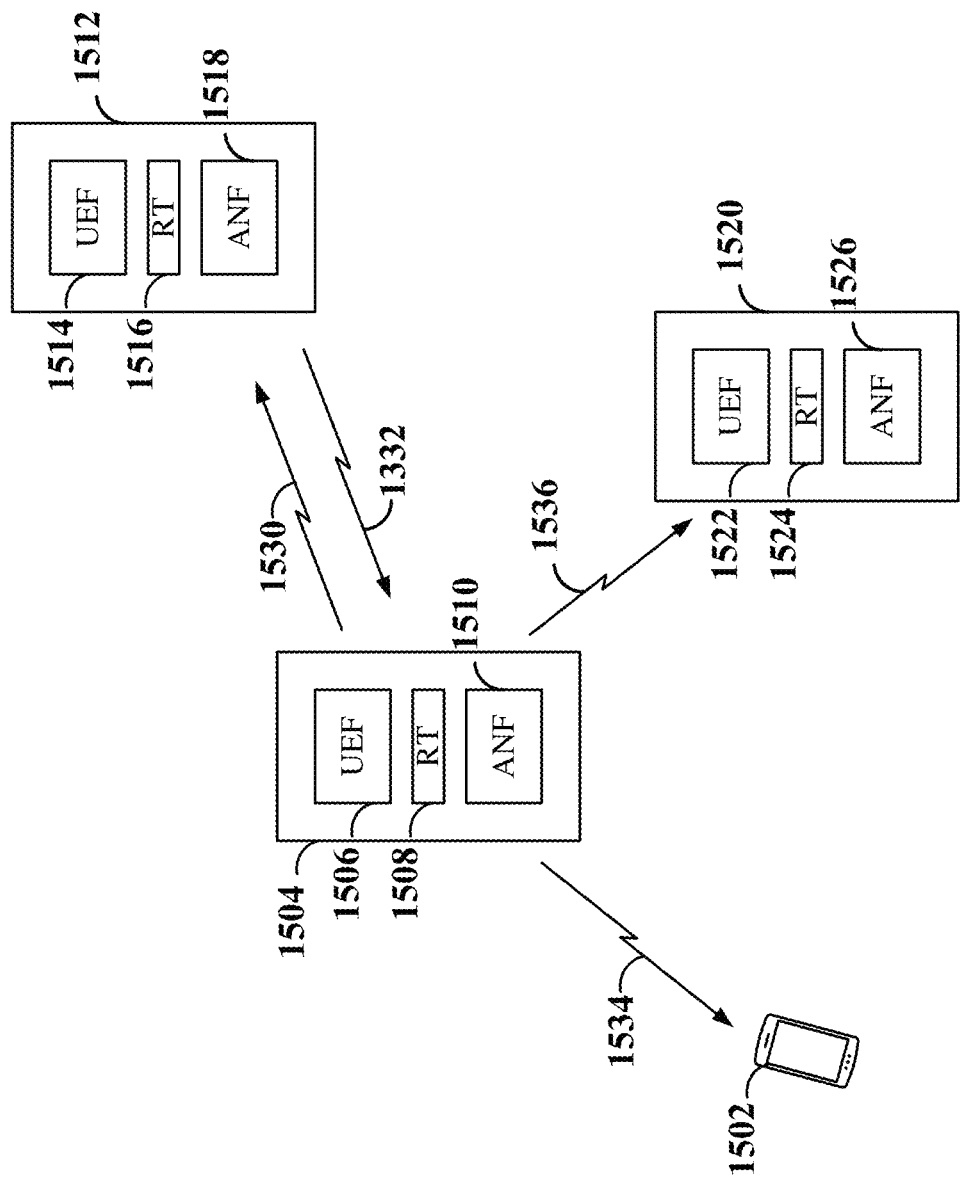
FIG. 15 is a diagram illustrating a plurality of IAB nodes communicating using beamformed signals selected using an uplink beam management scheme according to some aspects of the disclosure.

FIG. 15 is a diagram illustrating a plurality of IAB nodes 1504, 1512, and 1520 communicating using beamformed signals on beam(s) selected using an uplink beam management scheme according to some aspects of the disclosure. Each IAB node 1504, 1512, and 1520 includes user equipment functionality (UEF) 1506, 1514, and 1522, respectively, access network functionality (ANF) 1510, 1518, and 1526, respectively, and a radio transceiver (RT) 1508, 1516, and 1524, respectively, communicatively coupled to the respective UEF and ANF.

In the example shown in FIG. 13, IAB node 1504 is in wireless communication via respective wireless backhaul links with IAB nodes 1512 and 1520. IAB node 1504 is further in wireless communication with a UE 1502 via an access link IAB node 1504 is illustrated operating as a scheduling entity for both the UE 1502 and IAB node 1520. Thus, the ANF 1510 of IAB node 1504 is communicatively coupled to the RT 1508 to wirelessly communicate with both the UE 1502 and the UEF 1522 of IAB node 1520. However, IAB node 1504 is illustrated operating as a scheduled entity for IAB node 1512. Thus, the UEF 1506 of IAB node 1504 is communicatively coupled to the RT 1508 to wirelessly communicate with the ANF 1518 of IAB node 1512.

To select the serving uplink beam(s) utilized by IAB node 1504 to communicate with IAB node 1512, the UEF 1506 within IAB node 1504 may generate and transmit an uplink beam reference signal 1530. In some examples, the uplink beam reference signal 1530 may include an SRS transmitted on a plurality of uplink reference beams in a beam-sweeping configuration. The ANF 1518 within IAB node 1512 may then perform uplink beam measurements on the uplink reference beams transmitted by IAB node 1504. In various aspects of the disclosure, the ANF 1518 within IAB node 1512 may generate and transmit an uplink beam measurement report 1532 to the UEF 1506 within IAB node 1504. The uplink beam measurement report 1532 may include not only an indication of the selected serving uplink beam(s), but may also include a respective uplink beam quality measurement for at least a subset of the uplink reference beams.

By providing the uplink beam quality measurements to the scheduled IAB node 1504, the scheduled IAB node 1504 may utilize those uplink beam quality measurements in selecting other beams. In some examples, IAB nodes 1504 and 1512 may switch roles, where IAB node 1512 becomes the scheduled entity and IAB node 1504 becomes the scheduling entity. By transmitting the uplink beam measurement report to IAB node 1504, IAB node 1504 may operate as the scheduling entity without requiring new beam measurements. In other examples, IAB node 1504 may utilize the uplink beam measurement report to select serving downlink beam(s) 1534 for the UE 1502 and serving downlink beam(s) 1536 for IAB node 1520 to avoid interference between the selected serving uplink and downlink beams. IAB node 1504 may further utilize the uplink beam measurement report to schedule downlink transmissions to the UE 1502 and IAB node 1520 on the selected serving downlink beams at the same time as uplink transmissions to IAB node 1512 on the selected serving uplink beams utilizing spatial multiplexing.

Figure 16:
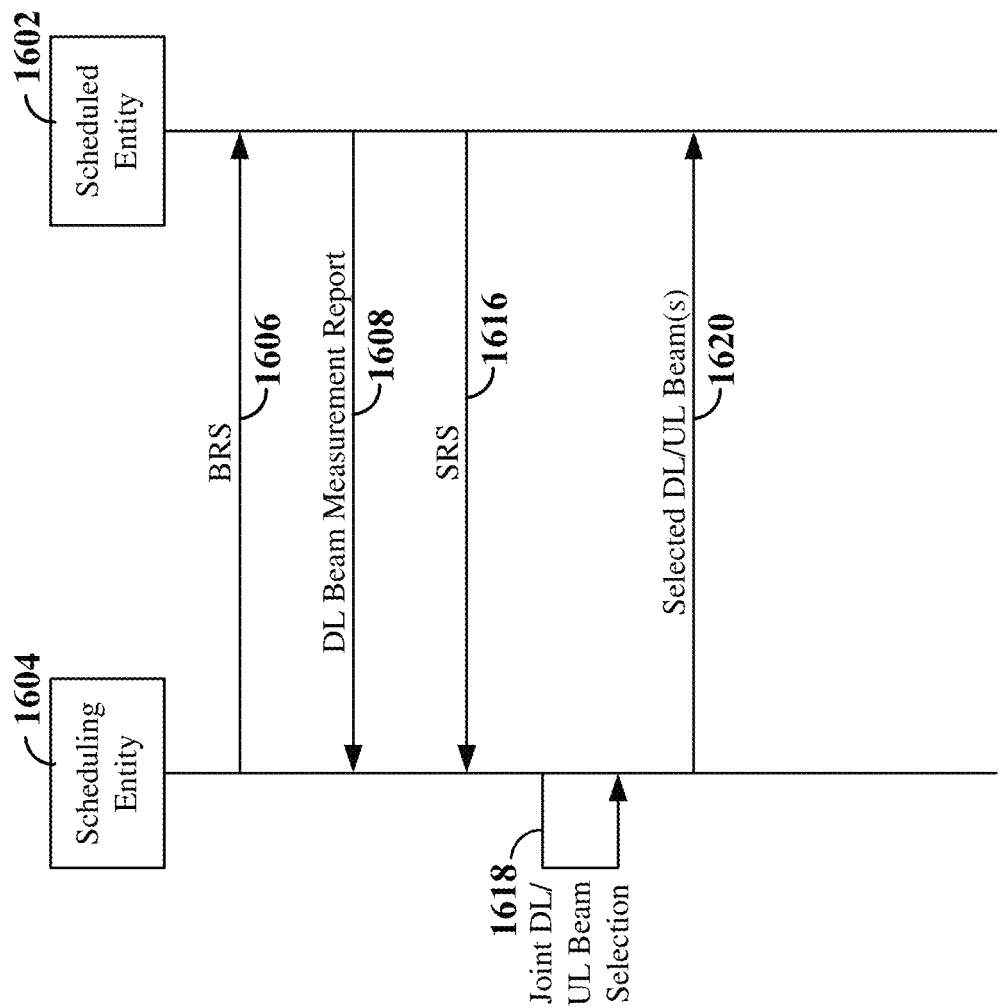
FIG. 16 is a diagram illustrating other exemplary signaling between a scheduling entity and a scheduled entity to provide uplink and downlink beam management according to some aspects of the disclosure.

FIG. 16 is a diagram illustrating other exemplary signaling between a scheduling entity 1604 and a scheduled entity 1602 to provide uplink and downlink beam management according to some aspects of the disclosure. The scheduling entity 1604 may be, for example, a base station, such as a gNB, an IAB node, a first D2D UE, or any of the scheduling entities illustrated in FIGS. 1, 2, and 5-13. The scheduled entity 1602 may be, for example, a UE, an IAB node, a second D2D UE, or any of the scheduled entities illustrated in FIGS. 1, 2, and 5-13.

At 1606, the scheduling entity 1604 may transmit a plurality of downlink reference beams, each carrying a downlink beam reference signal (BRS), such as a synchronization signal (SS) or a channel state information reference signal (CSI-RS), in a beam-sweeping configuration. At 1608, the scheduled entity 1602 may measure the beam reference signal received power (BRSRP) on each of the reference beams and generate and transmit a reference beam measurement report to the scheduling entity 1604. The reference beam measurement report may identify a set of candidate beams on which the scheduled entity 1602 may receive communications from the scheduling entity 1604 with high gain. For example, the reference beam measurement report may include a respective beam index, along with the BRSRP, of each candidate beam.

At 1610, the scheduled entity 1602 may generate and transmit an uplink beam reference signal. For example, the scheduled entity 1602 may transmit an SRS or other uplink beam reference signal on a plurality of uplink reference beams. The uplink beam reference signal may be periodically, aperiodically, or semi-statically scheduled by the scheduling entity 1604 or may be aperiodically scheduled in response to the downlink reference beam measurement report or a request by the scheduled entity 1602, as illustrated in FIGS. 13 and 14.

If the uplink and downlink beams are highly correlated, at 1612, the scheduling entity 1604 may measure a respective uplink beam quality measurement for each of the uplink reference beams and then jointly select one or more serving downlink beams and one or more serving uplink beams based on both the downlink reference beam measurement report and the uplink beam quality measurements. For example, the scheduling entity 1604 may analyze both the downlink reference beam measurement report and the uplink beam quality measurements and select the serving downlink beam(s) and serving uplink beam(s) that may provide the highest gain as a result of the correlation or correspondence between the uplink and downlink beams. As an example, if the uplink beam quality measurements of two uplink reference beams are similar, but the BRSRP of one of the correlated downlink reference beams is greater than the other correlated downlink beam, the scheduling entity 1604 may select the uplink reference beam correlated to the downlink reference beam having the higher BRSRP. As another example, the scheduling entity 1612 may use a weighted combination of the beam measurements of the correlated uplink/downlink reference beams based on a level of channel reciprocation between the downlink and uplink reference beams. At 1416, the scheduling entity 1604 may transmit an indication of the selected serving downlink beam(s) and serving uplink beam(s) to the scheduled entity 1602.

Figure 17:
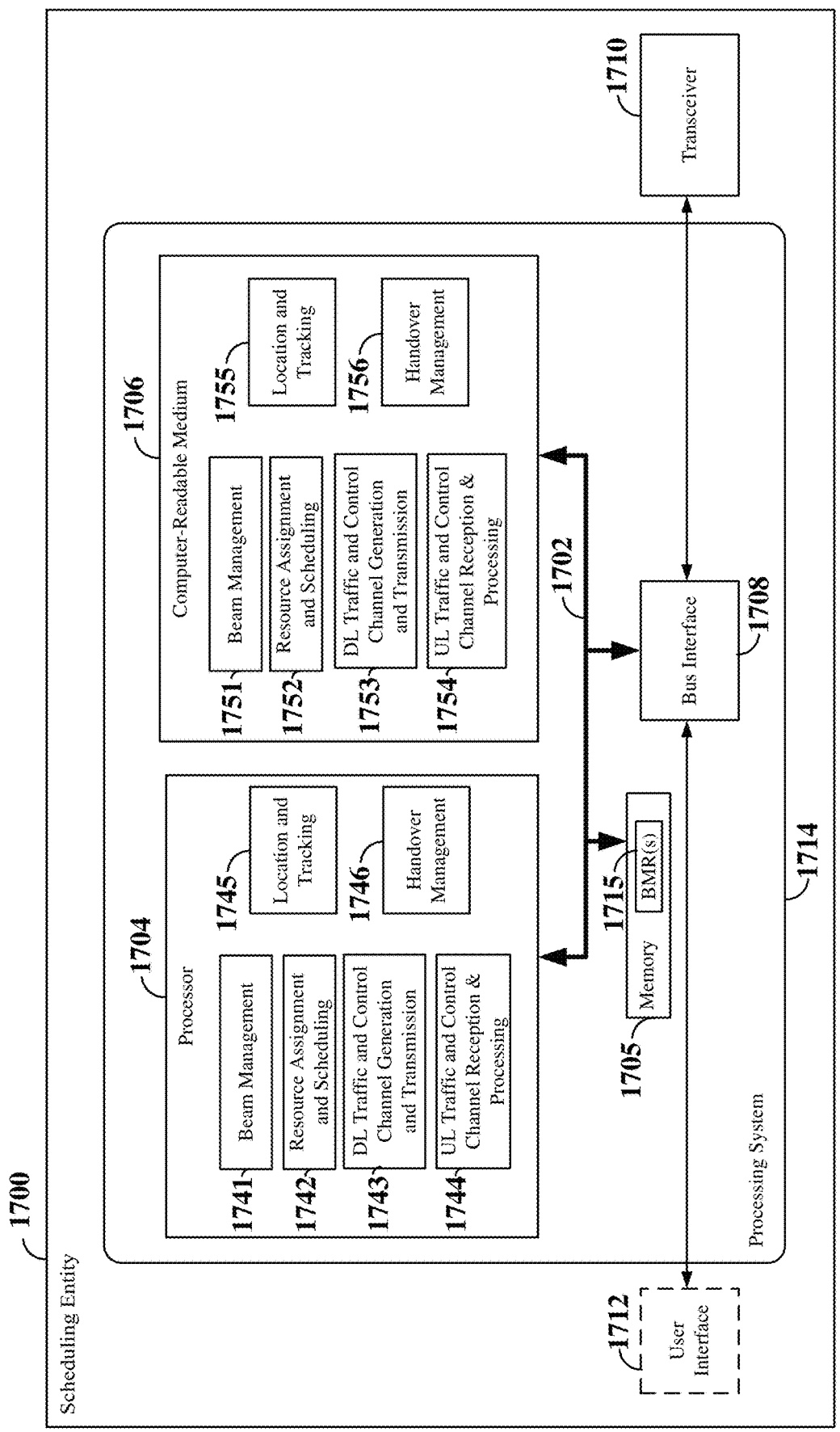
FIG. 17 is a block diagram illustrating an example of a hardware implementation for a scheduling entity employing a processing system according to some aspects of the disclosure.

FIG. 17 is a block diagram illustrating an example of a hardware implementation for a scheduling entity 1700 employing a processing system 1714. For example, the scheduling entity 1700 may be a base station (e.g., eNB, gNB), IAB node, first D2D UE, or other scheduling entity as illustrated in any one or more of FIGS. 1, 2, and 5-16.

The scheduling entity 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1700 may be configured to perform any one or more of the functions described herein. That is, the processor 1704, as utilized in a scheduling entity 1700, may be used to implement any one or more of the processes and procedures described below.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710. The transceiver 1710 provides a communication interface or means for communicating with various other apparatus over a transmission medium. Depending upon the nature of the apparatus, a user interface 1712 (e.g., keypad, display, speaker, microphone, joystick, touchscreen) may also be provided. Of course, such a user interface 1712 is optional, and may be omitted in some examples, such as a base station.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. In some examples, the memory 1705 may be omitted, and data utilized by the processor 1704 when executing software may be stored on the computer-readable medium 1706.

One or more processors 1704 in the processing system may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1704 may include circuitry configured for various functions. For example, the processor 1704 may include beam management circuitry 1741 configured to select one or more serving downlink beams and one or more serving uplink beams utilizing a beam management scheme, as described in any of FIG. 7-16 or 19-26. In some examples, the beam management circuitry 1741 may be configured to receive a respective beam measurement report (BMR) 1715 from each of one or more scheduled entities and to maintain the BMR(s) 1715, for example, within memory 1705. Each BMR 1715 may include beam quality information (e.g., BRSRPs and/or RSSIs) and beam angle information (e.g., angles of arrival/departure and/or temporal information) of at least candidate beams selected by a scheduled entity.

The beam management circuitry 1741 may further be configured to utilize the beam angle information, together with the beam quality information, of each of the candidate beams to select the serving downlink beam(s) for the scheduled entity. For example, the beam management circuitry 1741 may select a pair of candidate beams having a maximum separation between the angles of arrival/departure as the serving downlink beam pair link (BPL) to provide increased resistance to sudden blockage from surrounding moving objects. In addition, the beam management circuitry 1741 may utilize the beam angle information to identify obstructions within the direction associated with one or more of the beams, and forgo electing the beams experiencing obstructions in the path as part of the selected BPL. Additionally, the beam management circuitry 1741 may utilize temporal information in the beam measurement report 1715 to measure the difference in the received phase of each beam of the set of candidate beams Based at least in part on the measured difference in the received phase, the beam management circuitry 1741 may identify a BPL containing a pair of candidate beams satisfying a temporal disparity of the temporal information.

The beam management circuitry 1741 may further be configured to determine a beam sweep configuration based on the beam angle information included in the beam measurement report 1715. In some examples, the beam management circuitry 1741 may determine the beam sweep configuration by determining one or more beam directions, an analog beamforming configuration, a digital beamforming configuration, a frequency for each of the one or more beams, a set of time-frequency resources for each of the one or more beams, or a combination thereof.

In some examples, the beam management circuitry 1741 may be configured to receive beam measurement reports from one or more scheduled entities via one or more relay wireless nodes that forwarded the beam measurement reports to the scheduling entity 1700. In examples where one or more of the relay wireless nodes are transmitting wireless nodes, each in wireless communication with one of the scheduled entities that generated a beam measurement report, the beam management circuitry 1741 may jointly select respective serving downlink beams for communication between the transmitting wireless nodes and the scheduled entities utilizing two or more of the forwarded beam measurement reports.

In some examples, the beam management circuitry 1741 may utilize an uplink beam management scheme in which the beam management circuitry 1741 may trigger aperiodic uplink beam measurements by a scheduled entity based on downlink beam measurement reports and/or in response to a request from the scheduled entity. In some examples, the beam management circuitry 1741 may perform uplink beam measurements on uplink reference beams transmitted by a scheduled entity, and then transmit an uplink beam measurement report to the scheduled entity. In addition, the beam management circuitry 1741 may further receive an uplink beam measurement report when operating as a scheduled entity with respect to an additional scheduling entity, and may utilize the uplink beam measurement report to select serving downlink beams for other scheduled entities and/or to schedule downlink transmissions to the other scheduled entities on the selected serving downlink beams at the same time as uplink transmissions to the additional scheduling entity on the selected serving uplink beams utilizing spatial multiplexing.

In some examples, the beam management circuitry 1741 may receive a downlink beam measurement report from a scheduled entity and may further measure a respective uplink beam quality measurement for each of a plurality of uplink reference beams received from the scheduled entity. The beam management circuitry 1741 may then jointly select the serving uplink and downlink beams based on both the received downlink beam measurement report and uplink beam quality measurements when correspondence between the uplink and downlink beams exists. The beam management circuitry 1741 may further be configured to execute beam management software 1751 included on the computer-readable storage medium 1706 to implement one or more functions described above and/or described below in relation to FIGS. 19-26.

The processor 1704 may further include resource assignment and scheduling circuitry 1742, configured to generate, schedule, and modify a resource assignment or grant of time-frequency resources (e.g., a set of one or more resource elements). For example, the resource assignment and scheduling circuitry 1742 may schedule time-frequency resources within a plurality of time division duplex (TDD) and/or frequency division duplex (FDD) slots to carry user data traffic and/or control information to and/or from multiple UEs (scheduled entities).

In various aspects of the disclosure, the resource assignment and scheduling circuitry 1742 may further schedule transmission of a plurality of downlink reference beams in a beam-sweeping configuration, schedule transmission of an indication of selected serving downlink beam(s) and/or selected serving uplink beam(s), reserve uplink resources for a scheduled entity to transmit an aperiodic uplink beam reference signal, schedule transmission of an indication of the reserved uplink resources, schedule periodic PUCCH resources and/or PUSCH resources for a scheduled entity to transmit a request for the uplink resources, schedule transmission of a downlink reference beam measurement report from a scheduled entity, and/or schedule a periodic or semi-static transmission of an uplink beam reference signal. The resource assignment and scheduling circuitry 1742 may further be configured to execute resource assignment and scheduling software 1752 included on the computer-readable storage medium 1706 to implement one or more functions described above and/or described below in relation to FIGS. 19-26.

The processor 1704 may further include downlink (DL) traffic and control channel generation and transmission circuitry 1743, configured to generate and transmit downlink user data traffic and control channels within one or more slots. The DL traffic and control channel generation and transmission circuitry 1743 may operate in coordination with the resource assignment and scheduling circuitry 1742 to place the DL user data traffic and/or control information onto a time division duplex (TDD) or frequency division duplex (FDD) carrier by including the DL user data traffic and/or control information within one or more slots in accordance with the resources assigned to the DL user data traffic and/or control information.

In various aspects of the disclosure, the DL traffic and control channel generation and transmission circuitry 1743 may transmit a plurality of downlink reference beams in a beam-sweeping configuration, transmit an indication of one or more selected downlink beams and/or one or more selected uplink beams to a scheduled entity, and/or transmit downlink control information (DCI) indicating the uplink resources reserved for an aperiodic uplink beam reference signal. The DL traffic and control channel generation and transmission circuitry 1743 may further be configured to execute DL traffic and control channel generation and transmission software 1753 included on the computer-readable storage medium 1706 to implement one or more functions described above and/or described below in relation to FIGS. 19-26.

The processor 1704 may further include uplink (UL) traffic and control channel reception and processing circuitry 1744, configured to receive and process uplink control channels and uplink traffic channels from one or more scheduled entities. For example, the UL traffic and control channel reception and processing circuitry 1744 may be configured to receive uplink user data traffic from one or more scheduled entities. The UL traffic and control channel reception and processing circuitry 1744 may further be configured to receive UL control information from a scheduled entity. For example, the UL traffic and control channel reception and processing circuitry 1744 may be configured to receive beam measurement reports (BMRs) 1715 from one or more scheduled entities, which may be forwarded from one or more relay wireless nodes, each indicating one or more candidate beams to utilize in transmitting information to a particular scheduled entity, and to provide the beam measurement reports to the beam management circuitry 1741 for selection of one or more serving downlink beams for the one or more scheduled entities.

The UL traffic and control channel reception and processing circuitry 1744 may further be configured to receive uplink reference beams, each carrying an uplink beam reference signal, from one or more of the scheduled entities in the cell and measure the received power, quality or other variable associated with the uplink beam reference signals and provide the uplink beam quality measurements to the beam management circuitry 1741 for selection of one or more serving uplink beams (and possibly one or more serving downlink beams for correlated beams) for the one or more scheduled entities. The UL traffic and control channel reception and processing circuitry 1744 may further be configured to receive a request for uplink resources for a scheduled entity to transmit an aperiodic uplink beam reference signal and to provide the request to the beam management circuitry 1741 for processing.

In general, the UL traffic and control channel reception and processing circuitry 1744 may operate in coordination with the resource assignment and scheduling circuitry 1742 to schedule UL user data traffic transmissions, DL user data traffic transmissions and/or DL user data traffic retransmissions in accordance with the received UL control information. The UL traffic and control channel reception and processing circuitry 1744 may further be configured to execute UL traffic and control channel reception and processing software 1754 included on the computer-readable storage medium 1706 to implement one or more functions described above and/or described below in relation to FIGS. 19-26.

The processor 1704 may further include location and tracking circuitry 1745, configured to determine location information for at least one of the scheduled entities or other wireless nodes in the communication network. The location and tracking circuitry 1745 may determine the location of a scheduled entity or other wireless node based on, for example, at least the beam angle information included in the beam measurement report 1715 received from the scheduled entity or other wireless node. In some examples, the location and tracking circuitry 1745 may further utilize the beam angle information included in one or more beam measurement reports 1715 to identify respective physical locations of other scheduled entities and/or wireless nodes. Additionally or alternatively, the location and tracking circuitry 1745 may identify a physical location of one or more objects with respect to one or more scheduled entities or other wireless nodes based on the beam angle information. In some examples, the one or more objects may include an obstacle to wireless communications, a reflective surface, or a combination thereof. In some examples, the location and tracking circuitry 1745 may determine mobility conditions associated with one or more scheduled entities or other wireless nodes based on the beam angle information included in the beam measurement reports 1715. The location and tracking circuitry 1745 may further be configured to execute location and tracking software 1755 included on the computer-readable storage medium 1706 to implement one or more functions described above and/or described below in relation to FIGS. 19-26.

The processor 1704 may further include handover management circuitry 1746, configured to determine a handover configuration of a scheduled entity based on the mobility conditions of the scheduled entity determined by the location and tracking circuitry 1745. In some examples, the handover configuration may include a handover time, an identity of a target scheduling entity, a beamforming configuration for signaling an indication of a handover, or a set of time-frequency resources for signaling the indication of the handover. The handover management circuitry 1746 may further be configured to execute handover management software 1756 included on the computer-readable storage medium 1706 to implement one or more of the functions described above and/or described below in relation to FIGS. 19-26.

Figure 18:
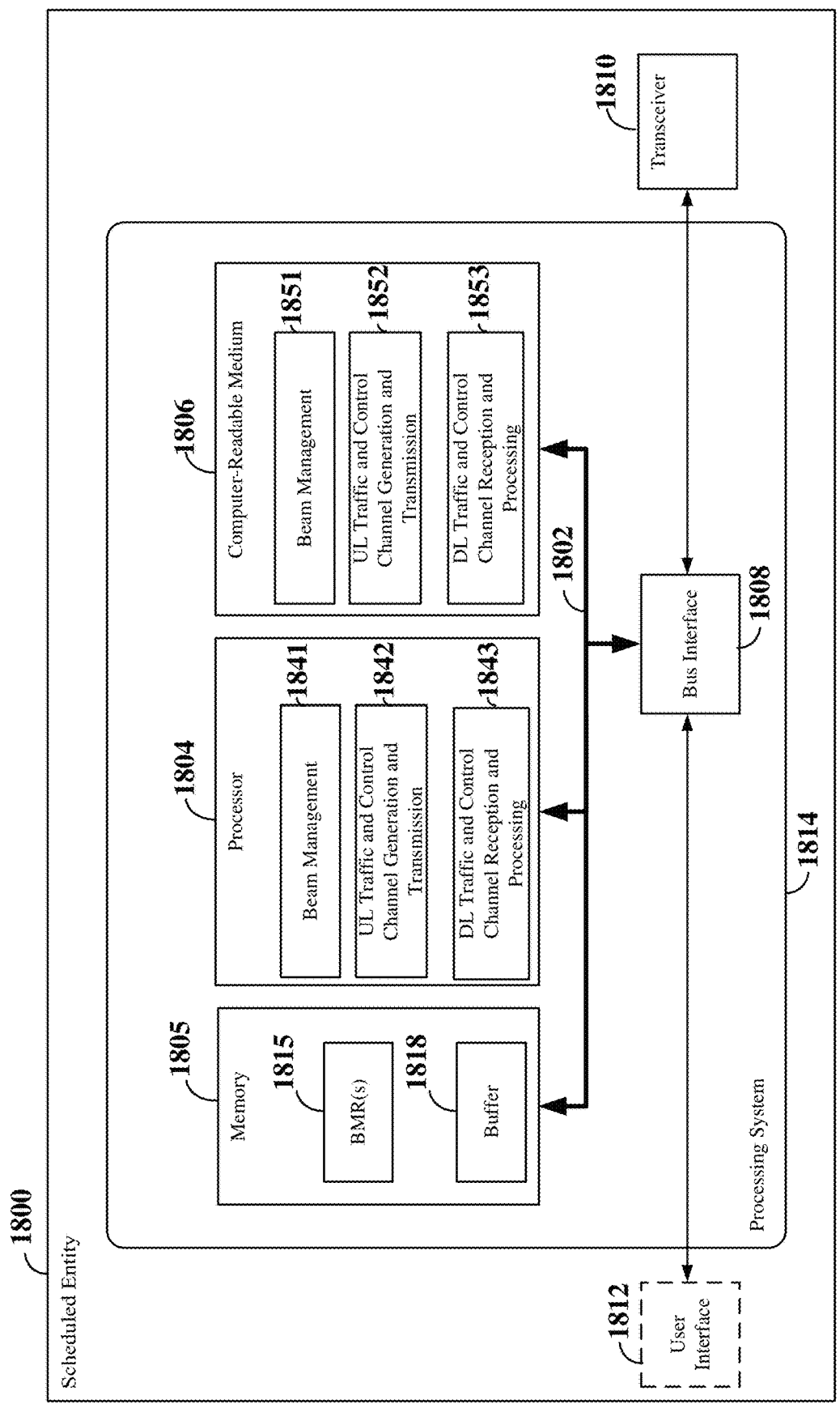
FIG. 18 is a block diagram illustrating an example of a hardware implementation for a scheduled entity employing a processing system according to some aspects of the disclosure.

FIG. 18 is a conceptual diagram illustrating an example of a hardware implementation for an exemplary scheduled entity 1800 employing a processing system 1814. In accordance with various aspects of the disclosure, an element, or any portion of an element, or any combination of elements may be implemented with a processing system 1814 that includes one or more processors 1804. For example, the scheduled entity 1800 may be a user equipment (UE), IAB node, second D2D UE device, transmitting/relay wireless node, or other type of scheduled entity as illustrated in FIGS. 1,2, and 5-16.

The processing system 1814 may be substantially the same as the processing system 1714 illustrated in FIG. 17, including a bus interface 1808, a bus 1802, memory 1805, a processor 1804, and a computer-readable medium 1806. Furthermore, the scheduled entity 1800 may include an optional user interface 1812 and a transceiver 1810 substantially similar to those described above in FIG. 17. That is, the processor 1804, as utilized in a scheduled entity 1800, may be used to implement any one or more of the processes described below and illustrated in the various figures.

In some aspects of the disclosure, the processor 1804 may include beam management circuitry 1841 configured to utilize a beam management scheme, as described in any of FIG. 7-16 or 19-26. In some examples, the beam management circuitry 1841 may be configured to measure at least one of a beam reference signal received power (BRSRP) or a received signal strength indicator (RSSI) of each of a plurality of received downlink reference beams. The beam management circuitry 1841 may then select candidate beams from the received reference beams based on the measured BRSRP and/or RSSI of each of the reference beams. In some examples, the beam management circuitry 1841 may select the candidate beams by comparing the measured BRSRPs and/or RSSIs of each of the reference beams and selecting the candidate beams with the highest BRSRP and/or RSSI.

The beam management circuitry 1841 may further be configured to measure the angle of arrival (AoA) and/or angle of departure (AoD) of each of the candidate beams, the angular difference of arrival (ADoA) and/or angular difference of departure (ADoD) between respective pairs of candidate beams, and/or one or more temporal values/indicators, such as the time of arrival (ToA), and/or the time of departure (ToD) of each of the candidate beams. Other temporal information may include, for example, the time difference of arrival (TDoA) and/or time difference of departure (TDoD) between respective pairs of candidate beams.

For example, the beam management circuitry 1841 may measure the angles of arrival/departure of each of the reference beams. The respective angles of arrival/departure may be determined by measuring the angle of incidence at which each reference beam arrives at the scheduled entity 1800. For example, the scheduled entity 1800 may receive a reference beam on multiple elements of antenna array, and the beam management circuitry 1841 may calculate the time difference of arrival (TDoA) between the elements of an antenna by measuring the difference in the received phase of the beam at each element. The measured TDoA between the antenna elements may then be converted into a measure of the angle of arrival/departure of the reference beam.

The beam management circuitry 1841 may further be configured to generate a beam measurement report 1815 including beam quality information (e.g., BRSRPs and/or RSSIs) and beam angle information (e.g., angles of arrival/departure and/or temporal information) of at least the candidate beams for transmission to a scheduling entity (e.g., directly or indirectly via one or more relay wireless nodes). In some examples, the beam management circuitry 1841 may be configured to receive beam measurement reports 1815 from one or more other scheduled entities and to forward the beam measurement reports to the scheduling entity.

In some examples, the beam management circuitry 1841 may select a downlink beam pair link (BPL) based on the measured beam quality information and beam angle information and include the selected BPL in the beam measurement report 1815. In some examples, the beam management circuitry 1841 may measure the BRSRP and/or the received signal strength for different BPLs, and may calculate a difference in the measured values. For instance, when measuring the BRSRP for each beam, the beam management circuitry 1841 may further calculate a difference between, for example, a first BRSRP value for a first beam and a second BRSRP value for a second beam, and include the difference in BRSRP in the beam measurement report 1815.

The beam management circuitry 1841 may further calculate a difference in the measured beam angle information between beams or BPLs and include an indication of the beam angle difference in the beam measurement report 1815. For example, the beam management circuitry 1841 may calculate an angular difference between an angle of arrival or an angle of departure of a first beam pair link of one or more beam pair links and a corresponding angle of arrival or angle of departure of a second beam pair link of the one or more beam pair links, where the beam angle information includes an indication of the angular difference. Additionally or alternatively, the beam management circuitry 1841 may measure at least one of an angle of arrival of the one or more beam pair links and an angle of departure of the one or more beam pair links, where the beam angle information includes an indication of the angle of arrival, or the angle of departure, or a combination thereof. In some examples, the first beam pair link and the second beam pair link are associated with the same wireless node (e.g., the scheduling entity). In some examples, the first beam pair link and the second beam pair link are associated with different wireless nodes. In some examples, the first beam pair link and the second beam pair link are measured at respective time instances.

Similarly, the beam management circuitry 1841 may further determine at least one of a time of arrival of the one or more beam pair links and a time of departure of the one or more beam pair links, where the beam angle information includes an indication of the time of arrival, or the time of departure, or a combination thereof. In some examples, the beam management circuitry 1841 may calculate a time difference between a time of arrival or a time of departure of a first beam pair link of the one or more beam pair links and a corresponding time of arrival or time of departure of a second beam pair link of the one or more beam pair links, where the beam angle information includes an indication of the time difference.

In some examples, the beam management circuitry 1841 may utilize an uplink beam management scheme in which the beam management circuitry 1841 may include, within the downlink beam measurement report 1815, a request for uplink resources to transmit an aperiodic uplink beam reference signal. In some examples, the beam management circuitry 1841 may receive an indication of uplink resources for the aperiodic uplink beam reference signal. In some examples, the beam management circuitry 1841 may generate an uplink signal (e.g., a physical layer control signal or MAC layer signal) including the request for uplink resources to transmit the aperiodic uplink beam reference signal.

In some examples, the beam management circuitry 1841 may receive an uplink beam measurement report 1815 from a scheduling entity. In addition, the beam management circuitry 1841 may further utilize the uplink beam measurement report 1815 to select serving downlink beams for other scheduled entities and/or to schedule downlink transmissions to the other scheduled entities on the selected serving downlink beams at the same time as uplink transmissions to the scheduling entity on the selected serving uplink beams utilizing spatial multiplexing. The beam management circuitry 1841 may further be configured to execute beam management software 1851 included on the computer-readable storage medium 1806 to implement one or more of the functions described above and/or described below in relation to FIGS. 19-26.

The processor 1804 may further include uplink (UL) traffic and control channel generation and transmission circuitry 1842, configured to generate and transmit uplink control/feedback/acknowledgement information on an UL control channel. For example, the UL traffic and control channel generation and transmission circuitry 1842 may be configured to generate and transmit uplink user data traffic on an UL traffic channel (e.g., a PUSCH) in accordance with an uplink grant. In addition, the UL traffic and control channel generation and transmission circuitry 1842 may be configured to generate and transmit an uplink control channel (e.g., a Physical Uplink Control Channel (PUCCH)).

In some examples, the UL traffic and control channel generation and transmission circuitry 1842 may be configured to generate and transmit a beam measurement report to the scheduling entity (e.g., base station, such as a gNB, or other IAB node). The beam measurement report may indicate a set of one or more candidate beams on which the scheduling entity may transmit information to the scheduled entity 1800 with high gain. In some examples, the beam measurement report may further include angles of arrival/departure of one or more of the candidate or downlink reference beams. In some examples, the beam measurement report may further include a request for uplink resources to transmit an aperiodic uplink beam reference signal. In some examples, the UL traffic and control channel generation and transmission circuitry 1842 may generate and transmit a request for uplink resources to transmit an aperiodic uplink beam reference signal. In some examples, the request for uplink resources may be transmitted via a physical layer control signal or a MAC layer message transmitted over a user data traffic channel.

In some examples, the UL traffic and control channel generation and transmission circuitry 1842 may receive one or more beam measurement reports from one or more other respective scheduled entities and forward the one or more beam measurement reports to a scheduling entity. In this example, the scheduled entity may be a relay wireless node or a transmitting wireless node, and the UL traffic and control channel generation and transmission circuitry 1842 corresponds to the circuitry utilized to generate and transmit wireless communications to the scheduling entity or to one or more other scheduled entities in wireless communication with the scheduled entity 1800.

In some examples, the UL traffic and control channel generation and transmission circuitry 1842 may further be configured to generate and transmit one or more uplink beam reference signals, such as sounding reference signals (SRSs), from which the scheduling entity may select one or more serving uplink beams. In some examples, the uplink beam reference signal may be an aperiodic uplink beam reference signal requested to be transmitted by the scheduled entity 1800. The UL traffic and control channel generation and transmission circuitry 1842 may further be configured to execute UL traffic and control channel generation and transmission software 1852 included on the computer-readable storage medium 1806 to implement one or more of the functions described above and/or described below in relation to FIGS. 19-26.

The processor 1804 may further include downlink (DL) traffic and control channel reception and processing circuitry 1843, configured for receiving and processing downlink user data traffic on a traffic channel, and to receive and process control information on one or more downlink control channels. For example, the DL traffic and control channel reception and processing circuitry 1843 may be configured to receive a Physical Downlink Control Channel (PDCCH) and/or a Physical Downlink Shared Channel (PDSCH) within a slot. In some examples, received downlink user data traffic and/or control information may be temporarily stored in a data buffer 1818 within memory 1805.

In some examples, the DL traffic and control channel reception and processing circuitry 1843 may further be configured to receive a plurality of reference beams, each carrying a reference signal, such as a synchronization signal (SS) or a channel state information reference signal (CSI-RS), and to provide the plurality of reference beams to the beam management circuitry 1841 to measure the respective beam quality information and/or beam angle information of each of the reference beams. In some examples, instead of the beam management circuitry 1841 measuring the beam quality information and/or beam angle information, the DL traffic and control channel reception and processing circuitry 1843 may measure the beam quality information and/or beam angle information of the downlink reference beams and provide the measured beam angle information to the beam management circuitry 1841 for inclusion in the downlink beam measurement report 1815.

The DL traffic and control channel reception and processing circuitry 1843 may further be configured to receive one or more beam measurement reports from one or more other scheduled entities. In this example, the scheduled entity 1800 may be a relay wireless node or other wireless node and the DL traffic and control channel reception and processing circuitry 1843 corresponds to the circuitry utilized to receive wireless communications from the one or more other scheduled entities.

The DL traffic and control channel reception and processing circuitry 1843 may further be configured to receive an uplink beam measurement report from a scheduling entity indicating the selected serving uplink beam(s) and the measured uplink beam quality of each of the uplink reference beams. The DL traffic and control channel reception and processing circuitry 1843 may further be configured to receive downlink control information indicating uplink resources that have been reserved for an aperiodic uplink beam reference signal and to provide the indication of the uplink resources to the beam management circuitry 1841 for processing. The DL traffic and control channel reception and processing circuitry 1843 may further be configured to execute DL traffic and control channel reception and processing software 1853 to implement one or more of the functions described above and/or described below in relation to FIGS. 19-26.

Figure 19:
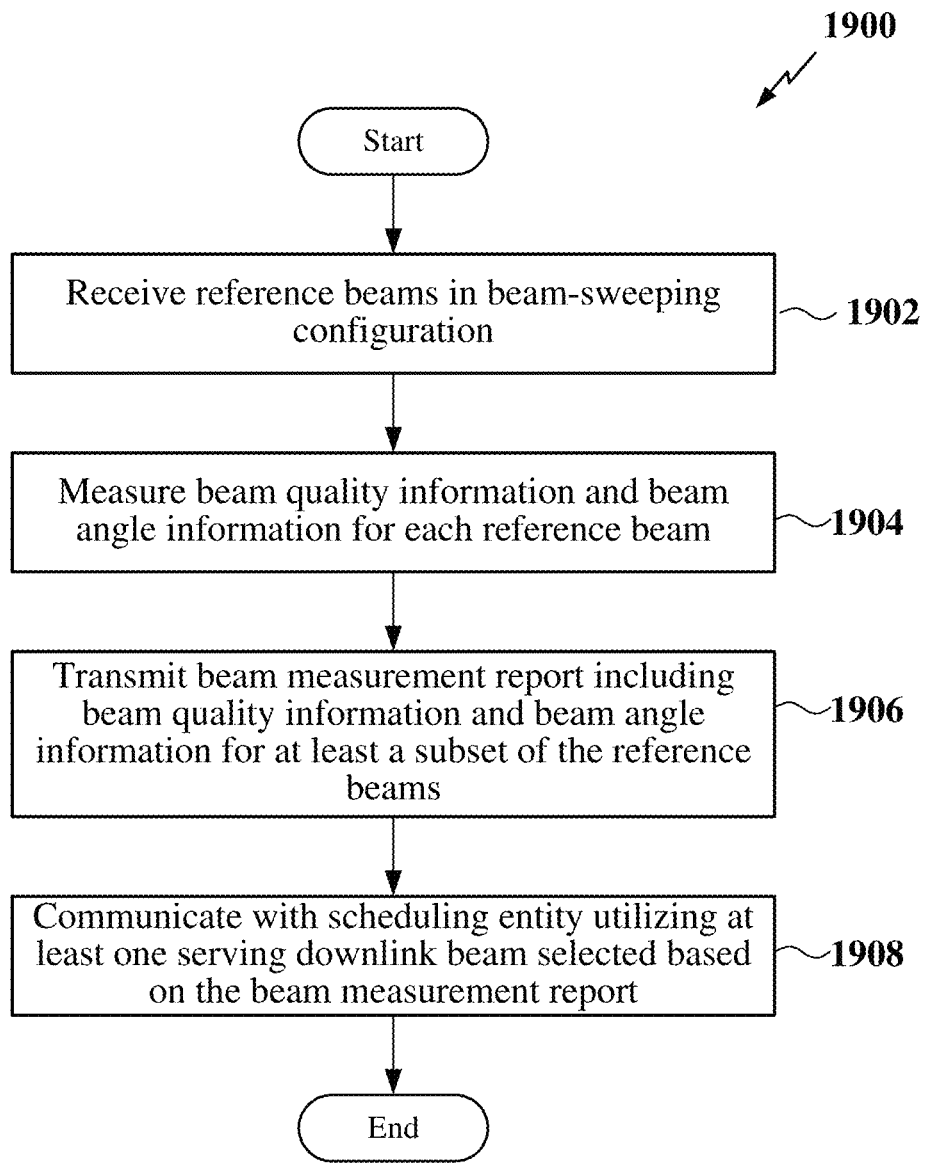
FIG. 19 is a flow chart illustrating an exemplary process operable at a scheduled entity for beam management according to some aspects of the disclosure.

FIG. 19 is a flow chart illustrating a process 1900 operable at a scheduled entity for enhancing beam management according to some aspects of the disclosure. As described below, some or all illustrated features may be omitted in a particular implementation within the scope of the present disclosure, and some illustrated features may not be required for implementation of all aspects. In some examples, the process 1900 may be carried out by the scheduled entity illustrated in FIG. 18. In some examples, the process 1900 may be carried out by any suitable apparatus or means for carrying out the functions or algorithm described below.

At block 1902, the scheduled entity may receive a plurality of reference beams transmitted in a beam-sweeping configuration throughout the coverage area (e.g., within a cell) of a wireless node. Each reference beam may include a reference signal, such as a synchronization signal (SS) or a channel state information reference signal (CSI-RS). For example, the DL traffic and control channel reception and processing circuitry 1843 shown and described above in connection with FIG. 18 may receive the reference beams.

At block 1904, the scheduled entity may measure beam quality information (e.g., the beam reference signal received power (BRSRP) and/or received signal strength indicator (RSSI)) and beam angle information (e.g., angle of arrival or angle of departure and/or temporal information) for each of the plurality of reference beams. For example, the DL traffic and control channel reception and processing circuitry 1843 and/or beam management circuitry 1841 shown and described above in connection with FIG. 18 may measure the beam quality information and beam angle information for each of the reference beams.

At block 1906, the scheduled entity may generate and transmit a beam measurement report including the beam quality information and beam angle information of at least a subset (e.g., a candidate set) of reference beams. The beam measurement report may be transmitted, for example, to a scheduling entity directly or indirectly via a relay wireless node. In some examples, the relay wireless node may be the wireless node from which the plurality of reference beams are received. In some examples, the wireless node from which the plurality of reference beams are received is the scheduling entity. For example, the beam management circuitry 1841 and UL traffic and control channel generation and transmission circuitry 1842 shown and described above in connection with FIG. 18 may generate and transmit the beam measurement report.

At block 1908, the scheduled entity may communicate with the scheduling entity utilizing at least one serving downlink beam selected based on the beam measurement report. In some examples, the selected serving downlink beams may include a beam pair link (BPL) with widely separated angles of arrival/departure. For example, the DL traffic and control channel reception and processing circuitry 1843 and transceiver 1810 shown and described above in connection with FIG. 18 may communicate with the scheduling entity utilizing the selected serving downlink beams.

Figure 20:
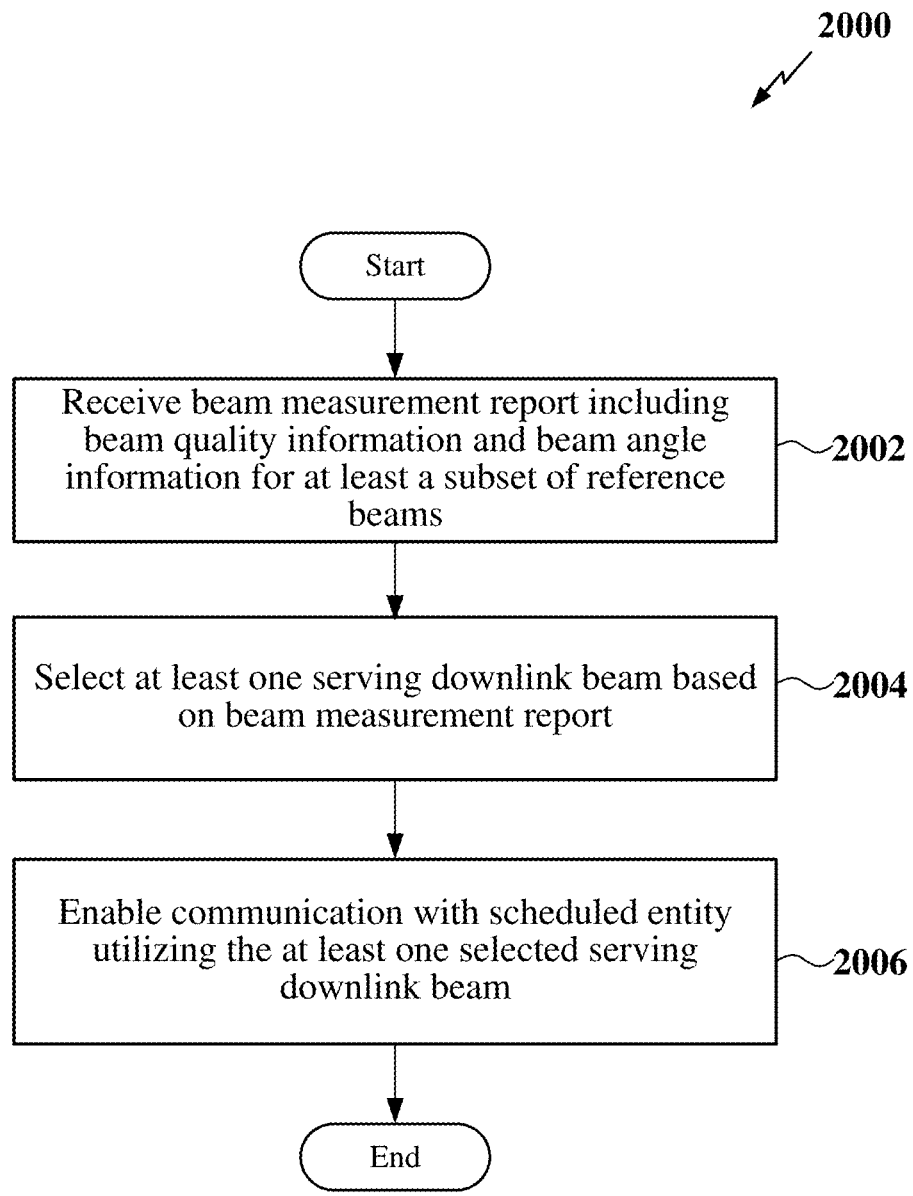
FIG. 20 is a flow chart illustrating an exemplary process operable at a scheduling entity for beam management according to some aspects of the disclosure.

FIG. 20 is a flow chart illustrating a process 2000 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2000 may be carried out by the scheduling entity illustrated in FIG. 17. In some examples, the process 2000 may be carried out by any suitable apparatus or means for carrying out the functions or algorithm described below.

At block 2002, the scheduling entity may receive a beam measurement report from a scheduled entity. The beam measurement report may include the measured beam quality information (e.g., BRSRP and/or RSSI) and beam angle information (e.g., angle of arrival or angle of departure and/or temporal information) of at least a subset (e.g., a candidate set) of reference beams transmitted between a wireless node and the scheduled entity. In some examples, the wireless node is the scheduling entity and the beam measurement report may be generated in response to the scheduling entity transmitting the plurality of reference beams in a beam-sweeping configuration throughout the coverage area (e.g., within a cell) served by the scheduling entity. Each reference beam may include a reference signal, such as a synchronization signal (SS) or a channel state information reference signal (CSI-RS). In other examples, the scheduling entity may receive the beam measurement report from the wireless node or a relay wireless node in wireless communication with the scheduled entity. For example, the UL traffic and control channel reception and processing circuitry 1744 shown and described above in connection with FIG. 17 may receive the beam measurement report.

At block 2006, the scheduling entity may select at least one serving downlink beam for communication between the wireless node and the scheduled entity based on the beam measurement report. In some examples, the selected serving downlink beams may include a beam pair link (BPL) with widely separated angles of arrival/departure. For example, the beam management circuitry 1741 shown and described above in connection with FIG. 17 may select the serving downlink beam(s).

At block 2008, the scheduling entity may enable communication between the wireless node and the scheduled entity utilizing the selected serving downlink beam(s). For example, the DL traffic and control channel generation and transmission circuitry 1743 and transceiver 1510 shown and described above in connection with FIG. 17 may enable communication with the scheduled entity utilizing the selected serving downlink beams (e.g., by providing the selected serving downlink beam(s) to the wireless node and/or indicating the selected serving downlink beam(s) to the scheduled entity).

Figure 21:
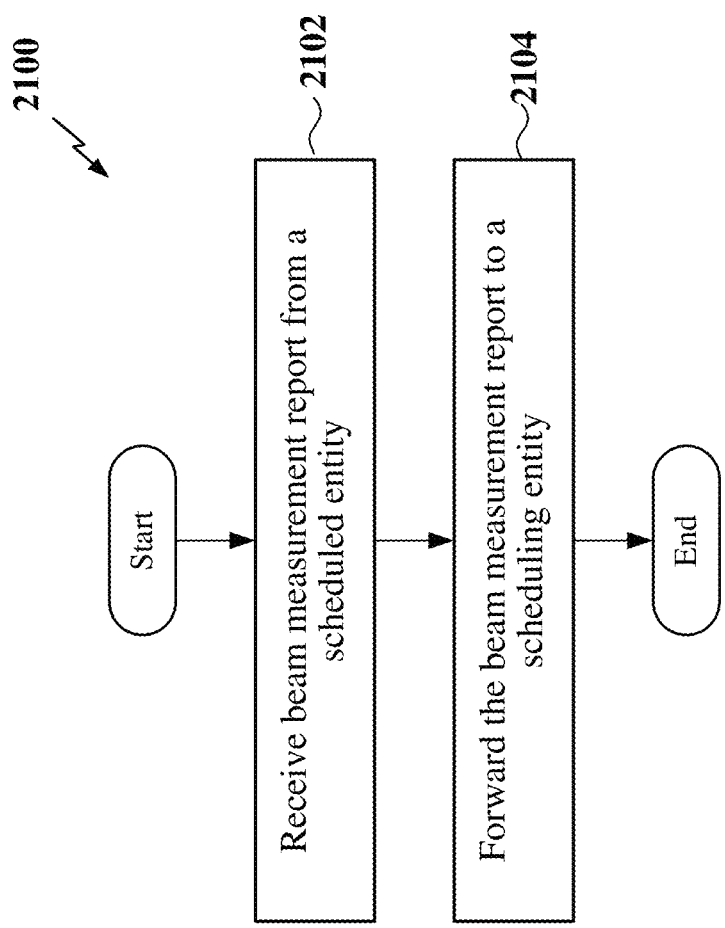
FIG. 21 is a flow chart illustrating another exemplary process operable at a relay wireless node for beam management according to some aspects of the disclosure.

FIG. 21 is a flow chart illustrating a process 2100 operable at a relay wireless node for enhancing beam management according to some aspects of the disclosure. As described below, some or all illustrated features may be omitted in a particular implementation within the scope of the present disclosure, and some illustrated features may not be required for implementation of all aspects. In some examples, the process 2100 may be carried out by the scheduled entity illustrated in FIG. 18. In some examples, the process 2100 may be carried out by any suitable apparatus or means for carrying out the functions or algorithm described below.

At block 2102, the relay wireless node may receive a beam measurement report from a scheduled entity. The beam measurement report may include beam quality information (e.g., BRSRP and/or RSSI) of at least a subset of a plurality of reference beams received at the scheduled entity. The beam measurement report may further include beam angle information for the subset of the plurality of reference beams. In some examples, the plurality of reference beams may be transmitted by a scheduling entity. In other examples, the plurality of reference beams may be transmitted by another wireless node. In other examples, the plurality of reference beams may be transmitted by the relay wireless node. For example, the DL traffic and control channel reception and processing circuitry 1843 shown and described above in connection with FIG. 18 may receive the beam measurement report from the scheduled entity.

At block 2104, the relay wireless node may forward the beam measurement report to the scheduling entity for selection of at least one serving downlink beam from the plurality of reference beams for use by the scheduled entity based on the beam measurement report. For example, the UL traffic and control channel generation and transmission circuitry 1842 shown and described above in connection with FIG. 18 may forward the beam measurement report to the scheduling entity.

Figure 22:
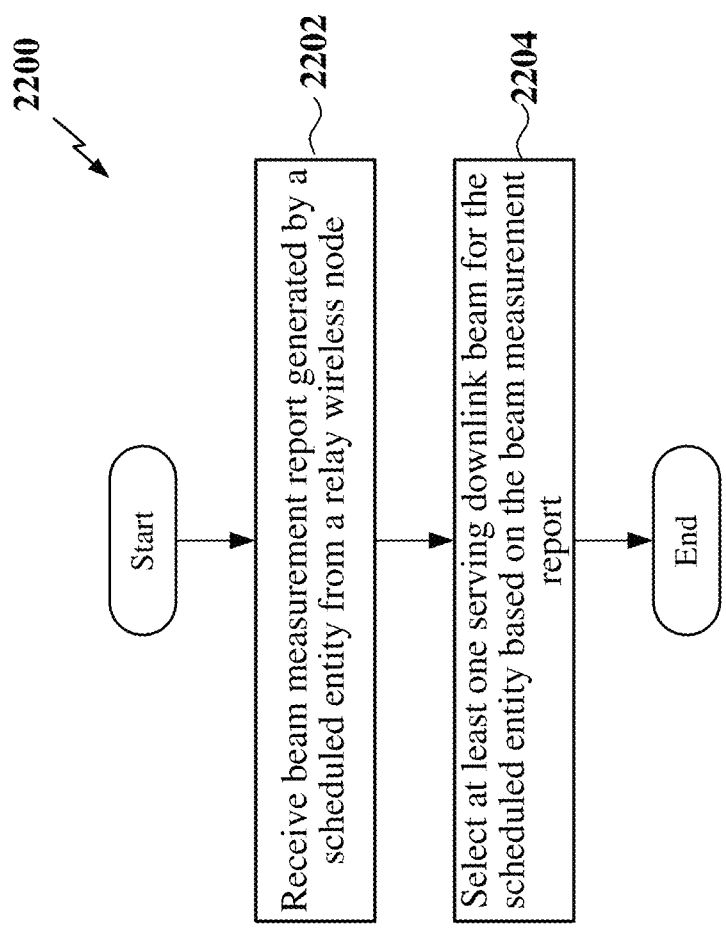
FIG. 22 is a flow chart illustrating another exemplary process operable at a scheduling entity for beam management according to some aspects of the disclosure.

FIG. 22 is a flow chart illustrating a process 2200 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2200 may be carried out by the scheduling entity illustrated in FIG. 17. In some examples, the process 2200 may be carried out by any suitable apparatus or means for carrying out the functions or algorithm described below.

At block 2202, the scheduling entity may receive a beam measurement report from a relay wireless node. The beam measurement report may include beam quality information (e.g., the BRSRP and/or RSSI) of at least a subset of a plurality of reference beams received by a scheduled entity. The beam measurement report may further include beam angle information for at least the subset of the plurality of reference beams. In some examples, the plurality of reference beams may be transmitted by the scheduling entity. In other examples, the plurality of reference beams may be transmitted by another wireless node. In other examples, the plurality of reference beams may be transmitted by the relay wireless node. For example, the UL traffic and control channel reception and processing circuitry 1744 shown and described above in connection with FIG. 17 may receive the beam measurement report from the relay wireless node.

At block 2204, the scheduling entity may select at least one serving downlink beam from the plurality of reference beams for use by the scheduled entity based on the beam measurement report. For example, the beam management circuitry 1741 shown and described above in connection with FIG. 17 may select the serving downlink beam(s).

Figure 23:
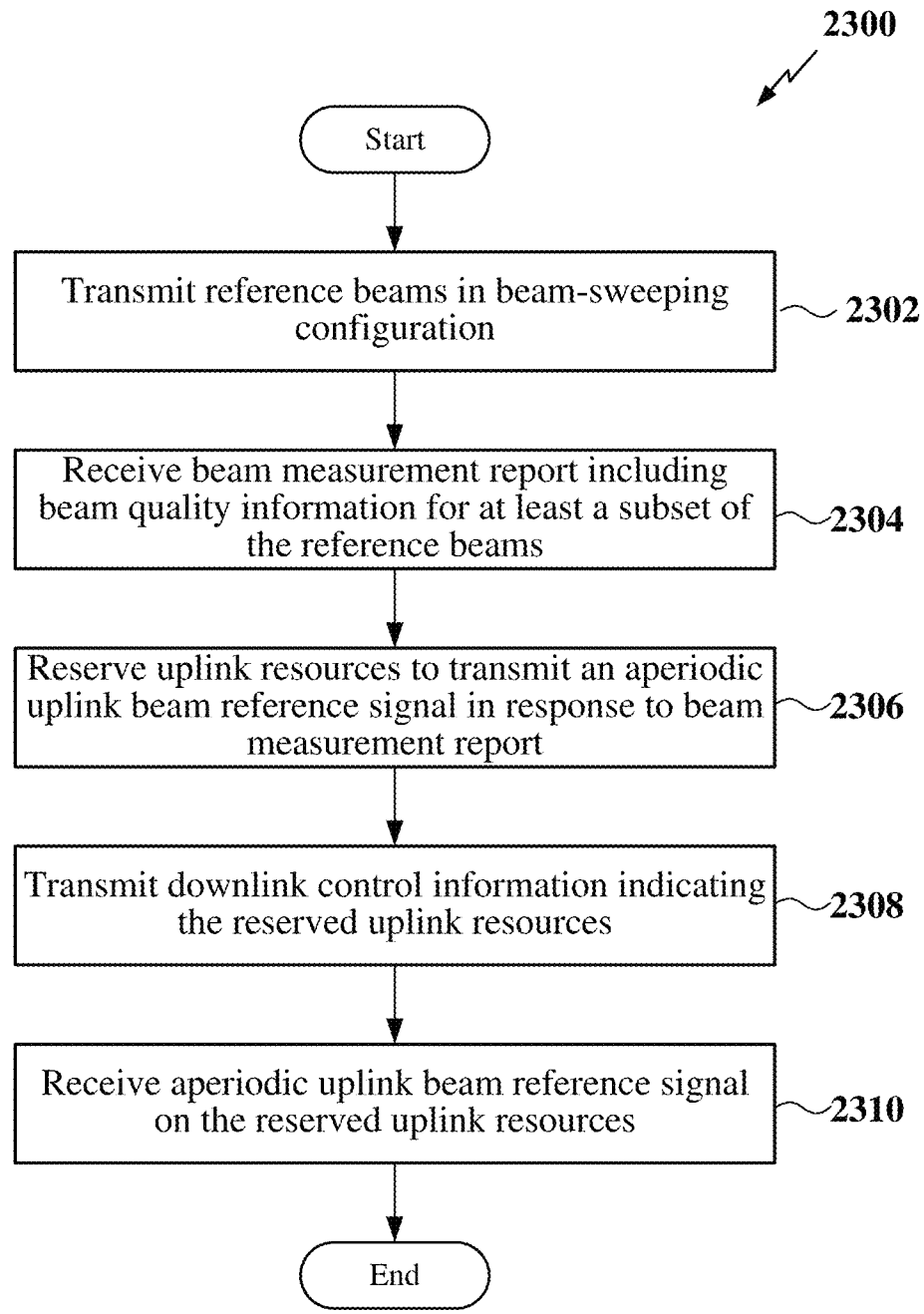
FIG. 23 is a flow chart illustrating another exemplary process operable at a scheduling entity for beam management according to some aspects of the disclosure.

FIG. 23 is a flow chart illustrating a process 2300 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2300 may be carried out by the scheduling entity illustrated in FIG. 17. In some examples, the process 2300 may be carried out by any suitable apparatus or means for carrying out the functions or algorithm described below.

At block 2302, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the DL traffic and control channel generation and transmission circuitry 1743 shown and described above in connection with FIG. 17 may transmit the reference beams.

At block 2304, the scheduling entity may receive a downlink beam measurement report from a scheduled entity. The downlink beam measurement report may include the measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report.

At block 2306, the scheduling entity may reserve uplink resources for the scheduled entity to transmit an aperiodic uplink beam reference signal in response to the downlink beam measurement report. In some examples, the downlink beam measurement report may include a request for the uplink resources. In other examples, when correlation or correspondence exists between uplink and downlink beams, the scheduling entity may trigger the aperiodic uplink beam reference signal and reserve the uplink resources if the downlink beam measurement report indicates a change in a serving downlink beam. For example, the resource assignment and scheduling circuitry 1742 shown and described above in connection with FIG. 17 may reserve the uplink resources for the aperiodic uplink beam reference signal.

At block 2308, the scheduling entity may transmit downlink control information (DCI) within a PDCCH indicating the uplink resources reserved for the aperiodic uplink beam reference signal. For example, the DL traffic and control channel generation and transmission circuitry 1743 and transceiver 1510 shown and described above in connection with FIG. 17 may transmit the DCI to the scheduled entity.

At block 2310, the scheduling entity may receive the aperiodic uplink beam reference signal transmitted by the scheduled entity on the reserved uplink resources. In some examples, the aperiodic uplink beam reference signal may be transmitted on a plurality of uplink reference beams in a beam-sweeping configuration. For example, the UL traffic and control channel reception and processing circuitry 1744 shown and described above in connection with FIG. 17 may receive the aperiodic uplink beam reference signal.

Figure 24:
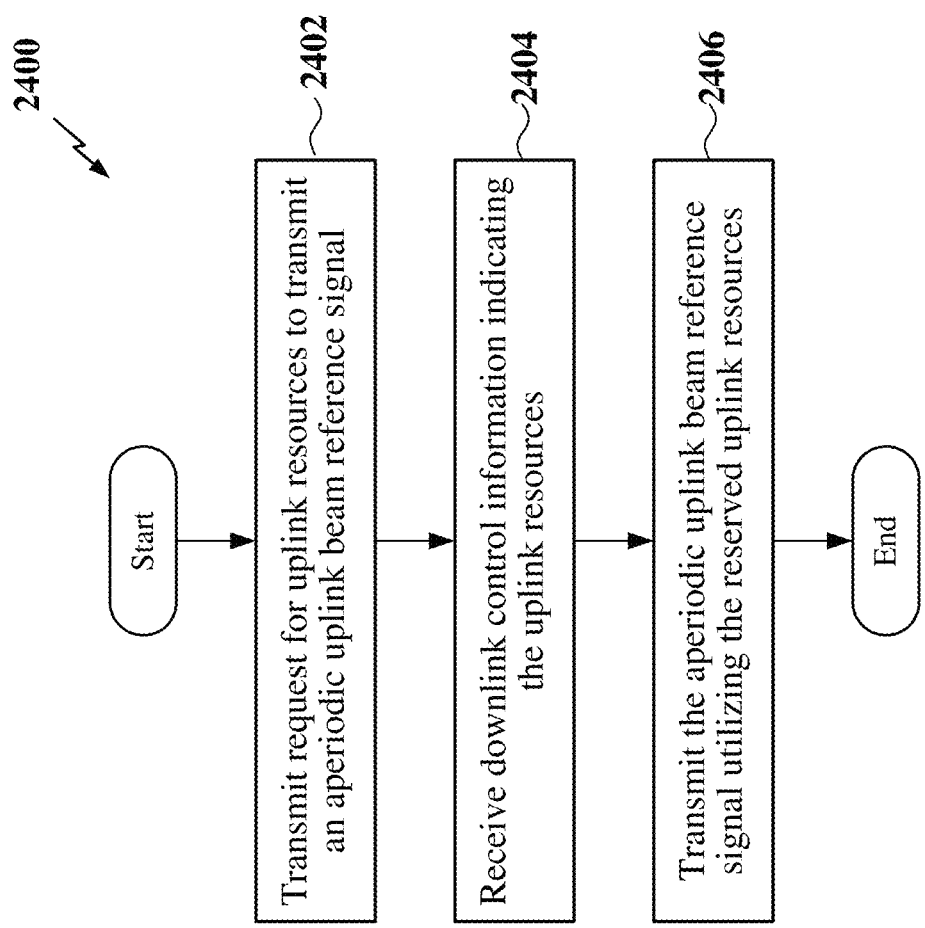
FIG. 24 is a flow chart illustrating another exemplary process operable at a scheduled entity for beam management according to some aspects of the disclosure.

FIG. 24 is a flow chart illustrating a process 2400 operable at a scheduled entity for enhancing beam management according to some aspects of the disclosure. As described below, some or all illustrated features may be omitted in a particular implementation within the scope of the present disclosure, and some illustrated features may not be required for implementation of all aspects. In some examples, the process 2400 may be carried out by the scheduled entity illustrated in FIG. 18. In some examples, the process 2400 may be carried out by any suitable apparatus or means for carrying out the functions or algorithm described below.

At block 2402, the scheduled entity may transmit a request for uplink resources to transmit an aperiodic uplink beam reference signal to a scheduling entity. In some examples, the request may transmitted within a physical control channel (e.g., PUCCH) or within a MAC layer message (e.g., a MAC-CE) transmitted within a physical user data traffic channel (e.g., PUSCH). In some examples, the request may be transmitted within an uplink message of a random access channel (RACH) procedure. For example, the beam management circuitry 1841 and the UL traffic and control channel generation and transmission circuitry 1842 shown and described above in connection with FIG. 18 may generate and transmit the request for uplink resources to the scheduling entity.

At block 2404, the scheduled entity may receive downlink control information (DCI) within a PDCCH indicating the uplink resources reserved for the aperiodic uplink beam reference signal. For example, the DL traffic and control channel reception and processing circuitry 1843 and transceiver 1810 shown and described above in connection with FIG. 18 may receive the DCI from the scheduling entity.

At block 2406, the scheduled entity may transmit the aperiodic uplink beam reference signal to the scheduling entity on the reserved uplink resources. In some examples, the aperiodic uplink beam reference signal may be transmitted on a plurality of uplink reference beams in a beam-sweeping configuration. For example, the UL traffic and control channel generation and transmission circuitry 1842 shown and described above in connection with FIG. 18 may generate and transmit the aperiodic uplink beam reference signal.

Figure 25:
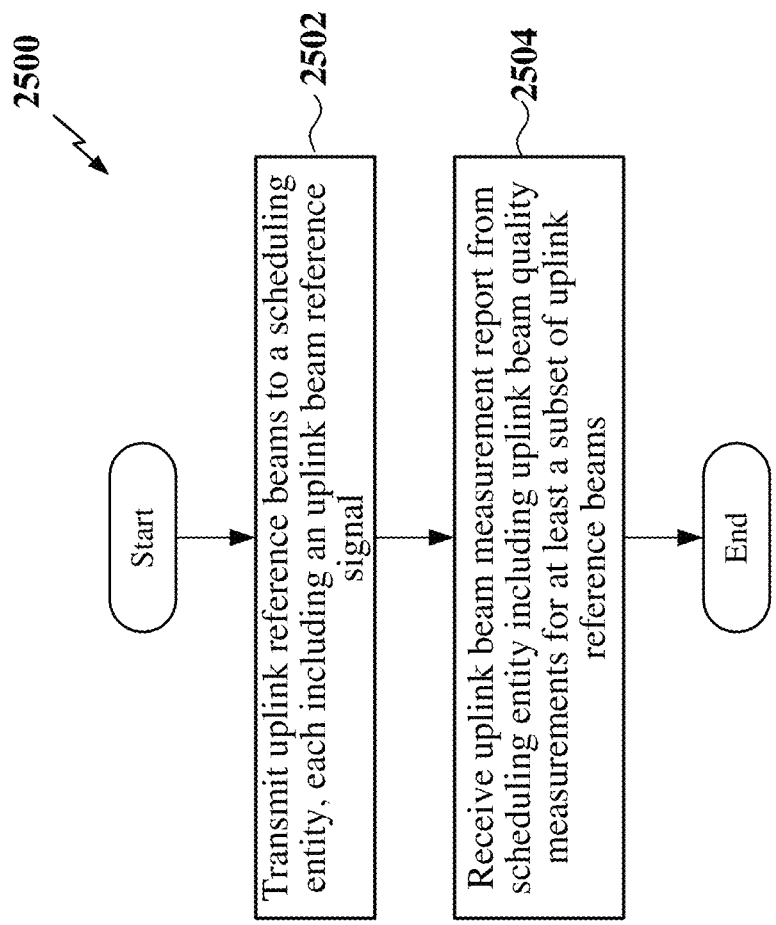
FIG. 25 is a flow chart illustrating another exemplary process operable at a scheduled entity for beam management according to some aspects of the disclosure.

FIG. 25 is a flow chart illustrating a process 2500 operable at a scheduled entity for enhancing beam management according to some aspects of the disclosure. As described below, some or all illustrated features may be omitted in a particular implementation within the scope of the present disclosure, and some illustrated features may not be required for implementation of all aspects. In some examples, the process 2500 may be carried out by the scheduled entity illustrated in FIG. 18. In some examples, the process 2500 may be carried out by any suitable apparatus or means for carrying out the functions or algorithm described below.

At block 2502, the scheduled entity may transmit a plurality of uplink reference beams, each carrying an uplink beam reference signal (e.g., an SRS) to a scheduling entity in a beam-sweeping configuration. For example, the UL traffic and control channel generation and transmission circuitry 1842 may generate and transmit the uplink reference beams.

At block 2504, the scheduled entity may receive an uplink beam measurement report from the scheduling entity. In some examples, the uplink beam measurement report may indicate the selected uplink serving beam(s) for the scheduled entity to communicate with the scheduling entity, together with a respective uplink beam quality measurement measured by the scheduling entity on each of the uplink reference beams. For example, the DL traffic and control channel reception and processing circuitry 1843, the beam management circuitry 1841, and the transceiver 1810 shown and described above in connection with FIG. 18 may receive the uplink beam measurement report.

Figure 26:
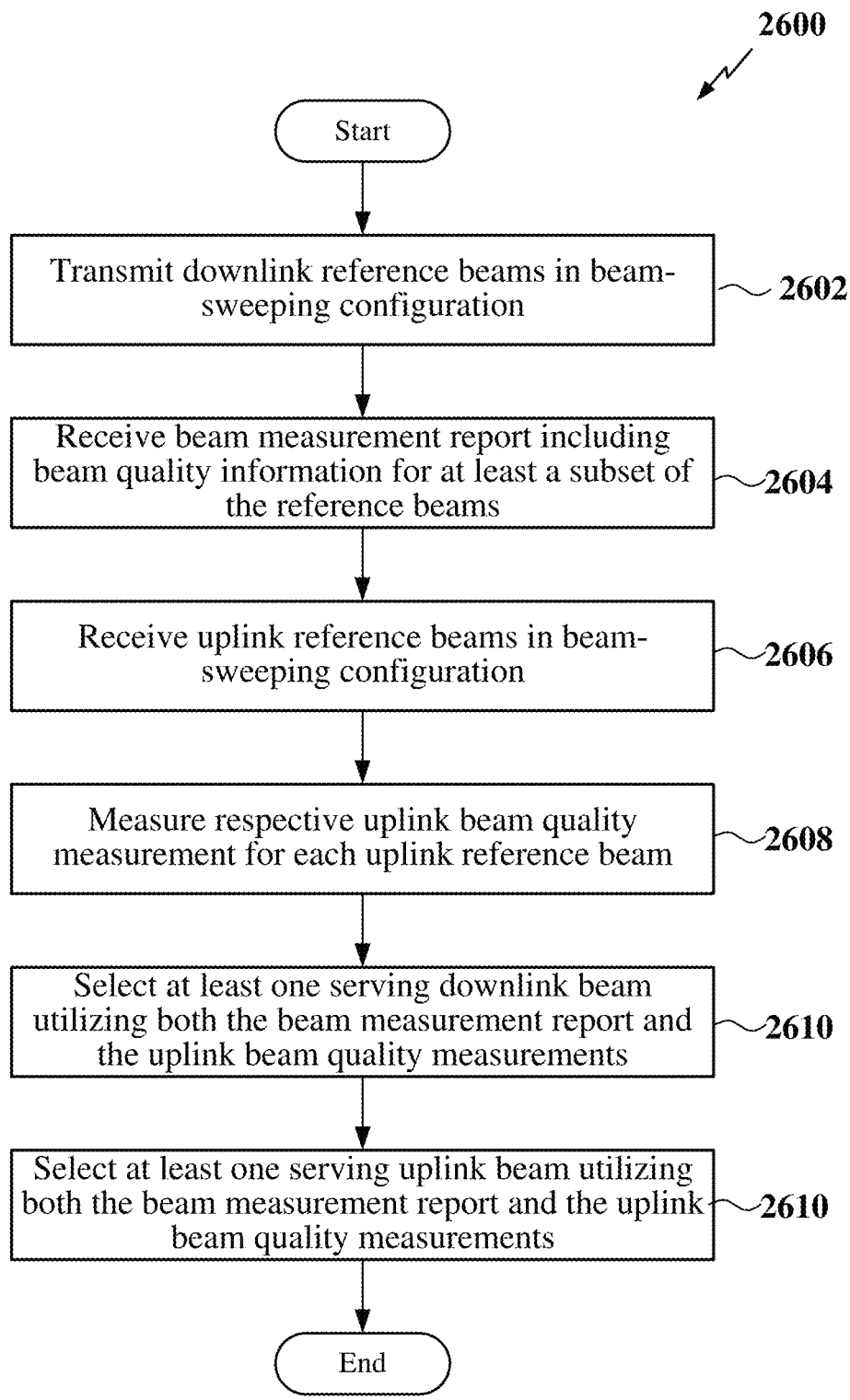
FIG. 26 is a flow chart illustrating another exemplary process operable at a scheduling entity for beam management according to some aspects of the disclosure.

FIG. 26 is a flow chart illustrating a process 2600 operable at a scheduled entity for enhancing beam management according to some aspects of the disclosure. As described below, some or all illustrated features may be omitted in a particular implementation within the scope of the present disclosure, and some illustrated features may not be required for implementation of all aspects. In some examples, the process 2600 may be carried out by the scheduling entity illustrated in FIG. 17. In some examples, the process 2600 may be carried out by any suitable apparatus or means for carrying out the functions or algorithm described below.

At block 2602, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the beam management circuitry 1741 and DL traffic and control channel generation and transmission circuitry 1743 shown and described above in connection with FIG. 17 may generate and transmit the reference beams.

At block 2604, the scheduling entity may receive a downlink beam measurement report from a scheduled entity. The downlink beam measurement report may include the measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report.

At block 2606, the scheduling entity may receive a plurality of uplink reference beams, each carrying an uplink beam reference signal (e.g., an SRS), in a beam-sweeping configuration from the scheduled entity. For example, the UL traffic and control channel reception and processing circuitry 1744 shown and described above in connection with FIG. 17 may receive the uplink reference beams.

At block 2608, the scheduling entity may measure a respective uplink beam quality measurement for each of the uplink reference beams. For example, the beam management circuitry 1741 and/or the UL traffic and control channel reception and processing circuitry 1744 shown and described above in connection with FIG. 17 may measure the uplink beam quality measurements.

At block 2610, the scheduling entity may select at least one serving downlink beam for use in transmitting control information and/or user data traffic to the scheduled entity utilizing both the downlink beam measurement report and the uplink beam quality measurements. For example, the beam management circuitry 1741 shown and described above in connection with FIG. 17 may select the serving downlink beam(s).

At block 2612, the scheduling entity may select at least one serving uplink beam for use in receiving control information and/or user data traffic from the scheduled entity utilizing both the downlink beam measurement report and the uplink beam quality measurements. For example, the beam management circuitry 1741 shown and described above in connection with FIG. 17 may select the serving uplink beam(s).

Figure 27:
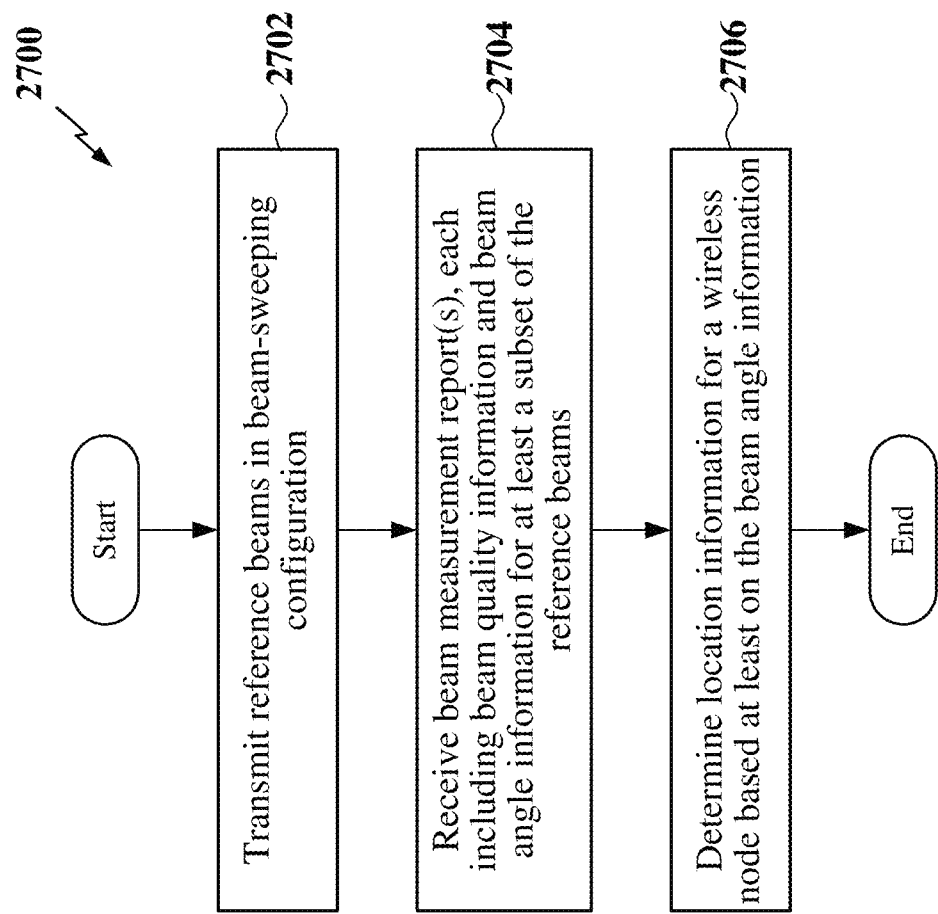
FIG. 27 is a flow chart illustrating another exemplary process operable at a scheduling entity for beam management according to some aspects of the disclosure.

FIG. 27 is a flow chart illustrating a process 2700 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2600 may be carried out by the scheduling entity illustrated in FIG. 17. In some examples, the process 2600 may be carried out by any suitable apparatus or means for carrying out the functions or algorithm described below.

At block 2702, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the beam management circuitry 1741 and DL traffic and control channel generation and transmission circuitry 1743 shown and described above in connection with FIG. 17 may generate and transmit the reference beams.

At block 2704, the scheduling entity may receive a respective beam measurement report from each of one or more scheduled entities or other wireless nodes. Each beam measurement report may include the respective measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report(s).

At block 2706, the scheduling entity may determine location information for at least one of the scheduled entities or other wireless nodes based at least in part on the beam angle information included in the beam measurement report(s). For example, the scheduling entity may identify a physical location of at least one of the scheduled entities or other wireless nodes based at least in part on the beam angle information. For example, the location and tracking circuitry 1745 shown and described above in connection with FIG. 17 may determine the location information.

Figure 28:
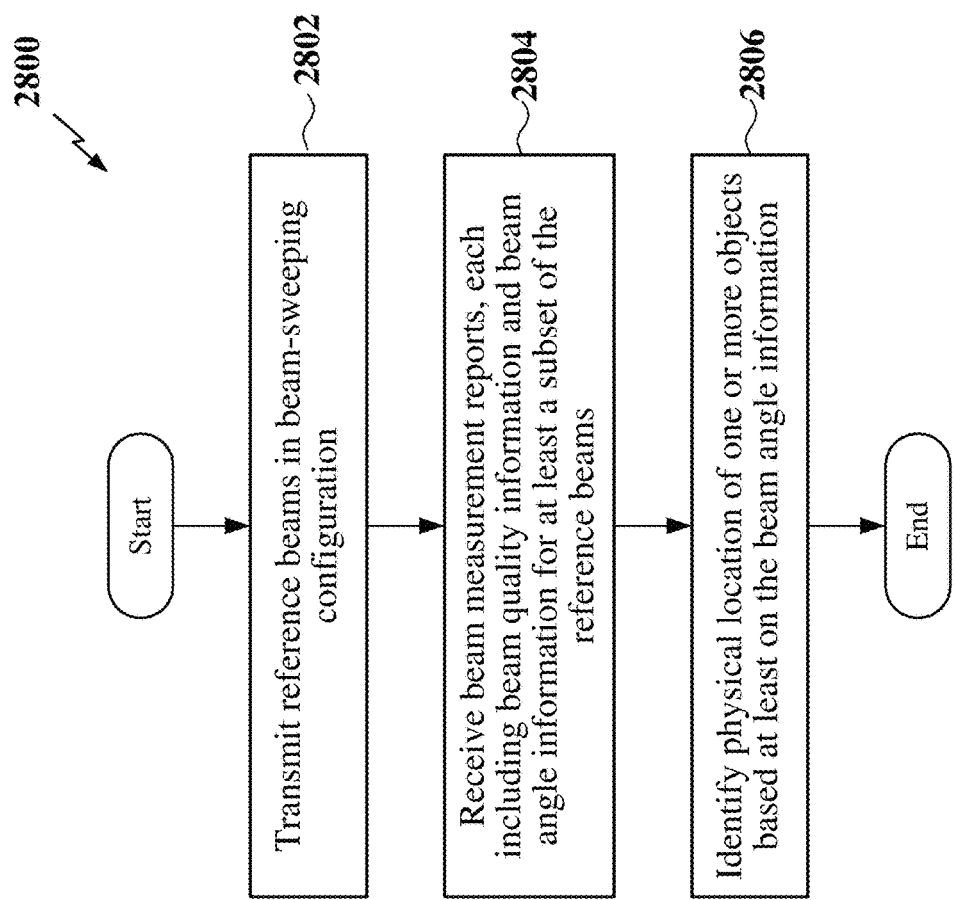
FIG. 28 is a flow chart illustrating another exemplary process operable at a scheduling entity for beam management according to some aspects of the disclosure.

FIG. 28 is a flow chart illustrating a process 2800 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2800 may be carried out by the scheduling entity illustrated in FIG. 17. In some examples, the process 2800 may be carried out by any suitable apparatus or means for carrying out the functions or algorithm described below.

At block 2802, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the beam management circuitry 1741 and DL traffic and control channel generation and transmission circuitry 1743 shown and described above in connection with FIG. 17 may generate and transmit the reference beams.

At block 2804, the scheduling entity may receive a respective beam measurement report from each of one or more scheduled entities or other wireless nodes. Each beam measurement report may include the respective measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report(s).

At block 2806, the scheduling entity may identify a physical location of one or more objects with respect to one or more of the scheduled entities or other wireless nodes based on the beam angle information. In some examples, the one or more objects may include an obstacle to wireless communications, a reflective surface, or a combination thereof. For example, the location and tracking circuitry 1745 shown and described above in connection with FIG. 17 may determine the physical location of one or more objects.

Figure 29:
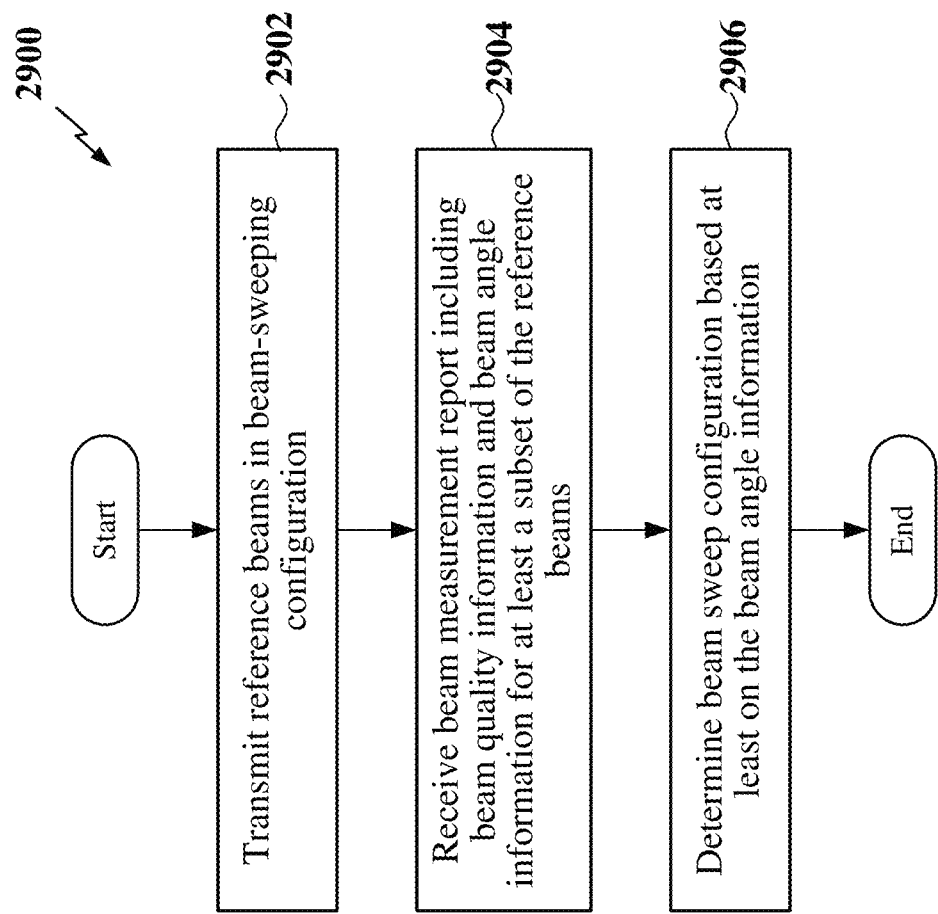
FIG. 29 is a flow chart illustrating another exemplary process operable at a scheduling entity for beam management according to some aspects of the disclosure.

FIG. 29 is a flow chart illustrating a process 2900 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 2900 may be carried out by the scheduling entity illustrated in FIG. 17. In some examples, the process 2900 may be carried out by any suitable apparatus or means for carrying out the functions or algorithm described below.

At block 2902, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the beam management circuitry 1741 and DL traffic and control channel generation and transmission circuitry 1743 shown and described above in connection with FIG. 17 may generate and transmit the reference beams.

At block 2904, the scheduling entity may receive a beam measurement report from a scheduled entity. The beam measurement report may include the measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report.

At block 2906, the scheduling entity may determine a beam sweep configuration based on the beam angle information included in the beam measurement report. In some examples, the scheduling entity may determine the beam sweep configuration by determining one or more beam directions, an analog beamforming configuration, a digital beamforming configuration, a frequency for each of the one or more beams, a set of time-frequency resources for each of the one or more beams, or a combination thereof. For example, the beam management circuitry 1741 shown and described above in connection with FIG. 17 may determine the beam sweep configuration.

Figure 30:
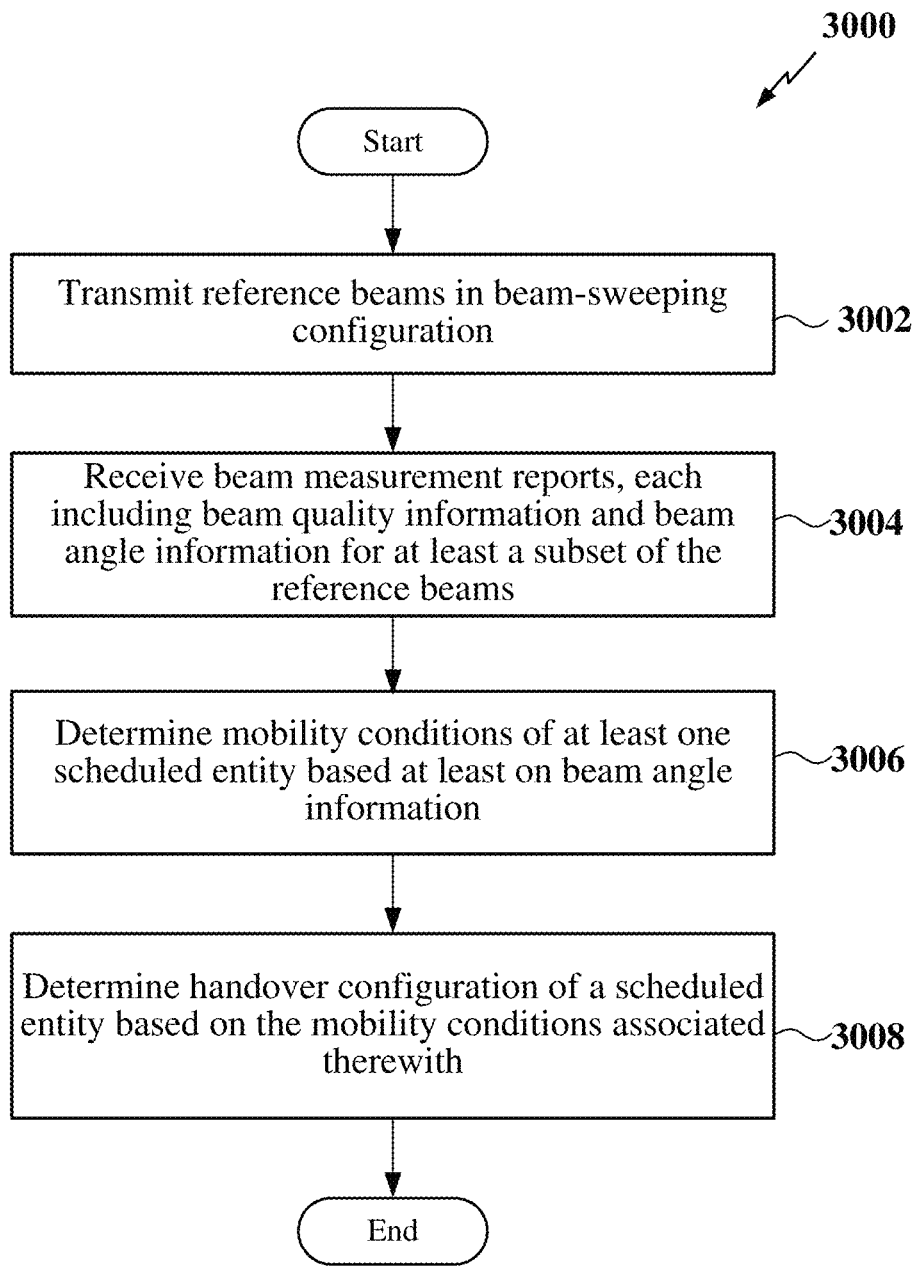
FIG. 30 is a flow chart illustrating another exemplary process operable at a scheduling entity for beam management according to some aspects of the disclosure.

FIG. 30 is a flow chart illustrating a process 3000 operable at a scheduling entity for enhancing beam management according to some aspects of the disclosure. As described below, some or all illustrated features may be omitted in a particular implementation within the scope of the present disclosure, and some illustrated features may not be required for implementation of all aspects. In some examples, the process 3000 may be carried out by the scheduling entity illustrated in FIG. 17. In some examples, the process 3000 may be carried out by any suitable apparatus or means for carrying out the functions or algorithm described below.

At block 3002, the scheduling entity may transmit a plurality of downlink reference beams in a beam-sweeping configuration throughout the coverage area (e.g., within a cell) served by the scheduling entity. Each downlink reference beam may include a downlink reference signal, such as a synchronization signal (SS) or a channel state information reference signal (CSI-RS). For example, the beam management circuitry 1741 and DL traffic and control channel generation and transmission circuitry 1743 shown and described above in connection with FIG. 17 may generate and transmit the reference beams.

At block 3004, the scheduling entity may receive a respective beam measurement report from each of one or more scheduled entities or other wireless nodes. Each beam measurement report may include the respective measured beam quality information (e.g., BRSRP and/or RSSI) and beam angle information (e.g., angle of arrival or angle of departure and/or temporal information) of at least a subset (e.g., a candidate set) of reference beams. For example, the UL traffic and control channel reception and processing circuitry 1744 shown and described above in connection with FIG. 17 may receive the beam measurement report(s).

At block 3006, the scheduling entity may determine mobility conditions associated with one or more scheduled entities or other wireless nodes based on the beam angle information included in the beam measurement reports. For example, the location and tracking circuitry 1745 shown and described above in connection with FIG. 17 may determine the mobility conditions.

At block 3008, the scheduling entity may determine a handover configuration of a scheduled entity based on the mobility conditions associated with the scheduled entity. In some examples, the handover configuration may include a handover time, an identity of a target scheduling entity, a beamforming configuration for signaling an indication of a handover, or a set of time-frequency resources for signaling the indication of the handover. For example, the handover management circuitry 1746 shown and described above in connection with FIG. 17 may determine the handover configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity, comprising:
   receiving a plurality of first reference beams from a first wireless node in a first beam-sweeping configuration, each of the plurality of first reference beams comprising a respective first downlink reference signal;
   measuring first beam quality information and first beam angle information for the plurality of first reference beams;
   transmitting a first beam measurement report comprising the first beam quality information, the first beam angle information associated with at least a subset of the plurality of first reference beams, and a request for uplink resources for an aperiodic uplink beam reference signal;

receiving downlink control information from the first wireless node indicating uplink resources reserved for the aperiodic uplink beam reference signal in response to the first beam measurement report;

transmitting the aperiodic uplink beam reference signal to the first wireless node on the uplink resources;

communicating with the first wireless node utilizing at least one serving downlink beam within the subset of the plurality of first reference beams, wherein the at least one serving downlink beam is selected based on the first beam measurement report and the aperiodic uplink beam reference signal.

2. The method of claim 1, wherein the first beam angle information of a reference beam of the plurality of first reference beams comprises at least one of an angle of arrival, an angle of departure, a difference in the angle of arrival between the reference beam and an additional reference beam, a difference in the angle of departure between the reference beam and the additional reference beam, or temporal information related to the reference beam.

3. The method of claim 2, wherein the temporal information related to the reference beam comprises at least one of a time of arrival of the reference beam, a time of departure of the reference beam, a time difference of arrival between the reference beam and the additional reference beam, or a time difference of departure between the reference beam and the additional reference beam.

4. The method of claim 1, wherein transmitting the first beam measurement report further comprises:
    transmitting the first beam measurement report to a scheduling entity for selection of the at least one serving downlink beam.

5. The method of claim 4, wherein transmitting the first beam measurement report further comprises:
    transmitting the first beam measurement report to the scheduling entity via a relay wireless node in wireless communication with the scheduled entity and the scheduling entity within an integrated access backhaul network.

6. The method of claim 5, wherein the first wireless node comprises the relay wireless node.

7. The method of claim 1, further comprising:
    receiving a plurality of second reference beams from a second wireless node in a second beam-sweeping configuration, each of the plurality of second reference beams comprising a respective second downlink reference signal;
    measuring second beam quality information and second beam angle information for the plurality of second reference beams;
    transmitting a second beam measurement report comprising the second beam quality information and the second beam angle information associated with at least a subset of the plurality of second reference beams; and
    communicating with the second wireless node utilizing at least one additional serving downlink beam selected from the plurality of second reference beams based on the second beam measurement report.

8. The method of claim 7, wherein transmitting the first beam measurement report and transmitting the second beam measurement report further comprise:
    transmitting the second beam measurement report together with the first beam measurement report to a scheduling entity in wireless communication with the first wireless node and the second wireless node.

9. The method of claim 8, wherein transmitting the second beam measurement report together with the first beam measurement report further comprises:
    transmitting a combined beam measurement report comprising at least a portion of each of the first beam quality information, the second beam quality information, the first beam angle information, and the second beam angle information.

10. The method of claim 1, wherein communicating with the scheduling entity utilizing the at least one serving downlink beam selected from the plurality of reference beams based on the beam measurement report further comprises:
    communicating with the scheduling entity utilizing at least two serving downlink beams within the subset of the plurality of reference beams, wherein the at least two serving downlink beams are selected based on a difference between the respective angles of arrival or the respective angles of departure between the at least two serving downlink beams.

11. A scheduled entity for wireless communication, comprising:
    a processor;
    a transceiver communicatively coupled to the processor; and
    a memory communicatively coupled to the processor, wherein the processor is configured to:
        receive a plurality of first reference beams from a first wireless node in a first beam-sweeping configuration via the transceiver, each of the plurality of first reference beams comprising a respective first downlink reference signal;
        measure first beam quality information and first beam angle information for the plurality of first reference beams;
        transmit a first beam measurement report comprising the first beam quality information, the first beam angle information associated with at least a subset of the plurality of first reference beams, and a request for uplink resources for an aperiodic uplink beam reference signal via the transceiver;
        receive downlink control information from the first wireless node indicating uplink resources reserved for the aperiodic uplink beam reference signal in response to the first beam measurement report;
        transmit the aperiodic uplink beam reference signal to the first wireless node on the uplink resources; and
        communicate with the first wireless node via the transceiver utilizing at least one serving downlink beam within the subset of the plurality of first reference beams, wherein the at least one serving downlink beam is selected based on the first beam measurement report and the aperiodic uplink beam reference signal.

12. The scheduled entity of claim 11, wherein the first beam angle information of a reference beam of the plurality of first reference beams comprises at least one of an angle of arrival, an angle of departure, a difference in the angle of arrival between the reference beam and an additional reference beam, a difference in the angle of departure between the reference beam and the additional reference beam, or temporal information related to the reference beam.

13. The scheduled entity of claim 12, wherein the temporal information related to the reference beam comprises at least one of a time of arrival of the reference beam, a time of departure of the reference beam, a time difference of arrival between the reference beam and the additional reference beam, or a time difference of departure between the reference beam and the additional reference beam.

14. The scheduled entity of claim 11, wherein the processor is further configured to:
transmit the first beam measurement report to a scheduling entity for selection of the at least one serving downlink beam.

15. The scheduled entity of claim 14, wherein the processor is further configured to:
transmit the first beam measurement report to the scheduling entity via a relay wireless node in wireless communication with the scheduled entity and the scheduling entity in an integrated access backhaul network.

16. The scheduled entity of claim 15, wherein the first wireless node comprises the relay wireless node.

17. The scheduled entity of claim 11, wherein the processor is further configured to:
receive a plurality of second reference beams from a second wireless node in a second beam-sweeping configuration, each of the plurality of second reference beams comprising a respective second downlink reference signal;
measure second beam quality information and second beam angle information for the plurality of second reference beams;
transmit a second beam measurement report comprising the second beam quality information and the second beam angle information associated with at least a subset of the plurality of second reference beams; and
communicate with the second wireless node utilizing at least one additional serving downlink beam selected from the plurality of second reference beams based on the second beam measurement report.

18. The scheduled entity of claim 17, wherein the processor is further configured to:
transmit the second beam measurement report together with the first beam measurement report to a scheduling entity in wireless communication with the first wireless node and the second wireless node.

19. The scheduled entity of claim 18, wherein the processor is further configured to:
transmit a combined beam measurement report comprising at least a portion of each of the first beam quality information, the second beam quality information, the first beam angle information, and the second beam angle information.

20. A method of wireless communication at a scheduling entity, comprising:
receiving a first beam measurement report from a first scheduled entity, the first beam measurement report comprising first beam quality information, first beam angle information for a plurality of first reference beams, and a request for uplink resources for an aperiodic uplink beam reference signal;
transmitting downlink control information to the first scheduled entity indicating uplink resources reserved for the aperiodic uplink beam reference signal in response to the first beam measurement report;
receiving the aperiodic uplink beam reference signal from the first scheduled entity on the uplink resources;
selecting at least one serving downlink beam from the plurality of first reference beams for the first scheduled entity based on the first beam measurement report and the aperiodic uplink beam reference signal; and
enabling communication between the scheduling entity and the first scheduled entity utilizing the at least one serving downlink beam.

21. The method of claim 20, wherein:
the first beam angle information comprises a respective angle of arrival or a respective angle of departure of each reference beam within the subset of the plurality of reference beams; and
the at least one serving downlink beam comprise a maximum separation between the respective angles of arrival or the respective angles of departure thereof.

22. The method of claim 20, wherein the first beam angle information of a reference beam of the plurality of first reference beams comprises at least one of an angle of arrival, an angle of departure, a difference in the angle of arrival between the reference beam and an additional reference beam, a difference in the angle of departure between the reference beam and the additional reference beam, or temporal information related to the reference beam.

23. The method of claim 22, wherein the temporal information related to the reference beam comprises at least one of a time of arrival of the reference beam, a time of departure of the reference beam, a time difference of arrival between the reference beam and the additional reference beam, or a time difference of departure between the reference beam and the additional reference beam.

24. The method of claim 20, wherein receiving the first beam measurement report further comprises:
receiving the first beam measurement report from a relay wireless node in wireless communication with the first scheduled entity and the scheduling entity.

25. The method of claim 20, further comprising:
receiving a second beam measurement report from a second scheduled entity, the second beam measurement report comprising second beam quality information and second beam angle information for a plurality of second reference beams transmitted from a second wireless node to the second scheduled entity;
selecting at least one additional serving downlink beam from the plurality of reference beams for the second scheduled entity based on the second beam measurement report; and
enabling communication between the second wireless node and the second scheduled entity utilizing the at least one additional serving downlink beam.

26. The method of claim 25, wherein the second wireless node is the first wireless node.

27. The method of claim 25, wherein the second scheduled entity is the first scheduled entity.

28. The method of claim 20, wherein the first wireless node is the scheduling entity, and further comprising:
transmitting the plurality of first reference beams in a beam-sweeping configuration, each of the plurality of reference beams comprising a respective downlink reference signal.

29. The method of claim 28, further comprising:
triggering the aperiodic uplink beam reference signal in response to the request for the uplink resources.

30. The method of claim 28, wherein the aperiodic uplink beam reference signal comprises an aperiodic sounding reference signal (SRS) transmitted on a plurality of uplink reference beams.

31. The method of claim 30, further comprising:
measuring a respective uplink beam quality measurement for each of the uplink reference beams;
selecting the at least one serving downlink beam from the plurality of downlink reference beams for downlink wireless transmissions from the scheduling entity to the first scheduled entity utilizing both the first beam measurement report and the respective uplink beam quality measurements; and selecting at least one serving uplink beam from the plurality of uplink reference beams for uplink wireless transmissions from the scheduled entity to the scheduling entity utilizing both the first beam measurement report and the respective uplink beam quality measurements.

32. The method of claim 31, wherein selecting the at least one serving downlink beam and selecting the at least one serving uplink beam each further comprise:

utilizing a weighted combination of the first beam measurement report and the respective uplink beam quality measurements based on a level of channel reciprocation between the plurality of downlink reference beams and the plurality of uplink reference beams.

33. The method of claim 30, further comprising:
determining a handover configuration of the first scheduled entity based on the mobility condition associated therewith.

34. The method of claim 20, further comprising:
determining location information comprising a physical location of the first scheduled entity based on the first beam angle information.

35. The method of claim 20, further comprising:
identifying a physical location of one or more objects with respect to the first scheduled entity based on the first beam angle information.

36. The method of claim 20, further comprising:
determining a beam sweep configuration for use in transmitting the plurality of first reference beams based on the first beam angle information.

37. The method of claim 20, further comprising:
determining a mobility condition associated with the first scheduled entity based on the first beam angle information.

38. The method of claim 20, wherein selecting the at least one serving downlink beam further comprises:

selecting at least two serving downlink beams within the subset of the plurality of reference beams, wherein the at least two serving downlink beams are selected based on a difference between the respective first beam angle information between the at least two serving downlink beams.

39. A scheduling entity for wireless communication, comprising:
a processor;
a transceiver communicatively coupled to the processor; and
a memory communicatively coupled to the processor, wherein the processor is configured to:
receive a first beam measurement report from a first scheduled entity via the transceiver, the first beam measurement report comprising first beam quality information, first beam angle information for a plurality of first reference beams, and a request for uplink resources for an aperiodic uplink beam reference signal;
transmit downlink control information to the first scheduled entity indicating uplink resources reserved for the aperiodic uplink beam reference signal in response to the first beam measurement report;
receive the aperiodic uplink beam reference signal from the first scheduled entity on the uplink resources;
select at least one serving downlink beam from the plurality of first reference beams based on the first beam measurement report and the aperiodic uplink beam reference signal; and
enable communication between the scheduling entity and the first scheduled entity utilizing the at least one serving downlink beam.

40. The scheduling entity of claim 39, wherein:
the first beam angle information comprises a respective angle of arrival or a respective angle of departure of each reference beam within the subset of the plurality of reference beams; and
the at least one serving downlink beam comprise a maximum separation between the respective angles of arrival or the respective angles of departure thereof.

41. The scheduling entity of claim 39, wherein the first beam angle information of a reference beam of the plurality of first reference beams comprises at least one of an angle of arrival, an angle of departure, a difference in the angle of arrival between the reference beam and an additional reference beam, a difference in the angle of departure between the reference beam and the additional reference beam, or temporal information related to the reference beam.

42. The scheduling entity of claim 41, wherein the temporal information related to the reference beam comprises at least one of a time of arrival of the reference beam, a time of departure of the reference beam, a time difference of arrival between the reference beam and the additional reference beam, or a time difference of departure between the reference beam and the additional reference beam.

43. The scheduling entity of claim 39, wherein the processor is further configured to:
receive the first beam measurement report from a relay wireless node in wireless communication with the first scheduled entity and the scheduling entity.

44. The scheduling entity of claim 39, wherein the processor is further configured to:
receive a second beam measurement report from a second scheduled entity via the transceiver, the second beam measurement report comprising second beam quality information and second beam angle information for a plurality of second reference beams transmitted from a second wireless node to the second scheduled entity;
select at least one additional serving downlink beam from the plurality of reference beams for the second scheduled entity based on the second beam measurement report; and
enable communication between the second wireless node and the second scheduled entity utilizing the at least one additional serving downlink beam.

45. The scheduling entity of claim 44, wherein the second wireless node is the first wireless node.

46. The scheduling entity of claim 44, wherein the second scheduled entity is the first scheduled entity.

47. The scheduling entity of claim 39, wherein the first wireless node is the scheduling entity, and wherein the processor is further configured to:
transmit the plurality of first reference beams in a beam-sweeping configuration via the transceiver, each of the plurality of reference beams comprising a respective downlink reference signal.

48. The scheduling entity of claim 47, wherein the processor is further configured to:
trigger the aperiodic uplink beam reference signal in response to the request for the uplink resources.

49. The scheduling entity of claim 47, wherein the aperiodic uplink beam reference signal comprises an aperiodic sounding reference signal (SRS) transmitted on a plurality of uplink reference beams.

50. The scheduling entity of claim 49, wherein the processor is further configured to:
measure a respective uplink beam quality measurement for each of the uplink reference beams;
select the at least one serving downlink beam from the plurality of downlink reference beams for downlink wireless transmissions from the scheduling entity to the first scheduled entity utilizing both the first beam measurement report and the respective uplink beam quality measurements; and
select at least one serving uplink beam from the plurality of uplink reference beams for uplink wireless transmissions from the scheduled entity to the scheduling entity utilizing both the first beam measurement report and the respective uplink beam quality measurements.

51. The scheduling entity of claim 50, wherein the processor is further configured to:
utilize a weighted combination of the first beam measurement report and the respective uplink beam quality measurements based on a level of channel reciprocation between the plurality of downlink reference beams and the plurality of uplink reference beams to select the at least one serving downlink beam and the at least one serving uplink beam.

52. The scheduling entity of claim 39, wherein the processor is further configured to:
determine location information comprising a physical location of the first scheduled entity based on the first beam angle information.

53. The scheduling entity of claim 39, wherein the processor is further configured to:
identify a physical location of one or more objects with respect to the first scheduled entity based on the first beam angle information.

54. The scheduling entity of claim 39, wherein the processor is further configured to:
determine a beam sweep configuration for use in transmitting the plurality of first reference beams based on the first beam angle information.

55. The scheduling entity of claim 39, wherein the processor is further configured to:
determine a mobility condition associated with the first scheduled entity based on the first beam angle information.

56. The scheduling entity of claim 55, wherein the processor is further configured to:
determine a handover configuration of the first scheduled entity based on the mobility condition associated therewith.

* * * * *